United States Patent
Sundararaman et al.

(10) Patent No.: US 12,039,615 B2
(45) Date of Patent: *Jul. 16, 2024

(54) ANOMALY AND FRAUD DETECTION WITH FAKE EVENT DETECTION USING MACHINE LEARNING

(71) Applicant: SAP SE, Walldorf (DE)

(72) Inventors: Suchitra Sundararaman, Bellevue, WA (US); Jesper Lind, Bellevue, WA (US); Juliy Broyda, Bat Yam (IL); Lev Sigal, Carmiel (IL); Anton Ioffe, Kfar Saba (IL); Yuri Arshavski, Natenya (IL)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,769

(22) Filed: Jan. 4, 2023

(65) Prior Publication Data

US 2023/0162292 A1 May 25, 2023

Related U.S. Application Data

(63) Continuation of application No. 16/711,642, filed on Dec. 12, 2019, now Pat. No. 11,568,400.

(Continued)

(51) Int. Cl.
*G06F 18/24* (2023.01)
*G06F 40/284* (2020.01)
(Continued)

(52) U.S. Cl.
CPC .............. *G06Q 40/12* (2013.12); *G06F 18/24* (2023.01); *G06F 40/284* (2020.01); *G06N 3/02* (2013.01);
(Continued)

(58) Field of Classification Search
CPC .... G06Q 40/12; G06Q 20/045; G06Q 20/389; G06Q 20/40; G06Q 20/4016;
(Continued)

(56) References Cited

U.S. PATENT DOCUMENTS 4,910,787 A 3/1990 Umeda et al.
5,974,412 A 10/1999 Hazlehurst et al.
(Continued)

FOREIGN PATENT DOCUMENTS

| CN | 111311550 | 6/2020 |
| DE | 10-2008-041944 | 3/2010 |
| WO | WO 2008119531 | 10/2008 |

OTHER PUBLICATIONS

U.S. Appl. No. 16/577,821, Stark et al.
(Continued)

*Primary Examiner* — Solomon G Bezuayehu
(74) *Attorney, Agent, or Firm* — Fish & Richardson P.C.

(57) ABSTRACT

The present disclosure involves systems, software, and computer implemented methods for transaction auditing. One example method includes training at least one machine learning model to determine features that can be used to determine whether an image is an authentic image of a document or an automatically generated document image, using a training set of authentic images and a training set of automatically generated document images. A request to classify an image as either an authentic image of a document or an automatically generated document image is received. The machine learning model(s) are used to classify the image as either an authentic image of a document or an automatically generated document image, based on features included in the image that are identified by the machine learning model(s). A classification of the image is provided.

(Continued)

The machine learning model(s) are updated based on the image and the classification of the image.

20 Claims, 39 Drawing Sheets

Related U.S. Application Data

(60) Provisional application No. 62/870,512, filed on Jul. 3, 2019.

(51) Int. Cl.

| | | |
|---|---|---|
| *G06N 3/02* | (2006.01) | |
| *G06N 3/08* | (2023.01) | |
| *G06N 20/00* | (2019.01) | |
| *G06Q 20/04* | (2012.01) | |
| *G06Q 20/38* | (2012.01) | |
| *G06Q 20/40* | (2012.01) | |
| *G06Q 40/12* | (2023.01) | |
| *G06T 7/00* | (2017.01) | |
| *G06T 7/73* | (2017.01) | |
| *G06V 30/224* | (2022.01) | |
| *G06V 30/40* | (2022.01) | |
| *G06V 30/413* | (2022.01) | |
| *G06V 30/414* | (2022.01) | |
| *G06V 30/418* | (2022.01) | |
| *G06F 16/2455* | (2019.01) | |

(52) U.S. Cl.
CPC ............... *G06N 3/08* (2013.01); *G06N 20/00* (2019.01); *G06Q 20/045* (2013.01); *G06Q 20/389* (2013.01); *G06Q 20/40* (2013.01); *G06Q 20/4016* (2013.01); *G06T 7/0002* (2013.01); *G06T 7/74* (2017.01); *G06V 30/224* (2022.01); *G06V 30/40* (2022.01); *G06V 30/413* (2022.01); *G06V 30/414* (2022.01); *G06V 30/418* (2022.01); *G06F 16/24564* (2019.01); *G06T 2207/20061* (2013.01); *G06T 2207/30176* (2013.01)

(58) Field of Classification Search
CPC ..... G06F 18/24; G06F 40/284; G06T 7/0002; G06T 2207/30176; G06V 30/224; G06V 30/40; G06V 30/413; G06V 30/414; G06V 30/418; G06V 10/82
See application file for complete search history.

(56) References Cited

U.S. PATENT DOCUMENTS

| | | | |
|---|---|---|---|
| 6,029,144 A | 2/2000 | Barrett et al. | |
| 6,301,386 B1 | 10/2001 | Zhu et al. | |
| 6,754,380 B1 | 6/2004 | Suzuki et al. | |
| 7,003,494 B2 | 2/2006 | Beach et al. | |
| 8,051,019 B2 | 11/2011 | Sigal et al. | |
| 8,185,909 B2 | 5/2012 | Sigal et al. | |
| 8,498,976 B1 | 7/2013 | Shanken et al. | |
| 8,538,965 B1 | 9/2013 | Talyansky et al. | |
| 8,793,191 B2 | 7/2014 | Abernethy et al. | |
| 9,286,514 B1 | 3/2016 | Newman | |
| 9,671,237 B1 | 6/2017 | Eliassi et al. | |
| 9,672,495 B2 | 6/2017 | Bittmann | |
| 9,973,789 B1 | 5/2018 | Bittmann et al. | |
| 10,043,071 B1 | 8/2018 | Wu | |
| 10,457,086 B2 | 10/2019 | Jones et al. | |
| 10,515,266 B1 | 12/2019 | Jarvis et al. | |
| 10,685,347 B1 | 6/2020 | Edwards et al. | |
| 10,692,000 B2 | 6/2020 | Surazhsky et al. | |
| 10,733,733 B1* | 8/2020 | Nam | G06V 10/82 |
| 10,810,725 B1* | 10/2020 | Dolhansky | G06V 10/764 |
| 10,817,733 B2 | 10/2020 | Boue et al. | |
| 10,949,852 B1 | 3/2021 | Kramme et al. | |
| 10,964,006 B2* | 3/2021 | Nießner | G06V 10/462 |
| 11,113,689 B2 | 9/2021 | Stark et al. | |
| 11,308,492 B2 | 4/2022 | Lind et al. | |
| 11,429,964 B2 | 8/2022 | Broyda et al. | |
| 2002/0194174 A1 | 12/2002 | Calkins et al. | |
| 2003/0215136 A1 | 11/2003 | Chao et al. | |
| 2004/0081332 A1 | 4/2004 | Tuttle et al. | |
| 2005/0033617 A1 | 2/2005 | Prather et al. | |
| 2005/0222929 A1 | 10/2005 | Steier et al. | |
| 2007/0194103 A1 | 8/2007 | Manheim | |
| 2010/0188709 A1 | 7/2010 | Simske et al. | |
| 2011/0158483 A1 | 6/2011 | Ming et al. | |
| 2012/0230560 A1 | 9/2012 | Spitz et al. | |
| 2013/0044953 A1 | 2/2013 | Du | |
| 2013/0050764 A1 | 2/2013 | Zhan et al. | |
| 2013/0170749 A1 | 7/2013 | Tian | |
| 2014/0002722 A1 | 1/2014 | Cook et al. | |
| 2014/0185933 A1 | 7/2014 | Tian et al. | |
| 2015/0067346 A1 | 3/2015 | Ross et al. | |
| 2015/0379345 A1 | 12/2015 | Thompson et al. | |
| 2016/0012658 A1 | 1/2016 | Lohweg et al. | |
| 2016/0358268 A1 | 12/2016 | Verma et al. | |
| 2017/0011096 A1 | 1/2017 | Bittmann | |
| 2017/0286765 A1 | 10/2017 | Rodriguez | |
| 2017/0330047 A1 | 11/2017 | Markin et al. | |
| 2018/0107887 A1 | 4/2018 | Huber, Jr. et al. | |
| 2018/0268250 A1 | 9/2018 | Drozdova et al. | |
| 2018/0268584 A1 | 9/2018 | Bobovich et al. | |
| 2019/0197358 A1* | 6/2019 | Madani | G06N 3/045 |
| 2019/0236614 A1 | 8/2019 | Burgin et al. | |
| 2019/0266474 A1 | 8/2019 | Stark et al. | |
| 2019/0295223 A1* | 9/2019 | Shen | G06N 3/045 |
| 2019/0318347 A1 | 10/2019 | Aguiar et al. | |
| 2019/0385003 A1 | 12/2019 | Elgammal | |
| 2020/0005222 A1 | 1/2020 | Bittmann | |
| 2020/0097724 A1 | 3/2020 | Chakravarty et al. | |
| 2020/0104992 A1 | 4/2020 | Schumacher et al. | |
| 2020/0110932 A1 | 4/2020 | Berger | |
| 2020/0151938 A1* | 5/2020 | Shechtman | G06N 3/045 |
| 2020/0160502 A1* | 5/2020 | Nießner | G06V 10/431 |
| 2020/0210770 A1* | 7/2020 | Bala | G06V 10/945 |
| 2020/0226410 A1 | 7/2020 | Liu et al. | |
| 2020/0349682 A1 | 11/2020 | Mayol Cuevas et al. | |
| 2020/0387700 A1 | 12/2020 | Wu | |
| 2021/0004580 A1 | 1/2021 | Sundararaman et al. | |
| 2021/0004795 A1 | 1/2021 | Stark et al. | |
| 2021/0004810 A1 | 1/2021 | Lind et al. | |
| 2021/0004912 A1 | 1/2021 | Stark et al. | |
| 2021/0004949 A1 | 1/2021 | Broyda et al. | |
| 2021/0019519 A1 | 1/2021 | Martin et al. | |
| 2021/0034861 A1 | 2/2021 | Roebuck | |
| 2021/0052215 A1 | 2/2021 | Mouton et al. | |
| 2021/0124919 A1 | 4/2021 | Balakrishnan et al. | |
| 2021/0158035 A1 | 5/2021 | Neeman et al. | |
| 2021/0158036 A1* | 5/2021 | Huber, Jr. | G06V 30/413 |
| 2021/0311947 A1 | 10/2021 | Bittmann et al. | |
| 2021/0374933 A1 | 12/2021 | Neeman et al. | |
| 2021/0385502 A1 | 12/2021 | Dinh et al. | |
| 2021/0398118 A1 | 12/2021 | Stark et al. | |
| 2022/0043788 A1 | 2/2022 | Bittmann et al. | |
| 2022/0172204 A1 | 6/2022 | Stark et al. | |
| 2022/0237604 A1 | 7/2022 | Lind et al. | |
| 2022/0237605 A1 | 7/2022 | Lind et al. | |
| 2022/0237606 A1 | 7/2022 | Lind et al. | |
| 2024/0046679 A1 | 2/2024 | Bittmann | |

OTHER PUBLICATIONS

U.S. Appl. No. 16/577,997, Stark et al.
U.S. Appl. No. 16/578,016, Stark et al.
Artaud et al., "Find it! fraud detection contest report." 2018 24th International Conference on Pattern Recognition (ICPR). IEEE, Aug. 2018, 6 pages.
Asghar et al., "Edge-texture feature-based image forgery detection with cross-dataset evaluation" Machine Vision and Applications 30.7, Oct. 2019, 33 pages.

(56) References Cited

OTHER PUBLICATIONS

Beusekonn et al., "Distortion Measurement for Automatic Document Verification" International Conference on Document Analysis and Recognition, Sep. 2011, 5 pages.

Bloomberg et al., "Blur hit-miss transform and its use in document image pattern detection" Document Recognition II. vol. 2422. International Society for Optics and Photonics, Mar. 1995, 14 pages.

Devi et al., "A survey of image processing techniques for identification of printing technology in document forensic perspective" Int. J. Comput. Appl 1.1, 2010, 7 pages.

Expensereceipt.com [online], "Expense Receipt" Jan. 10, 2016, [retrieved on Jul. 25, 2022], retrieved from URL <http://www.expensereceipt.com/>, 1 page.

Extended European Search Report issued in European Application No. 20183783.8 dated Dec. 4, 2020, 10 pages.

Final Office Action issued in U.S. Appl. No. 16/711,642 dated Jul. 14, 2022, 18 pages.

Final Office Action issued in U.S. Appl. No. 16/711,679 dated Aug. 25, 2021, 37 pages.

Gebhardt et al., "Document authentication using printing technique features and unsupervised anomaly detection" 2013 12th International conference on document analysis and recognition. IEEE, Aug. 2013, 5 pages.

Hrudya et al., "Digital Image Forgery Detection on Artificially Blurred Images" Amrita Center for Cyber Security, Oct. 2017, 5 pages.

Jain et al., "Fake Currency Note Identification Using Deep Convolutional Neural Networks" International Journal of Computing and Applications, vol. 13, No. 2, Jul.-Dec. 2018, 5 pages.

Non-Final Office Action issued in U.S. Appl. No. 16/711,642 dated Dec. 15, 2021, 27 pages.

Non-Final Office Action issued in U.S. Appl. No. 16/711,679 dated Apr. 21, 2021, 36 pages.

Park et al., "An Edge Based Block Segmentation and Classification for Document Analysis with Automatic Character String Extraction," Kyungpook National University, Korea, Oct. 1996, 6 pages.

Zhu et al., "Extracting relevant named entities for automated expense reimbursement." Proceedings of the 13th ACM SIGKDD international conference on Knowledge discovery and data mining, Aug. 2007, 9 pages.

Joshi et al., "Source printer classification using printer specific local texture descriptor" CoRR, Submitted on Jun. 2018, arXiv: 1806.06650v1, 25 pages.

Office Action in European Appln. No. 20183783.8, mailed on Dec. 22, 2023, 6 pages.

Non-Final Office Action in U.S. Appl. No. 17/717,880, mailed on Jan. 22, 2024, 42 pages.

Non-Final Office Action in U.S. Appl. No. 17/717,840, mailed on Feb. 7, 2024, 41 pages.

\* cited by examiner

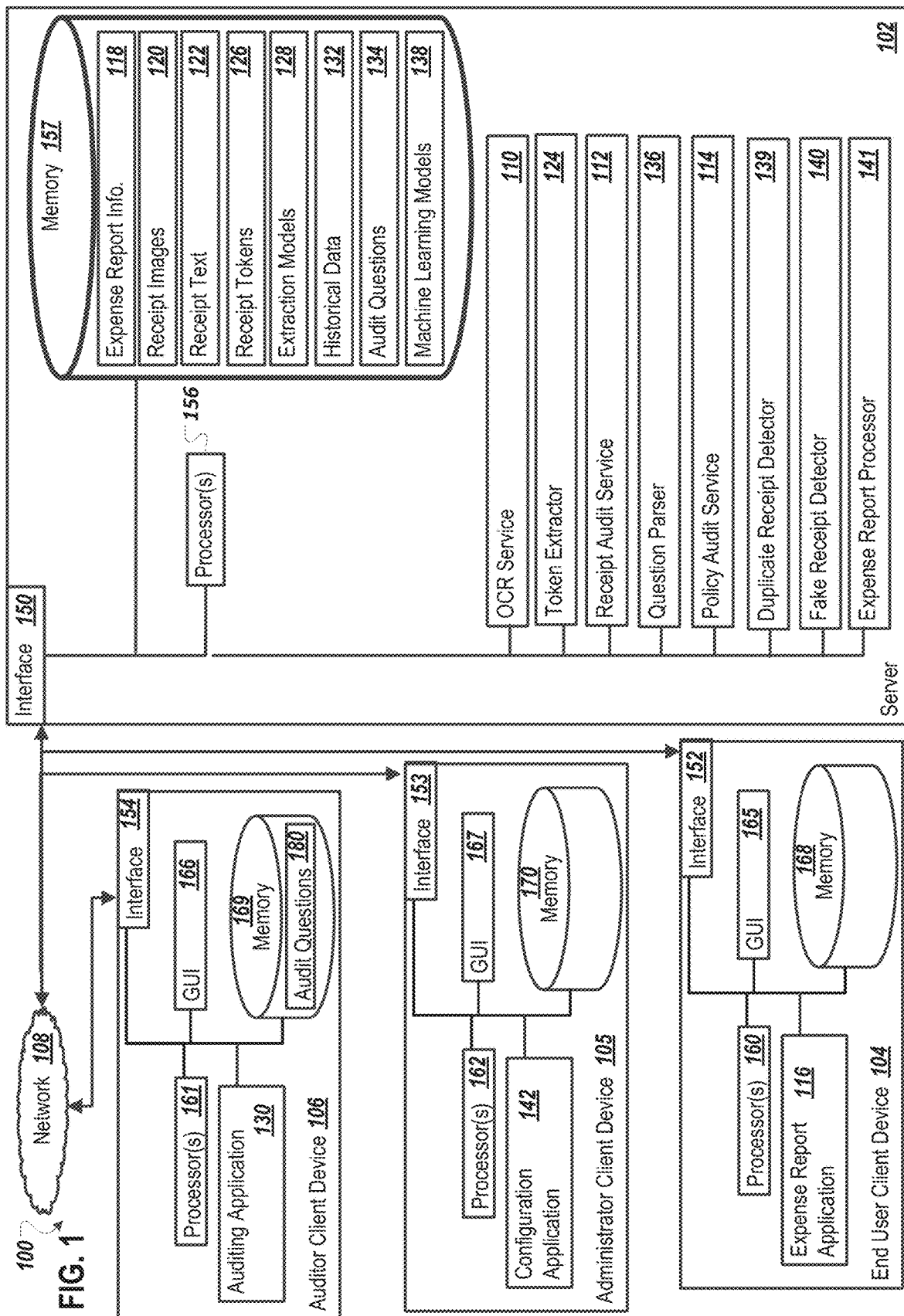

Policy Examples

- 1002 — Itemized receipt
- 1004 — Traveler name on receipt
- 1006 — Valid tax receipt
- 1008 — No Collusion
- 1010 — No Personal Services
- 1012 — No Personal Items
- 1014 — No Personal Entertainment
- 1016 — No Traffic/Parking violations
- 1018 — No Penalty ticket fee
- 1020 — No Companion Travel
- 1022 — No Travel Insurance
- 1024 — No Excessive Tips
- 1026 — No Premium Air Seating
- 1028 — No Add-on air charges
- 1030 — No Premium Car Class
- 1032 — No Add-on Car Rental Charges
- 1034 — No Add-on Hotel charges
- 1036 — No Alcohol
- 1038 — No Pet Care, Child Care, Elder Care, House Sitting
- 1040 — No Late, Interest, or Delinquency Charges
- 1042 — No Health Club or Gym Charges
- 1044 — No Car Washes

FIG. 10   *1000*

```
                    ┌─ 1422
        ┌───────────────────────────┐
   1426 │       WINCRAFT            │
        │    868 EAST MARKET ST     │
        │       WINONA, MN          │
        │                           │
        │  FLOOR MATS        $478.67│
        │                           │
        │                           │
        │           TOTAL:  $478.67 │
        │                           │
        │    1428       1424        │
        └───────────────────────────┘

FIG. 14A      ↘
                              1402
```

```
                                    ┌─────────────────────────────┐
                                    │          RECEIPT            │
                                    │ Rental Agreement Number:  948669400 ├── 1406
                                    │ Vehicle Number:                     │
                                    │                   33732381 ├── 1408
                                    │ YOUR INFORMATION            │
                                    │ JANE DOE                    ├── 1410
                                    │ BUDGET DISC:      VOITH     │
                                    │ PAYMENT METHOD:   MASTER XX3027 │
                                    │ YOUR RENTAL                 │
                                    │ Picked up:    XYZ           │
                                    │ Date/Time:    SEP 06, 2016@08:59AM │
                                    │ Returned:     XYZ           │
                                    │ Date/Time:    SEP 08, 2016@11:53AM │
                                    │ Veh Group:    Intermediate  │
                                    │ Vehicle:      JEEP PATRIOT  │
                                    │ Odometer Out: 14376         ├── 1412
                                    │ Odometer In:  14483         │
                                    │ Fuel Reading:               │
                                    │ YOUR VEHICLE CHARGES        │
                                    │ MINIMUM CHARGE:     129.00  │
                                    │ YOUR TIME AND MILEAGE: 129.00 ├── 1414
                                    │ YOUR TAXABLE FEES           │
                                    │ **16.95% FEE         23.00  │
                                    │ FUEL SERVICE         25.99  │
                                    │ ENV FEE    0.15/DY     .45  │
                                    │ ENERGY RECOVERY 0.96/DY 2.94│
                                    │ VEH LIC FEE           3.75  │
                                    │                             │
                                    │ YOUR SUBTOTAL               │
                                    │ TAXABLE SUBTOT      185.13  │
                                    │ HST 13.000%          24.07  │
                                    │ YOUR NON TAXABLE ITEMS      │
                                    │ TOTAL CHARGES       209.20  │
                                    │ NET CHARGES    CAD  209.20  │
                                    │ YOUR TOTAL DUE:       0.00  │
                                    │                             │
                                    │ PAID ON MASTER XX3027       │
                                    │   CONCESSION RECOVERY FEE   │
                                    │                             │
                                    │ THANK YOU FOR RENTING WITH BUDGET │
                                    │   GST NO 880643820 RT0001   │
                                    │         1416                │
                                    │   For inquiries or e-receipt visit │
                                    │       WWW.BUDGET.COM        │
                                    │     or call 905-676-1500    │
                                    └─────────────────────────────┘
                                 1420 ↙
                              1404 ↙      FIG. 14B
```

```
1 : Set rowSum to Empty List
2 : FOR each row
3 :    Set pixelValues to empty List
4 :    FOR each column
5 :        Append R channel value of pixel to pixelValues
6 :    END FOR
7 :    IF pixelValues  greater than 0
8 :        Append (rowNum,rowSum) to rowSum
9 :    END IF
10: END FOR
11:
12: Convert rowSum to array and assign to rowSum
13: Set x to empty List
14: Set y to Empty List
15: Set maxValue to 0
16: Set ig to 0
17: Set oldIg to 0
18:
19: FOR each value in rowSum
20:    Set bucketVal[row] to row / rows-in-image * number-buckets
21:    Set ig to Integer(bucketVal[row])
22:    IF ig > oldIg
23:        Append oldIg to x
24:        Append maxValue to y
25:        Set maxValue to 0
26:        Set oldIg to ig
27:    END IF
28:
29:    IF Sum of row pixel > maxValue
30:        Set maxValue to row pixel sum
31:    END IF
32:
33:    IF length of x > 0
34:        Calculate the linear least square regression for x and y
35:        Assign this value to O
36:        Set slope-percentage to slope-value / rows-in-image * 100
37:    END IF
38: END FOR
```

FIG. 27 2700

```
1 : Set pixelDiff to Empty List
2 : FOR each row in Image
3 :   FOR each column in image
4 :     Append (row)-(row+2) to pixelDiff
5 :   END FOR
6 : END FOR
7 :
8 : Calculate histogram on pixelDiff
9 : Set alternateValues to 0
10: FOR each value on histogram
11:   IF currentValue < previous value and currentValue < next value
12:     Add 1 to alternateValues
13:   END IF
14: END FOR
```

```
1: Calculate mean pixel value for left edge of image and assign it to LE
2: Calculate mean pixel value for right edge of image and assign it to RE
3: Calculate mean pixel value for upper edge of image and assign it to UE
4: Calculate mean pixel value for lower edge of image and assign it to LWE
5: Calculate difference between UE and LE and assign it to DIFF1
6: Calculate difference between LWE and RE and assign it to DIFF2
7: Return the difference between DIFF1 and DIFF2.
```

FIG. 29 2900

```
1 : # Get rg difference
2 : Set rg to an Empty List
3 : FOR each row
4 :    FOR each column
5 :       Calculate difference between R and G channel values of image
6 :       Append this value to rg
7 :    END FOR
8 : END FOR
9 :
10: # Get relative frequency histogram values
11: Set rg_dict to an empty dictionary
12: FOR every value in rg
13:    IF the rg value is present
14:       Increase the dictionary count for that value by 1
15:    ELSE
16:       Add the rg value to the dictionary
17:    END IF
18: END FOR
19:
20: Calculate relative frequency of histogram values
21: # By dividing each dictionary value by the sum of dictionary values
22: Return the max Value of the dictionary
```

3002

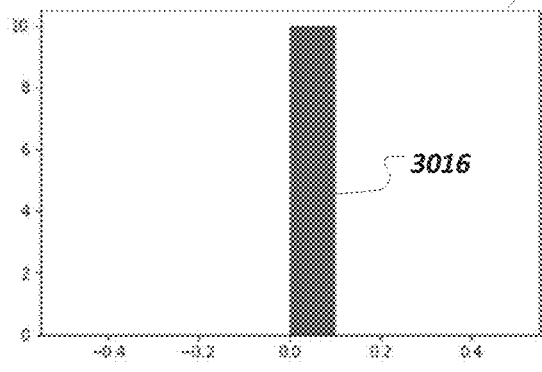

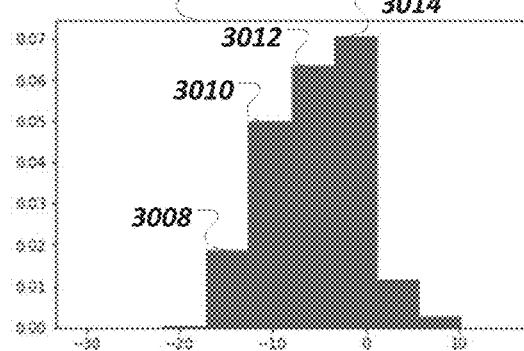

Fake Receipt

Original Receipt

FIG. 30

ANOMALY AND FRAUD DETECTION WITH FAKE EVENT DETECTION USING MACHINE LEARNING

CLAIM OF PRIORITY

This application claims priority under 35 USC § 120 to U.S. patent application Ser. No. 16/711,642, filed on Dec. 12, 2019 titled: "ANOMALY AND FRAUD DETECTION WITH FAKE EVENT DETECTION USING MACHINE LEARNING" which claims priority under 35 USC § 119(e) to U.S. Provisional Application Ser. No. 62/870,512, filed on Jul. 3, 2019 titled: "RECEIPT AUDIT SYSTEM", the entire contents of each and both are hereby incorporated by reference.

TECHNICAL FIELD

The present disclosure relates to computer-implemented methods, software, and systems for expense report auditing.

BACKGROUND

Travel and travel-related expenses can be a large expense for organizations. An automated expense management system can be used to analyze, monitor, and control travel and other reimbursable expenses, while maintaining accuracy and increasing worker productivity. An automated expense management system can enable employees to spend less time creating and monitoring expense reports, which can allows workers to spend more time on core job functions.

SUMMARY

The present disclosure involves systems, software, and computer implemented methods for expense report auditing. One example method includes: training at least one machine learning model to determine features that can be used to determine whether an image is an authentic image of a document or an automatically generated document image, using a first training set of authentic images and a second training set of automatically generated document images; receiving a request to classify a first image as either an authentic image of a document or an automatically generated document image; using the at least one machine learning model to classify the first image as either an authentic image of a document or an automatically generated document image, based on features included in the first image that are identified by the at least one machine learning model; providing a classification of the first image in response to the request; and updating the at least one machine learning model based on the first image and the classification of the first image, for classifying subsequent requests.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 1 is a block diagram illustrating an example system for expense report auditing.

FIG. 10 is a list of example policies.

FIGS. 14A and 14B illustrate examples of a machine-generated receipt image and an authentic receipt image, respectively.

FIG. 27 illustrates example code of a white space slope algorithm that can be executed for an image.

FIG. 29 illustrates example code of an edge difference algorithm that can be executed for an image.

FIG. 30 illustrates example code of a color channel difference algorithm and example histograms produced from execution of the color channel difference algorithm.

DETAILED DESCRIPTION

Figure 2A:
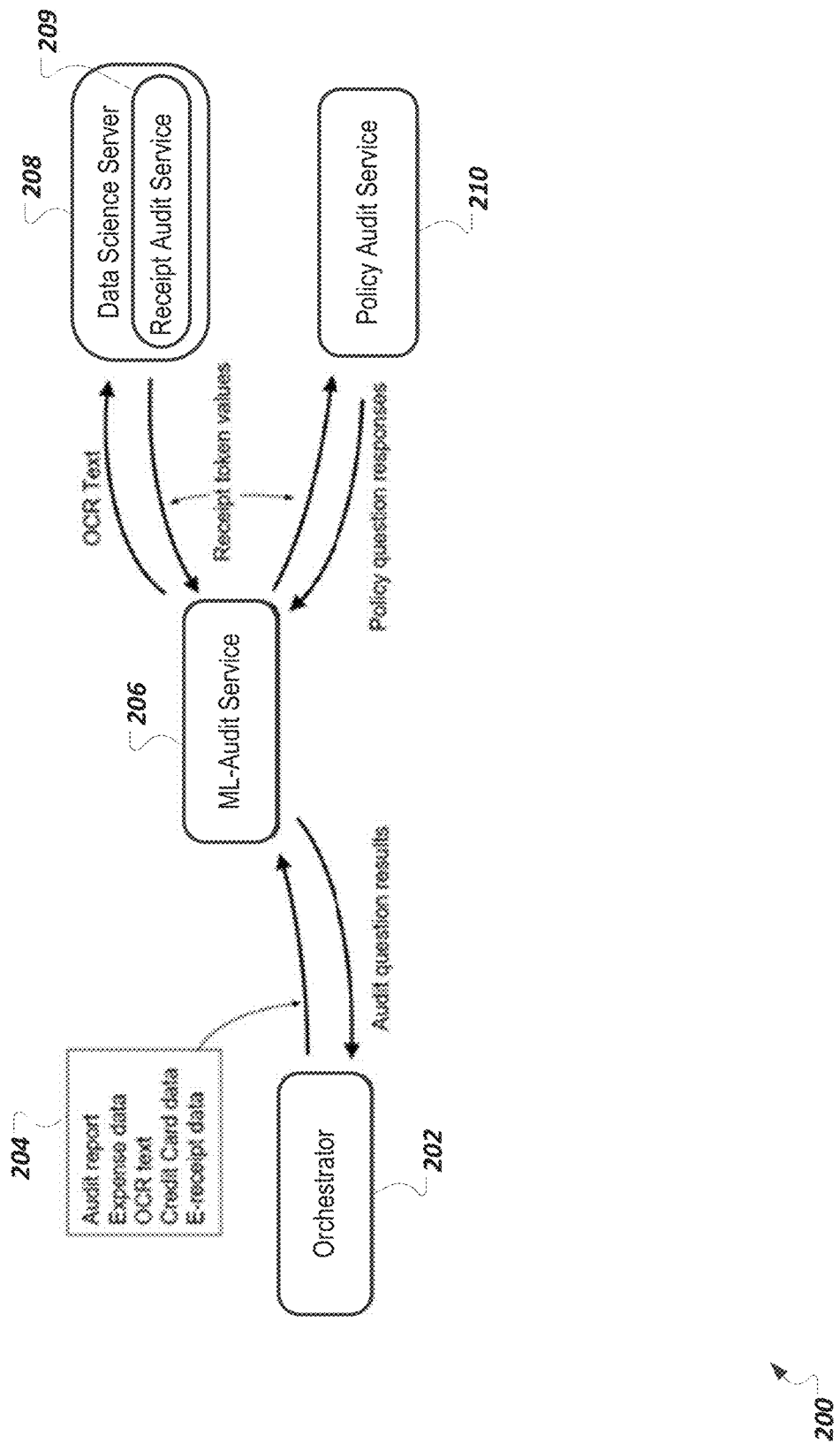
FIG. 2A illustrates an example system for expense report auditing.

A software provider can deliver travel booking and expense reporting service to corporate customers. For example, expense, invoicing, auditing and other services can be offered. Expense and audit services can be coupled so that expense reports that are submitted also include a workflow step where the expense is audited.

A compliance verification (e.g., audit), can include two distinct areas: receipt audit (verifying expense report claim/supporting documentation consistency) and policy audit (verifying compliance with entity-defined policies). The software provider can employ human auditors to review receipts and other information for policy compliance.

As another example, various machine learning approaches can be employed to replace and/or augment human auditors. Machine learning approaches for auditing can result in several advantages. Machine learning approaches can result in faster auditing timelines, which can increase customer satisfaction. Machine learning approaches can lessen a need for human auditors, which can save resources. Machine learning approaches can be more accurate and more tunable than human-based approaches.

Machine learning audit results can be triggered and reported at various time points, such as while a user is building an expense report (as well as after expense report submission). Flexible and real time (or near real time) feedback can improve a user experience. More immediate feedback can notify and make users more aware of auditing procedures that are being employed, which can lessen an occurrence of attempted fraudulent submissions.

Machine learning approaches can leverage audit questions that have already been configured and used by human auditors in manual review cycles. Machine learning models can be trained using a historical database of audit results produced by human and/or machine-based auditing. Machine learning models can be tuned for particular customers. Machine learning approaches can reduce or eliminate errors otherwise possible due to human fatigue and/or human error. Machine learning approaches can make use of large amounts of available data such as past transaction logs, enabling audits that humans could not perform in practice in a realistic amount of time.

Machine learning approaches can also be used to detect potential cases of fraud. For example, a user may attempt to submit duplicate receipts, either a duplicate or a receipt they have submitted or a duplicate of a receipt submitted by another user. As another example, a user may use a fraudulent system or process to automatically generate a machine-generated receipt and attempt to submit the machine-generated receipt as an authentic receipt (e.g., the user may claim that they received the receipt as part of a transaction where they really fraudulently generated the receipt and submitted a fraudulent claim). Machine learning models can be trained to detect both duplicate and machine-generated receipts. Fraud detection can include, for example detection of fake receipts that are generated online and do not link to an actual transaction. Fake receipt (and other fake document detection) can be important for preventing revenue loss and for improving system accuracy and confidence.

FIG. 1 is a block diagram illustrating an example system 100 for expense report auditing. Specifically, the illustrated system 100 includes or is communicably coupled with a server 102, an end-user client device 104, an administrator client device 105, an auditor client device 106, and a network 108. Although shown separately, in some implementations, functionality of two or more systems or servers may be provided by a single system or server. In some implementations, the functionality of one illustrated system or server may be provided by multiple systems or servers. For instance, the server 102 is illustrated as including an OCR (Optical Character Recognition) service 110, a receipt audit service 112, and a policy audit service 114, which may be provided by the server 102, as shown, or may be provided by a combination of multiple different, servers, with each server providing one or more services.

A user can use an expense report application 116 on the end-user client device 104 to work on (and eventually submit) an expense report to the server 102. Expense report information 118 (for a submitted or a work-in progress expense report) and receipt images 120 can be received by the server 102. The OCR service 110 can extract receipt text 122 from the receipt images 120. A token extractor 124 can extract tokens 126, such as an amount, a date, a vendor name, a vendor location, and an expense type, from the receipt text 122, using extraction models 128.

The receipt audit service 112 can ensure that user-provided documentation, such as a receipt, backs up a claim that the user has submitted (or is working on). The receipt audit service 112 can verify, for example, that a date, an amount, a currency, a vendor name, a vendor location, and an expense type are supported by the user-provided documentation (e.g., receipt(s)). An expense management system can employ, for example, human auditors to review receipts to ensure that receipts are in compliance with submitted claims.

As another example, the receipt audit service 112 can include a machine learning engine that can perform some, if not all, review tasks previously performed by human auditors. The receipt audit service 112 can be configured to replace or augment human auditors. For instance, based on confidence values produced by the token extractor 124 and the receipt audit service 112, outputs (e.g., in-compliance, compliance-violation) of the machine learning engine can be used automatically, without human intervention (e.g., if confidence values for compliance or non-compliance are high). As another example, a receipt audit task can be routed to a human auditor for a manual review (e.g., if a machine learning confidence value is low (e.g., inconclusive). For example, a human auditor can use an auditing application on the auditor client device 105.

In further detail, the receipt audit service 112 can compare the receipt tokens 126 to corresponding items in the expense report information 118. The receipt audit service 112 can generate an audit alert in response to determining that an identified token does not match a corresponding item in the expense report information 118. Audit alerts can be provided to the end-user client device 104 for presentation in the expense report application 116. The user who provided the expense report information 112 can receive an alert when running the expense report application 116 in a user mode. A manager of the user can receive an alert in the expense report application 116 (e.g., on a different end-user client device 104) when running the expense report application 116 in a manager mode, for example.

Matches and conflicts between receipt tokens 126 and expense report information 118 can be stored as new historical data 132. In some implementations, matching and conflicting values are used to select answers to audit questions 134. Audit questions 134 can be stored for each entity. The audit questions 134 can be questions that a human auditor can answer when performing a manual audit. Different entities may have different requirements about what information is needed to match for a receipt to pass a receipt audit. For example, a first entity may require that a receipt include a name of a user that matches a user name included in the expense report information 118, whereas a second entity may not require presence of a user name for some or all types of expenses. An audit question for a receipt audit therefore may be "Does the receipt include a user name that matches an expense report user name?". Other receipt audit questions can be "does the amount match?", "does the date match?", or "does the vendor name match?" (e.g., between the receipt tokens 126 and the expense report information 118).

The receipt audit service 112 can be configured to programmatically determine answers to receipt audit questions identified for the customer in the audit questions 134. An answer can be selected or determined based on an answer confidence value, which can be based on extraction confidence values returned by the token extractor 124 (e.g., that represent a confidence of the token extractor 124 with regards to identifying a certain type of token (e.g., a date) and an actual token value (e.g., a date value, such as 4/2/2019). Extraction confidence values can be affected by OCR/receipt image quality, how familiar a receipt layout is to the token extractor 124, etc. An answer confidence value can be determined based on combining extraction confidence values returned by the token extractor for token values (e.g., an amount, a date) that may be needed to answer a particular audit question.

The audit questions 134 can support a human-based audit system that allows arbitrary customizations of audit questions. In some implementations, the receipt audit service 112 uses a question parser 136 to match audit questions 134 for an entity to specific machine learning models 138 that have been configured and trained to answer those types of questions. The question parser 136 can identify audit questions 134 for the entity that do not match any specific question for which there is a model in the machine learning models 138. In such cases, a receipt image 120, expense report information 118, and the audit question may be forwarded to the auditor client device 106 for review by a human auditor using the auditing application 130.

The question parser 136 can also parse the answers to each question, matching them with the answers that the models are capable of providing. The question parser 136 can rejection questions which it cannot match the question text to one of the specific model texts and for which it cannot match all answers to the answers the model is capable of providing. For example, the question parser 136 can reject questions for which it cannot match the question text to text describing the model or for which it cannot match all answers to answers the model is capable of providing. For example, if a model is for the question "Is there alcohol on the receipt?" and the expected answers choices are "Yes" and "No" but the supplied question also included the possible answer choice "Yes, but with food," the question parser 136 may refuse to address the question because this possible answer doesn't match one of the available choices. As another example, some questions may allow multiple answer choices to be selected at the same time. For example, the question "Are there additional charges on a hotel receipt?" might have included the answer choices "Yes, in-room movies" and "Yes, laundry service" which could both be true for the same hotel receipt. In that case the model can select both choices at the same time.

The question parser 136 can also be used by the policy audit service 114. A policy audit refers to a process of analyzing whether the claim initiated by the end user is compliant with various policies that the organization has configured. The system can support both a standard selection of questions that the entity can chose from, as well as the option of configuring new questions that are unique to the entity. The policy audit service 114 can be designed to automatically work with both a standard set of questions as well as questions that were configured by the entity. An example of a policy question can be "Are there alcohol charges present?" Semantically similar questions in the audit questions 134 can be clustered based on any suitable clustering algorithm, and the question parser 136 can identify a policy model for a policy question in the machine learning models 138. The policy audit service 114 can use identified policy models to determine answers to the policy questions configured for the entity.

A policy model can be a keyword-based model or another type of model, such as a neural network model. Keyword-based models are models which are trained to look for specific samples of text (keywords) in the OCR text of a receipt. The list of keywords for a keyword-based model may be developed in several ways. For example, keyword lists can be generated by having human annotators look at receipts and select important keywords by hand. As another example, machine learning methods can be trained on a large population of receipts with known labels with respect to policy questions and can automatically determine a list of keywords. As yet another example, a hybrid system can be used which iterates between the human auditor and machine learning keyword generation methods, where a machine learning model can learn to classify receipts and human annotators can determine keywords (or groups of related keywords) for the receipts the machine learning model fails to classify with high confidence.

Keyword models can also benefit from an embedding model that can automatically learn variant forms of keywords created by imperfections in OCR processes. A machine learning model can automatically learns the keyword form variants by exposure to a large database of receipt texts.

A policy model can be a neural network model. A neural network model can use a more holistic approach to a receipt than keyword identification. For example, recurrent neural networks can evaluate a whole set of receipt text character by character and make a determination about whether the receipt passes or fails a particular policy. The recurrent neural network models can learn what features of the receipt text are important (e.g., keywords and also text format or layout or patterns of keywords) with minimal design input from human annotation.

Policy models can be used to generate a classification that allows the system to select a specific answer from a list of possible answers to a well-determined question. Other types of audits can be performed. For instance, a duplicate receipt detector 139 can perform various algorithms to determine whether a submitted receipt is a duplicate, as described in more detail below. As another example, a fake receipt detector 140 can perform various algorithms to determine whether a submitted receipt is a fake receipt that has been automatically generated by a computer program (rather than being an authentic receipt legitimately received by a user).

If an expense report item successfully passes audits that have been configured for the entity, the expense can be processed for the user, for example, by an expense report processor 141.

The extraction models 128, the receipt audit service 112, the policy audit service 114, the machine learning models 138, the duplicate receipt detector 139, and the fake receipt detector 140 can be trained using historical data 132 generated from prior manual and automated audits of receipts, the historical data 132 associated with and received from multiple client customers of the expense management system. The historical data 132 can include data relating to past receipt/expense submissions, and compliance/non-compliance results.

An administrator can use a configuration application 142 running on the administrator client device 105 to configure one or more of the extraction models 128, the receipt audit service 112, the policy audit service 114, the machine learning models 138, the duplicate receipt detector 139, and the fake receipt detector 140. For example, confidence value thresholds or other parameters can be configured for each entity. Some entities may desire or require stricter policy enforcement and may therefore have parameters or thresholds set to require a stronger match of information, for example. As another example, confidence thresholds that affect which receipts automatically pass an automated audit vs. which receipts are forwarded to a human auditor for a secondary (e.g., confirming) review can be tailored.

As used in the present disclosure, the term "computer" is intended to encompass any suitable processing device. For example, although FIG. 1 illustrates a single server 102, a single end-user client device 104, and a single customer client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, 153, and 154 are used by the server 102, the end-user client device 104, the administrator client device 105, and the auditor client device 106, respectively, for communicating with other systems in a distributed environment—including within the system 100—connected to the network 108. Generally, the interfaces 150, 152, 153, and 154 each comprise logic encoded in software and/or hardware in a suitable combination and operable to communicate with the network 108. More specifically, the interfaces 150, 152, 153, and 154 may each comprise software supporting one or more communication protocols associated with communications such that the network 108 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from respective client devices, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes the memory 157. In some implementations, the server 102 includes multiple memories. The memory 157 may include any type of memory or database module and may take the form of volatile and/or non-volatile memory including, without limitation, magnetic media, optical media, random access memory (RAM), read-only memory (ROM), removable media, or any other suitable local or remote memory component. The memory 157 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The end-user client device 104, the auditor client device 106, and the administrator client device 105 may each generally be any computing device operable to connect to or communicate with the server 102 via the network 108 using a wireline or wireless connection. In general, the end-user client device 104, the auditor client device 106, and the administrator client device 105 each comprise an electronic computer device operable to receive, transmit, process, and store any appropriate data associated with the system 100 of FIG. 1. The end-user client device 104, the auditor client device 106, and the administrator client device 105 can each include one or more client applications, including the expense report application 116, the configuration application 142, or the auditing application 130, respectively. A client application is any type of application that allows a respective client device to request and view content on the respective client device. In some implementations, a client application can use parameters, metadata, and other information received at launch to access a particular set of data from the server 102. In some instances, a client application may be an agent or client-side version of an application running on the server 102 or another server.

The end-user client device 104, the auditor client device 106, and the administrator client device 105 respectively include processor(s) 160, 161, or 162. Each of the processor(s) 160, 161, or 162 may be a central processing unit (CPU), an application specific integrated circuit (ASIC), a field-programmable gate array (FPGA), or another suitable component. Generally, each processor 160, 161 or 162 executes instructions and manipulates data to perform the operations of the respective client device. Specifically, each processor 160, 161, or 162 executes the functionality required to send requests to the server 102 and to receive and process responses from the server 102.

The end-user client device 104, the auditor client device 106, and the administrator client device 105 are each generally intended to encompass any client computing device such as a laptop/notebook computer, wireless data port, smart phone, personal data assistant (PDA), tablet computing device, one or more processors within these devices, or any other suitable processing device. For example, a client device may comprise a computer that includes an input device, such as a keypad, touch screen, or other device that can accept user information, and an output device that conveys information associated with the operation of the server 102, or the respective client device itself, including digital data, visual information, or a GUI 165, a GUI 166, or a GUI 167, respectively.

The GUIs 165, 166, and 167 interface with at least a portion of the system 100 for any suitable purpose, including generating a visual representation of the expense report application 116, the configuration application 142, or the auditing application 130, respectively. In particular, the GUIs 165, 166, and 167 may be used to view and navigate various Web pages. Generally, the GUIs 112 165, 166, and 167 provide a respective user with an efficient and user-friendly presentation of business data provided by or communicated within the system. The GUIs 112 165, 166, and 167 may each comprise a plurality of customizable frames or views having interactive fields, pull-down lists, and buttons operated by the user. The GUIs 112 165, 166, and 167 each contemplate any suitable graphical user interface, such as a combination of a generic web browser, intelligent engine, and command line interface (CLI) that processes information and efficiently presents the results to the user visually.

Memories 168, 169, and 170 included in the end-user client device 104, the auditor client device 106, and the administrator client device 105, respectively, may each include any memory or database module and may take the form of volatile or non-volatile memory including, without limitation, magnetic media, optical media, random access memory (RAM), read-only memory (ROM), removable media, or any other suitable local or remote memory component. The memories 168, 169, and 170 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device. For example, the memory 169 includes audit questions 180, which may be a copy of a portion of the audit questions 134.

There may be any number of end-user client devices 104, auditor client devices 106, and administrator client devices 105 associated with, or external to, the system 100. For example, while the illustrated system 100 includes one end-user client device 104, alternative implementations of the system 100 may include multiple end-user client devices 104 communicably coupled to the server 102 and/or the network 108, or any other number suitable to the purposes of the system 100. Additionally, there may also be one or more additional end-user client devices 104 external to the illustrated portion of system 100 that are capable of interacting with the system 100 via the network 108. Further, the term "client," "client device," and "user" may be used interchangeably as appropriate without departing from the scope of this disclosure. Moreover, while client devices may be described in terms of being used by a single user, this disclosure contemplates that many users may use one computer, or that one user may use multiple computers.

FIG. 2A illustrates an example system 200 for expense report auditing. An orchestrator component 202 can orchestrate auditing of expense report items. For example, the orchestrator component 202 can request auditing for each expense included in an expense report. The orchestrator 202 can provide expense data and receipt information 204 (e.g., OCR text extracted from receipts, credit card receipt information, electronic receipt data) to a ML (Machine Learning) audit service 206. The ML audit service 206 can forward the expense data and receipt information 204 to a data science server 208.

The data science server 208 can extract receipt token values from the OCR text. In some implementations, the data science server 208 is configured to perform a receipt audit service 209. In other implementations, the receipt audit service 209 is performed by a different server. The receipt audit service 209 can compare the extracted receipt token values to the expense data to confirm that user-specified expense data is supported by the receipt token values. If a mismatch between user-specified and supported values is detected, an audit alert can be generated. An audit alert from a receipt audit can be treated as one type of audit question. An audit question for a receipt audit can be generally phrased as "is the receipt valid?", or "does the receipt support the expense claim?" An answer to a receipt audit question can be "yes", which means that the receipt data matches the expense data. An answer to a receipt audit question can be "no", with a qualifying reason, such as "an amount mismatch" or "a date mismatch".

The ML audit service 206 can receive a receipt audit result (e.g., answers to receipt audit question(s)). If a receipt audit question answer is "no", the receipt audit question answer can be provided to the orchestrator 202, and an action can be performed, such as to inform the user of a documentation mismatch, inform a user's manager, etc. Other receipt audit outcomes can include an inconclusive audit result due to an inability to extract necessary receipt token values (or a lack of confidence in extracted receipt token values).

If a receipt passes a receipt audit, receipt token values generated by the data science server 208 can be provided to the ML audit service 206 and then forwarded to a policy audit service 210. The policy audit service 210 can be configured to evaluate whether the receipt token values comply with various policies an entity may have configured for expense reimbursement. A policy audit can include answering a set of policy questions. A policy question can phrased, for example as "does the receipt include an alcohol expense?" Audit question results (e.g., answers) can be gathered and provided to the orchestrator 202. If any policy question answers correspond to a policy violation, the corresponding expense can be rejected and the user, the user's manager, etc., can be notified.

Figure 2B:
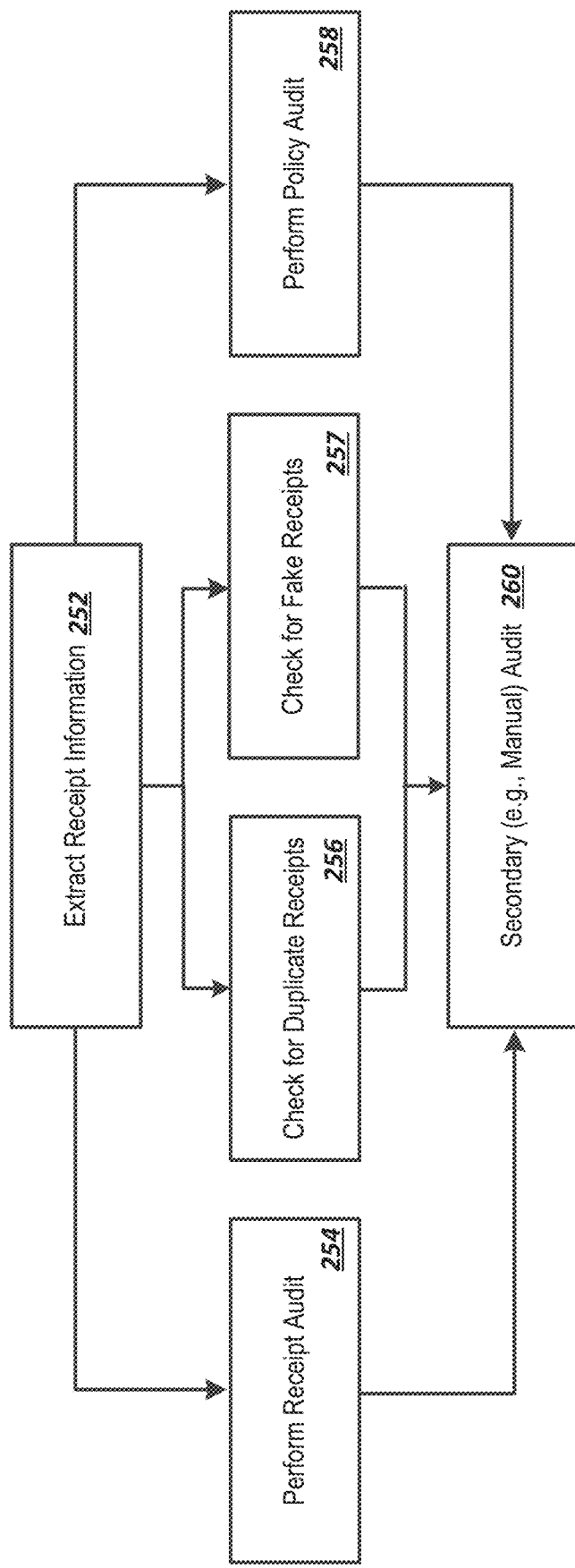
FIG. 2B is a flowchart of an example method for auditing a receipt associated with an expense report.

FIG. 2B is a flowchart of an example method 250 for auditing a receipt associated with an expense report. At 252, receipt information is extracted using one or more machine learning extraction models. For example, one or more different machine learning models can be used to extract the following tokens from a submitted receipt: an amount, a vendor name, a vendor location, an expense amount, an expense type, and a transaction time. Other tokens can be extracted. After tokens have been extracted, various type of audits can be performed. For example, at 254, a receipt audit can be performed. The receipt audit determines whether the receipt tokens match and support information a user submitted for an expense report claim. As another example, at 256, a duplicate receipt audit can be performed to determine whether a submitted receipt is a duplicate of another receipt that has already been submitted. Another example includes, at 257, performing an audit to determine whether a receipt is a fake receipt (e.g., a receipt image generated by a computer program rather than a legitimate image of a physical receipt). As yet another example, at 258, a policy audit can be performed. A policy audit is a process of making sure that the claim initiated by the end user and the submitted receipt is compliant with various policies that the user's organization has configured. Additional operations can be performed in other implementations, as well as a subset of the indicated audits or evaluations.

The receipt audit, the duplicate receipt audit, and the policy audit can be performed in a variety of orders and/or may be performed, in various combinations, at least partially in parallel. For instance, in some implementations, the receipt audit is performed first, the duplicate receipt audit is performed second, and the policy audit is performed third. In other implementations, the duplicate receipt audit is performed first (as an example). In some implementations, all three audits are performed in parallel. Each audit can be performed by a different engine or service, by a same or by different servers, for example.

For some audit results of some audits, a secondary audit can be performed, at 260. A secondary audit can be a manual audit by a human auditor, for example. As another example, certain audit results from the receipt audit, the duplicate receipt audit, or the policy audit may result in initiation of other or alternative automated processing as part of a secondary audit.

Figure 3A:
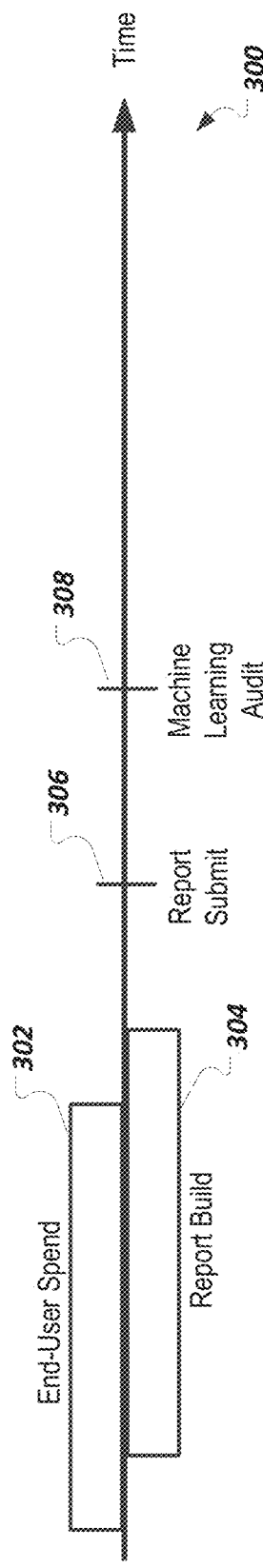
FIG. 3A illustrates a timeline for creation, submission, and auditing of an expense report.

FIG. 3A illustrates an example timeline 300 for creation, submission, and auditing of an expense report. In an end-user spend stage 302, a user has expenditures that may be later submitted on an expense report. In a report-build stage 304, the user creates the expense report that will later be submitted at a report-submit time point 306. As shown in FIG. 3A, the end-user spend stage 302 and the report-build stage 304 may overlap. That is, the user may, for example, at subsequent points in time: 1) spend on a first set of item(s), 2) begin to build an expense report that includes those first set of items, 3) spend on a second set of item(s); 4) add the second set of items to the expense report; and 5) submit the expense report. At an audit time point 308, the expense report can be audited by machine learning (and possibly human auditor(s)).

Figure 3B:
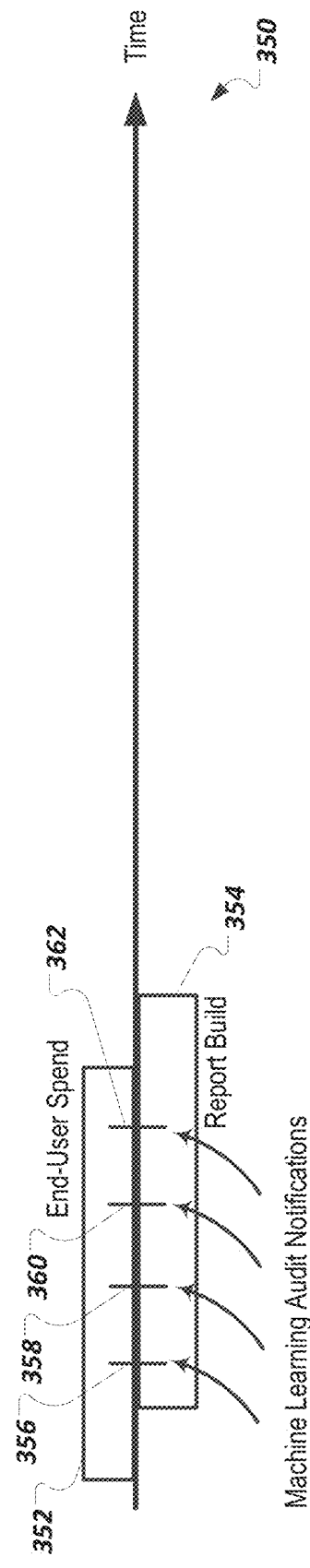
FIG. 3B illustrates another timeline for creation, submission, and auditing of an expense report.

FIG. 3B illustrates another example timeline 350 for creation, submission, and auditing of an expense report. The timeline 350 includes an end-user spend 352 stage that overlaps with a report-build stage 354, as above. Rather than perform an audit after report submission, some or all audit activities can be performed before report submission. For instance, audit activities and corresponding notifications of compliance or non-compliance can be performed at time points 356, 358, 360, and 362. For instance, when a user adds item(s) to an expense report that is being built, a machine learning system can perform an audit on the items that have been added (or that are currently included) in the to-be-submitted expense report. Another audit may or might not occur after the expense report has been submitted.

Figure 4A:
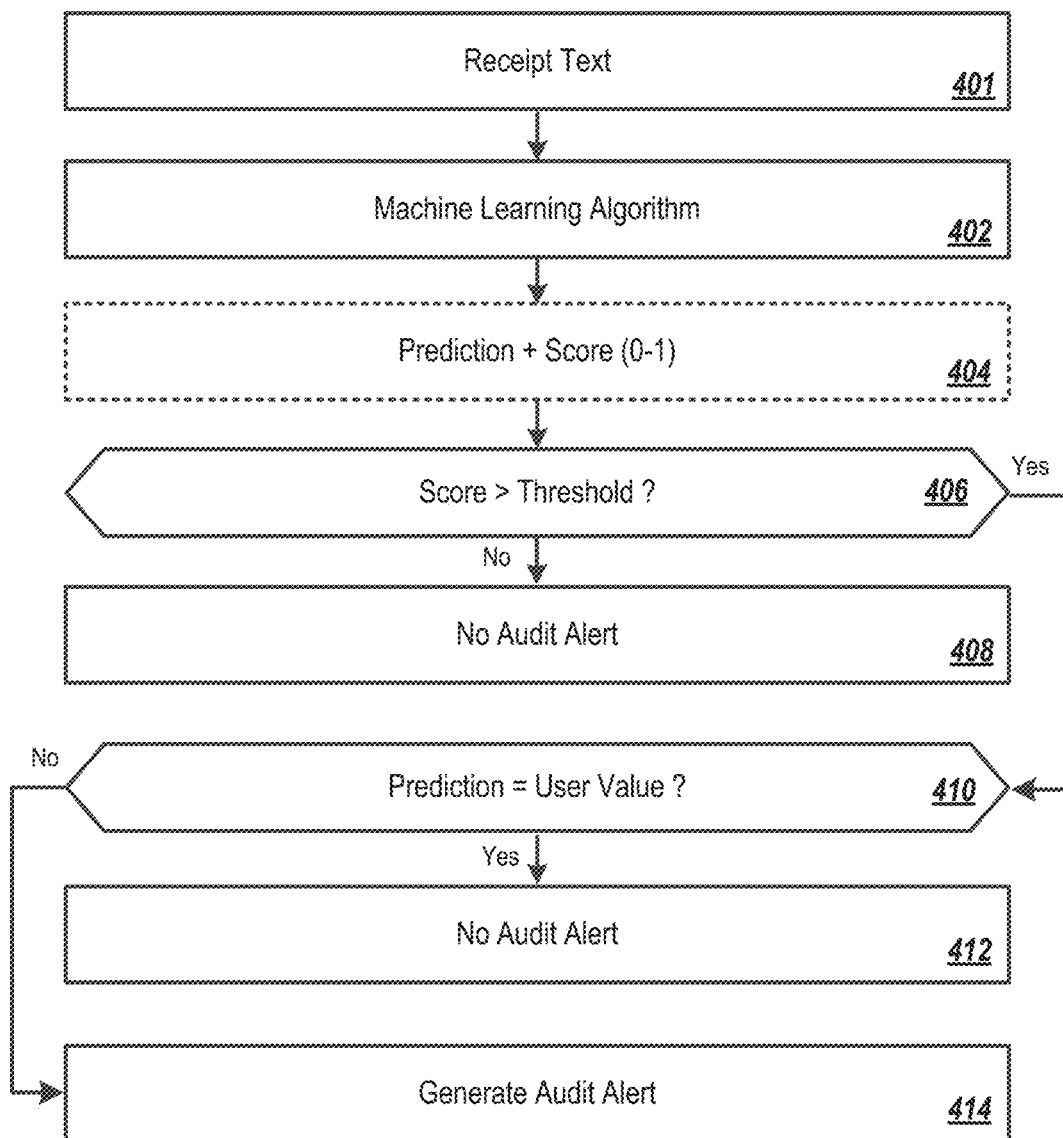
FIG. 4A is a flowchart of an example method for generating an audit alert as part of a receipt audit.

FIG. 4A is a flowchart of an example method 400 for generating an audit alert as part of a receipt audit. A machine learning engine receives receipt text 401 and performs a machine learning algorithm 402 to produce a prediction and a confidence score 404. The prediction includes predicted token values that a token extractor has extracted from the receipt. The confidence score may be, for example, a value between zero and one, where the value represents a relative confidence that the token extractor has correctly identified and extracted the correct tokens. In some implementations, each predicted value has a separate confidence score. Each token can be extracted using a machine learning model.

Some receipts can be similar to previously processed receipts for which tokens have been accurately and successfully extracted, for example. Accordingly, a confidence value generated when processing receipts that are similar to past successfully processed receipts can be higher than a confidence value for a receipt that is not similar to previously-processed receipts. As another example, textual items on the receipt can have an OCR-related confidence value that represents a confidence that an OCR process successfully recognized text from a receipt image. If a text item has a low OCR-related confidence score, an overall confidence score for a token identified based on the text item may be lower than for other tokens that have been identified from text items that have higher OCR-related confidence scores.

At 406, a determination is made as to whether the confidence score is greater than a threshold. The threshold can be predefined, or can be dynamic, and can be the same or different for different users/customers. If the confidence score is not greater than the threshold, no audit alert is generated (e.g., at 408). An audit alert can correspond to a determination that user-provided data does not match supporting information on a receipt. A low confidence score can represent that the system is not confident that correct information from the receipt has been identified. Accordingly, the system may not be confident in declaring that user-provided information does not match supporting information, and therefore an audit alert is not generated. However, another notification may be sent to the user, such as to inform the user that information on the receipt cannot be successfully identified (e.g., due to image blurriness or a receipt that presents information in a way that a machine learning model currently can't process (or has trouble processing)). In some implementations, in response to a low confidence score, the receipt is forwarded to a human auditor who may be able to successfully identify information on the receipt.

If the confidence score is greater than the threshold, a determination is made, at 410, as to whether the prediction matches user-specified value(s). A higher confidence score can represent that the system is confident that correct information has been extracted from the receipt. Accordingly, the system can be confident in performing a next step of comparing the prediction (e.g., the extracted tokens) to the user-specified value(s).

If the prediction matches the user-specified value, then no audit alert is generated (e.g., at 412). In other words, the system is confident that correct information has been extracted from the receipt and that the extracted information matches user-provided claim information.

If the prediction does not match the user-specified value, an audit alert is generated at 414. In these instances, the system is confident that correct information has been extracted from the receipt; however, the extracted information does not match user-provided information, which can mean that the user-provided information does not support the claim on the expense report. Accordingly, the audit alert is generated. As mentioned, the audit alert can be provided to the user, to a manager of the user, etc. In some implementations, generation of an audit alert results in the claim being submitted for manual review/confirmation.

Figure 4B:
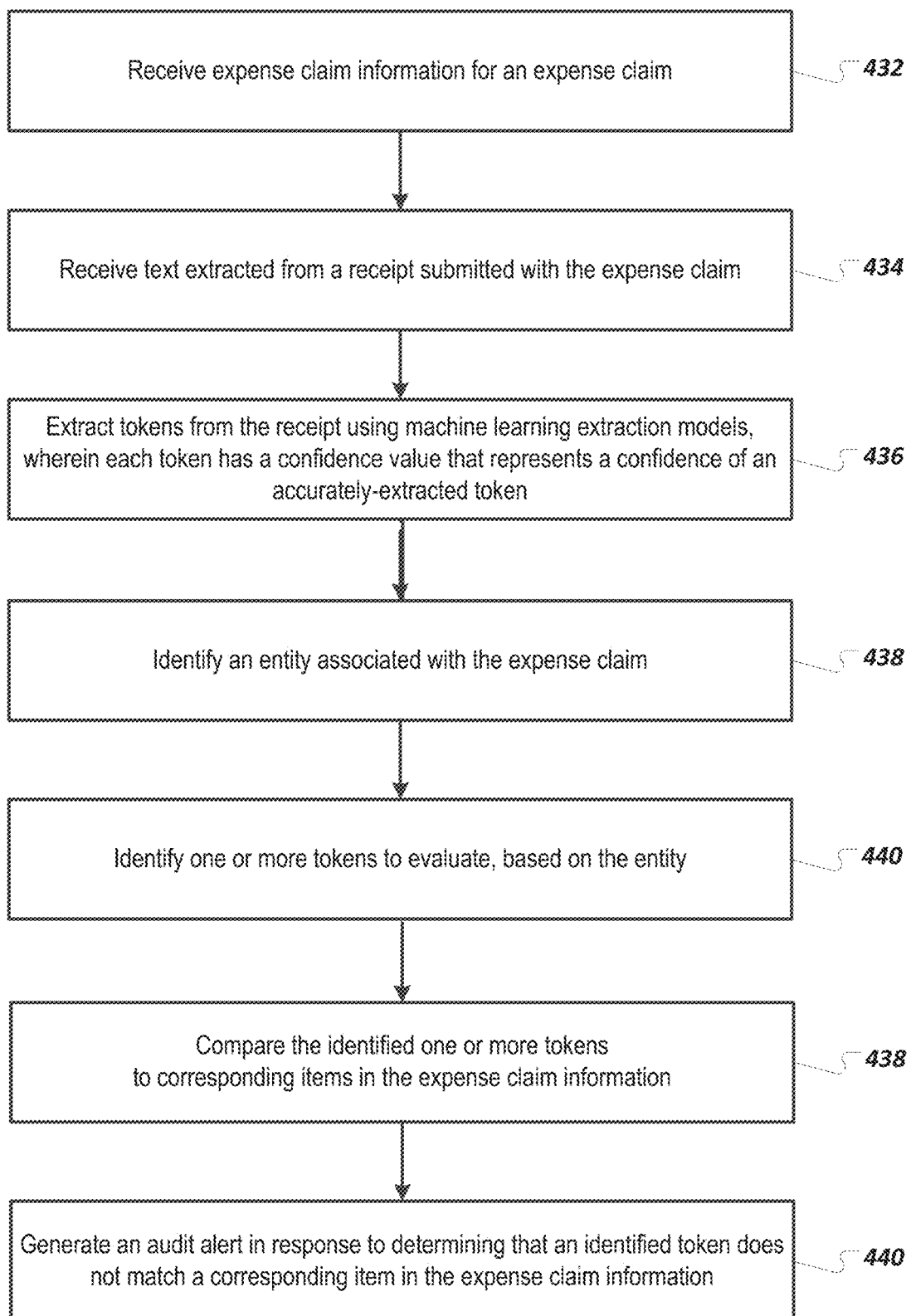
FIG. 4B is a flowchart of an example method for performing a receipt audit.

FIG. 4B is a flowchart of an example method 430 for performing a receipt audit. It will be understood that method 430 and related methods may be performed, for example, by any suitable system, environment, software, and hardware, or a combination of systems, environments, software, and hardware, as appropriate. For example, one or more of a client, a server, or other computing device can be used to execute method 430 and related methods and obtain any data from the memory of a client, the server, or the other computing device. In some implementations, the method 430 and related methods are executed by one or more components of the system 100 described above with respect to FIG. 1. For example, the method 430 and related methods can be executed by the receipt audit service 112 of FIG. 1.

At 432, expense claim information for an expense claim is received. For example, a user may be working on or may have submitted an expense report.

At 434, text extracted from a receipt submitted with the expense claim is received. For instance, extracted text can be received from an OCR service. The OCR service can extract the receipt text from an image of the receipt.

At 436, tokens are extracted from the receipt using machine learning extraction models. The machine learning extraction models can generate, for each token, a confidence value that represents a confidence of an accurately-extracted token. The tokens can include, for example, date, amount, currency, vendor name, vendor location and expense type. The machine learning extraction models can be trained based on historical data. The historical data can include historical expense claim information and historical receipt data known to have been accurately extracted.

At 438, an entity associated with the expense claim is identified. For example, the user may be an employee of a particular entity.

At 440, one or more tokens to evaluate are identified, based on the entity. For example, different entities can desire that different checks are performed to ensure that certain tokens are present on a submitted receipt and that those certain tokens match corresponding items on an expense report.

At 442, the identified one or more tokens are compared to corresponding items in the expense claim information. In some examples, to identified one or more tokens are compared to corresponding items in the expense claim information when the confidence score for one or more tokens is more than a predefined threshold. If a confidence score is less than the predefined threshold, a comparison may not occur, since the machine learning extraction models may not be confident that accurate token information has been extracted from the receipt, and may accordingly determine that a comparison to expense report information may not be valid or useful. In some implementations, when a confidence score is less than the predefined threshold, the receipt text and the expense claim information is forwarded for secondary processing (e.g., a manual review).

At 445, an audit alert is generated in response to determining that an identified token does not match a corresponding item in the expense claim information. The audit alert can be provided to a user who provided the expense claim information and/or to a manager of the user, for example.

Figure 4C:
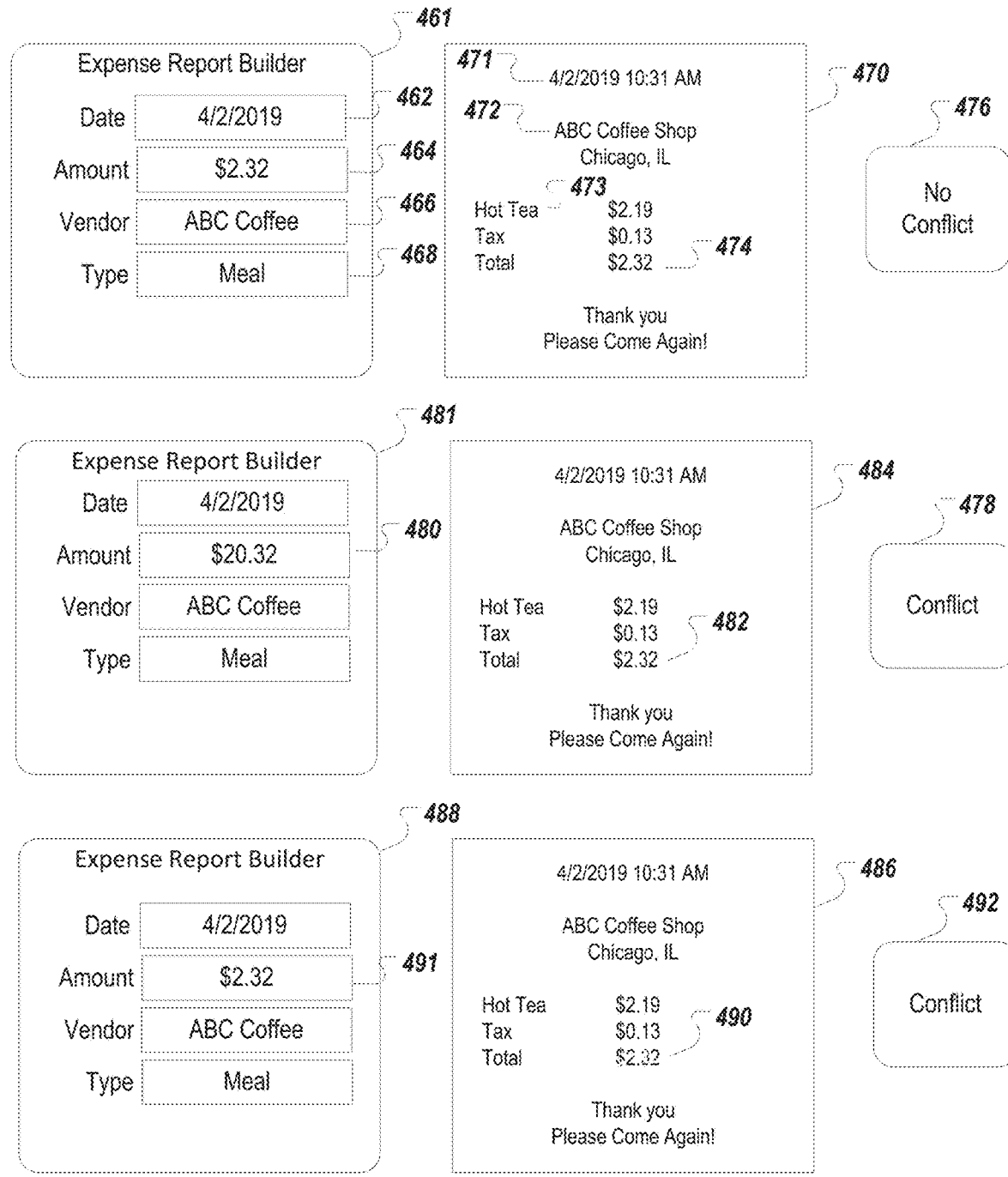
FIG. 4C is a conceptual diagram illustrating example user interfaces and example receipts.

FIG. 4C is a conceptual diagram 460 illustrating example user interfaces and example receipts. For instance, an expense report builder user interface 461 enables a user to enter information for an expense claim. For instance, the user can enter information in date 462, amount 464, vendor 466, and expense type 468 fields (or other fields). The user can provide a receipt 470 to support the claim. The receipt 470 includes a date 471, vendor information 472, an item description 473, and an amount 474. Date, vendor, item description, and amount tokens can be extracted based on identification of the date, vendor information 472, item description 473, and amount 474, respectively. Other tokens can be extracted. As part of a receipt audit, the extracted tokens can be compared to data that the user entered in fields of the report builder user interface 461.

For instance, the date 471 can be compared to the date value "4/2/2019" entered in the date field 462, the vendor information 472 can be compared to the vendor name "ABC Coffee" entered in the vendor field 466, the item description 473 can be compared to the "meal" expense type entered in the expense type field 468 (to determine that the item is of a category compatible to the category entered into the expense type field 468), and the amount 474 can be compared to the amount $2.32 entered in the amount field 464. In this example, values from the expense report builder user interface 461 match corresponding tokens extracted from the receipt 470, so a no-conflict audit result 476 can be generated.

As another example, a conflict audit result 478 can be generated if there is a mismatch between a claim and supporting information. For instance, a user may have incorrectly entered an amount value $20.32 in an amount field 480 of an expense report builder user interface 481. A receipt audit service can detect a mismatch between the $20.32 amount value in the amount field 480 and an amount 482 on a submitted receipt 484.

As yet another example, a user may submit a receipt 486 to support a claim entered using an expense report builder user interface 488. The receipt 486 includes a blurry amount value 490 that may result in a low confidence value during token extraction. For instance, a token extractor may fail to identify a value for the amount 490 or may identify a value (which may be a correct value of $2.32 or some other value due to blurriness) but with a low confidence value. A low confidence value and/or an incorrectly identified token (e.g., that does not match an amount in an amount field 491) may result in a conflict 492 being generated.

Figure 5:
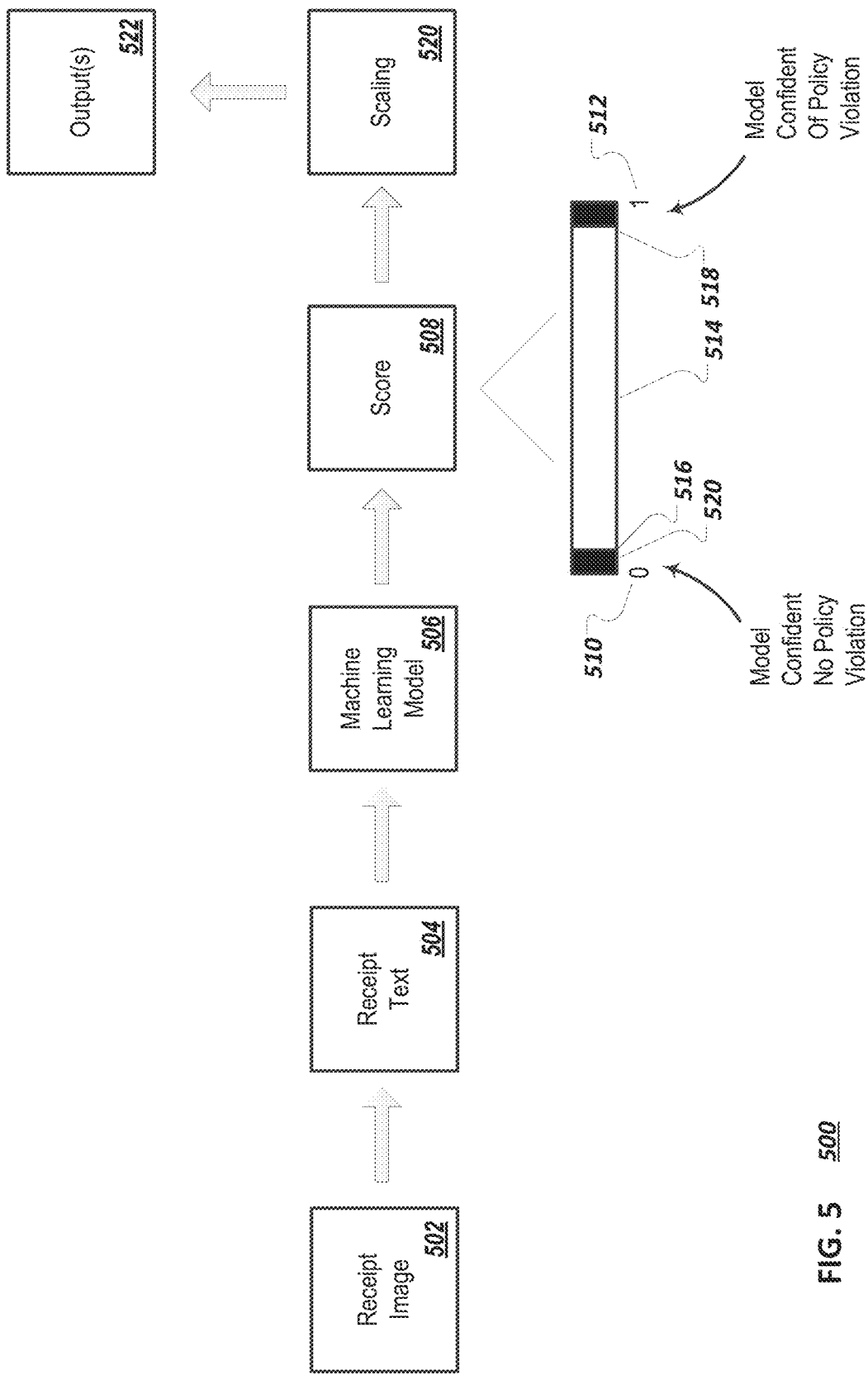
FIG. 5 illustrates an example of a system for expense report auditing.

FIG. 5 illustrates an example of a system 500 for expense report auditing. A receipt image component 502 can provide a receipt image to a receipt text component 504. The receipt text component 504 can generate receipt text, e.g., using OCR, from the received receipt image. The receipt text can be processed using a machine learning model 506. A machine learning engine can, for example, generate a score 508.

The score 508 can be, for example, a value between zero and one. A score of zero 510 can represent that the machine learning engine is confident (e.g., with a confidence value of 100%), that analyzed receipt text does not correspond to a policy violation. A score of one 512 can represent that the machine learning engine is confident (e.g., with a confidence value of 100%) that analyzed receipt text does correspond to a policy violation. A score can be produced for each policy question used by an entity.

A different machine learning model can be used for each policy question. For instance, a model can be used to handle a no-alcohol policy (e.g., a policy which states alcohol expenses are not reimbursable). The score of zero 510 can indicate that the machine learning engine is 100% confident that the receipt does not include an alcohol expense. The score of one 512 can indicate that the machine learning engine is 100% confident that the receipt does include an alcohol expense. A value somewhere in the middle, e.g., a score of 0.45 514, can indicate that the machine learning engine is not as certain as to whether the receipt has an alcohol expense.

If a computed score is within a threshold distance of either the zero score 510 or the one score 512, an audit result (e.g., no-policy violation, no policy violation) can be automatically determined. For instance, scores of 0.1 516 and 0.9 518, respectively, can represent threshold scores that can be compared to a computed score, to determine whether a receipt has an audit result automatically determined. For instance, a score between 0 and 0.1 can result in an automatic no-policy violation audit result and a score between 0.9 and 1 can result in an automatic policy-violation audit result.

In some implementations, the score 508 can be scaled by a scaling component 514 to generate a scaled score. A scaled score can be computed so that the scaled score can be compared to a single threshold value. For instance, the scaled score can be computed as:

scaled-score=2.0*absolute(score−0.5)

The scaled score can be compared to a single threshold. The single threshold can be computed as:

single-threshold=1.0−(2.0*confidence-threshold)

where confidence-threshold is a distance from an absolute confidence value (e.g., a distance from the zero score 510 or the one score 512).

For example, to have a confidence of 90%, a distance from an absolute confidence value can be 0.1 (e.g., corresponding to the scores 516 and 518, respectively). Accordingly, the single-threshold can be calculated, in this example, as:

single-threshold=1.0−(2.0*0.1)=0.8

A given scaled score can be compared to the single threshold, to determine, for example, whether the receipt can be automatically processed without manual intervention. For instance, for the score of 0.45 514, the scaled score can be computed as:

scaled-score=2.0*absolute(0.45−0.5)=0.1

The scaled-score value of 0.1 can be compared to the single threshold (e.g., 0.80), and since the scaled score value of 0.1 does not meet the single threshold, the receipt can be forwarded to a human auditor for further review. As another example, for a score of 0.05 520, the scaled score can be computed as:

scaled-score=2.0*absolute(0.05−0.5)=0.9

The scaled-score value of 0.9 can be compared to the single threshold (e.g., 0.80), and since the scaled score value of 0.9 exceeds the single threshold, an audit result for the receipt can be automatically determined (e.g., as not a policy violation). As yet another example, for the score 518 of 0.9, the scaled score can be computed as:

scaled-score=2.0*absolute(0.9−0.5)=0.8

The scaled score value of 0.8 can be compared to the single threshold (e.g., 0.80), and since the scaled score of 0.8 meets the single threshold, an audit result for the receipt can be automatically determined (e.g., as policy violation).

In summary, comparing the scaled score to the single threshold can result in one or more output(s) 522. As mentioned, if the scaled score does not meet the threshold, an output 522 can be a forwarding of the receipt image 502 (and, in some implementations, one or more outputs from the machine learning model 506), to a human auditor. As another example and as mentioned, if the scaled score meets the single threshold, an output 522 can be an automatically determined audit result (e.g., policy violation, no policy violation).

Figure 6:
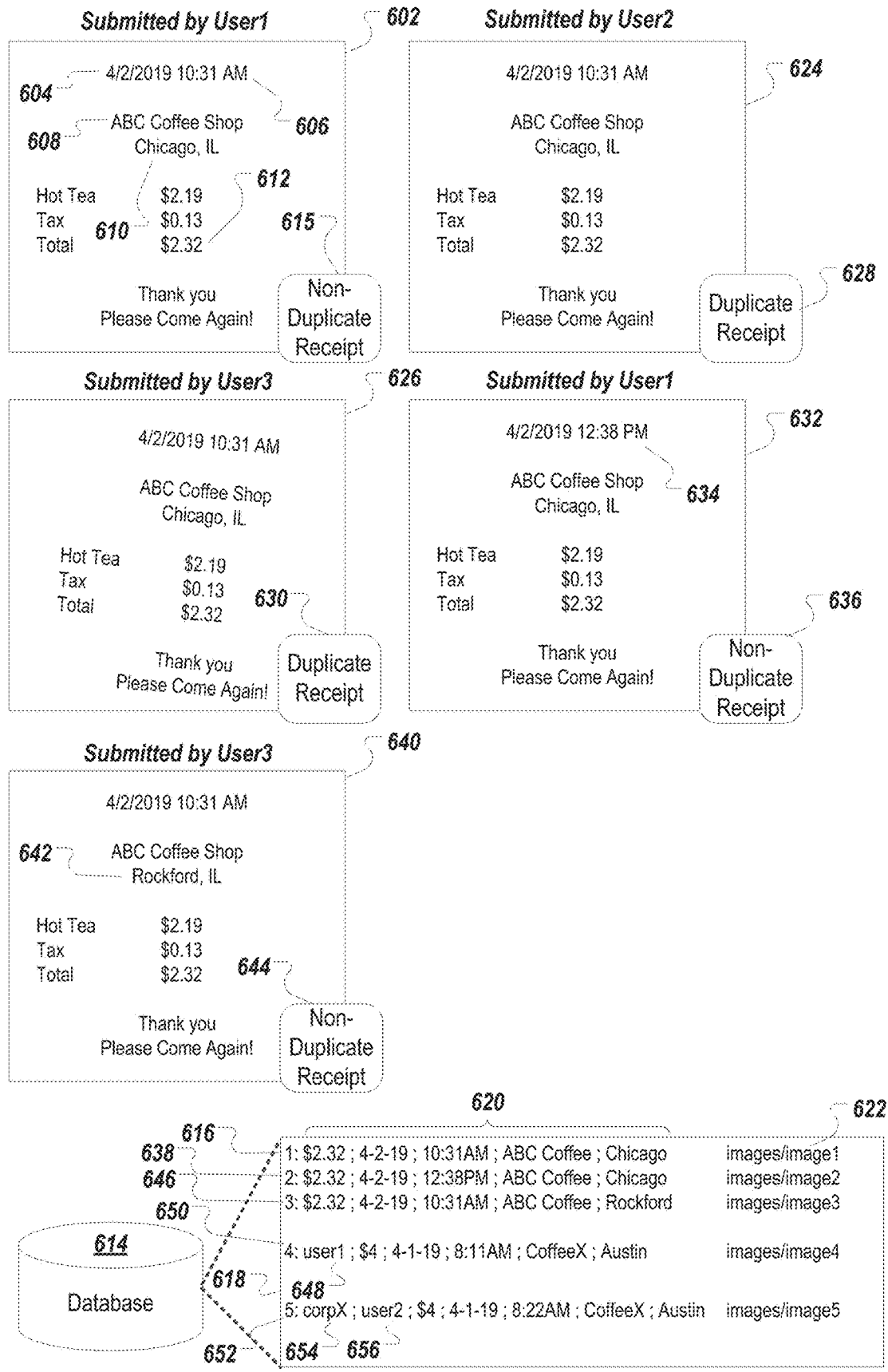
FIG. 6 illustrates a system for detecting duplicate receipts.

FIG. 6 illustrates a system 600 for detecting duplicate receipts. A first user (e.g., "user1") submits a receipt 602 with an expense report. An auditing system can extract information from the receipt 602 using any suitable OCR process, and, as part of an auditing process, determine whether the receipt 602 is a duplicate receipt. A duplicate receipt can be treated as a policy violation. Submitting duplicate receipts can be considered fraudulent activity, for example, or may be subject to further inspection and analysis. A duplicate receipt may be detected when a same user submits multiple copies of a same receipt. The multiple copies can be a same receipt image submitted multiple times or can be different copies (e.g., different image scans) of a same receipt.

A receipt can be a duplicate receipt even if submitted by different users. For instance, a second user may receive a receipt or a receipt image from a user who had already submitted the receipt. A second submission of same receipt information, by the second user, can be treated as a duplicate submission, and can be denied by the system. The different users may work for the same or for different companies. (e.g., the system 600 may be used by multiple clients, such that a same receipt may be received for reimbursement from two different companies). Whether from a same or a different company, a duplicate receipt can be detected by the system. A user of a different company may obtain an image of a receipt online, such as through email or through a website, for example. If the user of the different company attempts to submit a duplicate receipt, the system can detect a duplicate submission. As described in more detail below, duplicate submissions can be detected, for example, through use of a compound key that includes important receipt information along with a timestamp, but which might not include a user identifier or an entity/company identifier.

The receipt 602 includes a date 604, a time 606, a vendor name 608, a vendor location 610, and an amount 612. The auditing system can create a compound key using the date 604 and the time 606 (or a merged date/time value), the vendor name 608, the vendor location 610, and the amount 612, and determine whether a same compound key exists in a database 614 that stores information for previously received receipts.

The specific tokens of information used to form the compound key can be selected so that similar, valid transactions that occur at different times (for a same or different users) are not falsely detected as duplicates when coincidentally similar receipts are submitted, but multiple receipt copies of identical transactions are detected as duplicates. A time value (e.g., the date 604 and the time 606 or a merged date/time value), along with information identifying a transaction amount (e.g., the amount 612), and information identifying a specific vendor location (e.g., the vendor name 608 and the vendor location 610) can be used to uniquely identify a particular receipt. For duplicate receipts, a same time, a same amount, and a same vendor location can be extracted as tokens.

The auditing system can determine, at a time of a duplicate-receipt check, that the receipt 602 is not a duplicate receipt (e.g., as indicated by a note 615), by determining that the database 614 does not include an entry with a compound key equal to the compound key created from information on the receipt 602. The auditing system can, as part of receipt processing, create a new entry 616 (e.g., entry "1") in the database 614, as shown in example records 618. The new entry 616 includes a compound key 620, created from the date 604, the time 606, the vendor name 608, the vendor location 610, and the amount 612, as described above. The new entry 616 can include other information, such as a user identifier (e.g., an identifier associated with the "user1" user), a company/entity identifier, or a link 622 (or identifier or other reference) to an image of the receipt 602. The link 622 can be used for secure access to receipt images. For example, an authorized user, such as a manual reviewer or a manger of a user who submitted the receipt, can be provided access to a receipt image, using the link 622 or another image identifier or reference.

The first user or other user(s) may attempt to submit a receipt that has the same information as the receipt 602. For instance, a second user (e.g., "user2") may submit a receipt 624 and/or a third user (e.g., "user3") may submit a receipt 626. The receipt 624 may be, for example, a copy of an image (e.g., an identical image file) of the receipt 602 that was submitted by the first user. The receipt 626 may be a different image of the receipt 602. For instance, the first user may have submitted a first image of the receipt 602 and the second user may have submitted a different image (e.g., a different image scan) of the receipt 602, resulting in different image files with different image data. For instance, an image created from a second scan of the receipt 602 may have captured the receipt 602 at a different scan angle, as shown.

Whether a duplicate receipt is a same or different image file, the auditing system can detect a duplicate receipt submission. For instance, a tokenizer can extract receipt information, extracted tokens can be used to create compound keys, and a compound key comparison can be performed to determine whether a receipt is a duplicate. For instance, after extracting tokens and creating compound keys for the receipt 624 and the receipt 626, the auditing system can determine that respective compound keys for both the receipt 624 and the receipt 626 match the compound key 620 created for the receipt 602. Accordingly, both the receipt 624 and the receipt 626 can be flagged as duplicate receipts (e.g., as indicated by a note 628 and a note 630, respectively). Once flagged as a duplicate receipt, the auditing system can determine to not create an entry for the duplicate receipt in the database 614.

One or more duplicate-receipt actions can be performed in response to detection of a duplicate receipt. For instance, a notification can be sent to a respective user (e.g., the "user2" or the "user3" user), notifying that a submitted receipt is a duplicate. Additionally or alternatively, a notification can be sent to a manger of the user who submitted the receipt. Another example includes performing a secondary (e.g., manual) audit, for those receipts flagged as duplicate. In some implementations, data relating to detection of a duplicate receipt is used as feedback for adjusting or training one or more machine learning models.

As discussed above, auditing and notifications can be performed at various times. For instance, the second user may be in process of creating an expense report, and may add an expense item and upload an image of the receipt 624 while creating the expense report. The auditing system can detect, after the image of the receipt 624 has been uploaded, that the receipt 624 is a duplicate receipt. Accordingly, the second user can be notified of the duplicate (and thus invalid) receipt before the expense report is submitted. As another example, the auditing system can perform auditing checks, including duplicate receipt detection, when the expense report is submitted, in response to the expense report submission. As another example, auditing (and any generated notifications) can be performed in a post-processing phase that is at a later time point. For example, expense report submissions can be processed in a batch mode on a nightly basis.

The use of a compound key that includes a vendor name, a vendor location, a timestamp, and an amount enables duplicate receipt detection but allows for acceptance of receipts that are similar but not in fact duplicates. For instance, a receipt 632 submitted by the first user is for a same item purchased at the same vendor, but at a later time in the day. For instance, an amount, vendor name, vendor location, and date on the receipt 626 match corresponding items on the receipt 602, but a time 634 on the receipt 632 differs from the time 606 on the receipt 602. The first user may have ordered a second, same item while at the ABC Coffee Shop, may have returned later in the day to the ABC Coffee Shop and ordered a same item a second time on the same day, etc. A compound key created for the receipt 632 can differ from the compound key 620 created for the receipt 602, based on the difference between the time 634 and the time 606. Accordingly, since the compound key created for the receipt 632 differs from the compound key 620 (and from other compound keys in the database 614), the auditing system can determine that the receipt 632 is not a duplicate receipt (e.g., as indicated by a note 636). In response to determining that the receipt 632 is not a duplicate receipt, the auditing system can add an entry 638 to the database 614. The entry 638 can include a compound key created for the receipt 632, a link to an image of the receipt 632, and other relevant information and/or links to additional data or context.

As another example, a "user3" user has submitted a receipt 640. The receipt 640 has a same amount, vendor name, vendor location, date and time as the receipt 602. However, a vendor location 642 of Rockford, Ill. on the receipt 640 differs from the vendor location 610 of Chicago, Ill. on the receipt 602. Coincidentally, different users may have ordered a same (or same-priced) item, at a same vendor (e.g., a popular coffee shop with multiple locations), at a same time, but at different locations. Receipt submitted for these expenses should not be (and are not) treated by the auditing system as duplicate receipts, despite having similar information. A compound key created for the receipt 640 can differ from the compound key 620 created for the receipt 602, based on the difference between the vendor location 642 and the vendor location 610, for example. Accordingly, since the compound key created for the receipt 640 differs from the compound key 620 (and from other compound keys in the database 614), the auditing system can determine that the receipt 640 is not a duplicate receipt (e.g., as indicated by a note 644). In response to determining that the receipt 640 is not a duplicate receipt, the auditing system can add an entry 646 to the database 614. The entry 646 can include a compound key created for the receipt 640, a link to an image of the receipt 640, etc.

As shown for the entries 616, 638, and 646, a compound key can be formed without using user or entity/company identifiers, which can enable detection of duplicate receipts across users and/or across companies. In some implementations, a compound key, or a primary key that includes a compound key, can include a user identifier, such as a user identifier 648 in an entry 650. As another example and as shown in an entry 652, a record in the database 614 can include a company identifier 654 (e.g., as well as a user identifier 656). In some implementations, if receipts that have a same location, a same time, a same amount, but from different users, a user identifier or another process can be used to validate the receipts.

Figure 7:
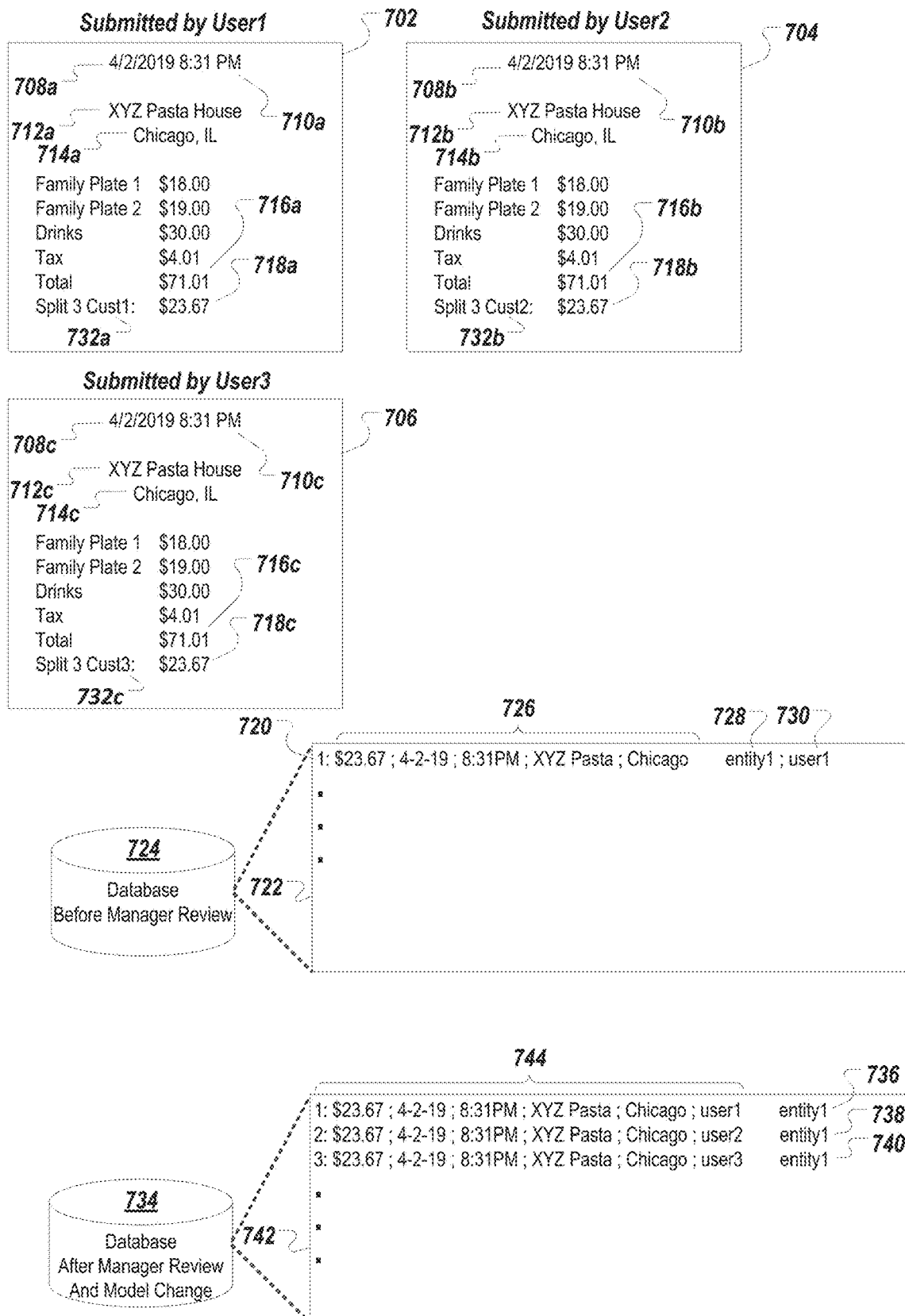
FIG. 7 illustrates a system for modifying duplicate receipt detection in a model.

FIG. 7 illustrates a system 700 for modifying duplicate receipt detection in a model. As an example, three employees of an entity may split a business dinner bill evenly. For instance, a user1 user receives a first receipt 702, a user2 user receives a second receipt 704, and a user3 user receives a third receipt 706. The first receipt 702 includes a date 708a, a time 710a, a vendor name 712a, a vendor location 714a, an overall total 716a, and a customer total 718a. The second receipt 704 and the third receipt 706 also include a same date, time, vendor name, vendor location, overall total, and customer total (e.g., as 708b-718b and 708c-718c, respectively). Each of the three employees may submit a respective receipt 702, 704, or 706. The first receipt submitted (e.g., the first receipt 702) may be accepted as a non-duplicate receipt. For instance, a record 720 is included in example records 722 of a database 724. The record 720 includes a compound key 726 that is an aggregation of the date 708a and the time 710a (or a date/time combination), the vendor name 712a, the vendor location 714a, and the customer total 718a. The compound key 726 may be stored in the database 724 as a hash value that is computed based on the aggregate information. In some implementations, the record 720 includes or is otherwise linked to an entity (e.g., company) identifier 728 and/or a user identifier 730.

The second receipt 704 and the third receipt 706 may be submitted after the first receipt 702 is submitted. An auditing system may initially flag the second receipt 704 and the third receipt 706 as duplicate receipts. For instance, when the second receipt 704 is submitted, a compound key for the second receipt 704 may be formed using the date 708b, the time 710b, the vendor name 712b, the vendor location 714b, and the customer total 718b. The compound key for the second receipt 704 can be compared to the compound key 726 created for the first receipt 702. The auditing system can reject the second receipt 704 as a duplicate receipt based on the compound key for the second receipt 704 matching the compound key 726. Similarly, in response to submission of the third receipt 706, the auditing system can reject the third receipt 706 as a duplicate receipt based on the compound key 726 matching a compound key formed using the date 708c, the time 710c, the vendor name 712c, the vendor location 714c, and the customer total 718c from the third receipt 706.

In some implementations, the rejected receipts 704 and 706 are submitted for a secondary review (which may be manual). A human auditor can, for example, determine that the receipts 704 and 706 are actually valid, due to a multi-split bill situation. The human auditor can initiate a process whereby the receipts 704 and 706 are approved. As another example, the user2 user and the user3 user can each receive a notification of a rejected expense report (or expense report item), and can request an appeal or a re-review of a respective report. A manager can review the rejections, determine that the expenses are valid, and approve the expenses.

The auditing system can learn, over time, to better handle false positives so as to not flag as duplicates similar receipts that are actually valid expenses. For instance, the auditing system can learn (or can be configured by an administrator) to identify other receipt information that may distinguish receipts that may be otherwise equal if just compared based on a certain set of fields historically used for a compound key. For instance, the auditing system can learn (or can be configured) to determine that customer number fields 732a, 732b, and 734b have different values (e.g., "cust1," "cust2," "cust3") across the receipts 702, 704, and 706, respectively. The auditing system can be configured to detect these differences on future expense submissions (e.g., for the particular company, that are associated with the particular vendor, etc.) and to treat multiple-copy split-bill receipts as different receipts if the different receipts have a distinguishing field (e.g., customer number, transaction number, a customer sub total amount in addition to an overall total amount, etc.).

For instance, a database 734 includes, after a model has been changed to handle recognizing different customer numbers on split bills, records 736, 738, and 740 in example records 742, corresponding to the receipts 702, 704, and 706 (or similar receipts), respectively. The record 736 includes a compound key 744 that now (as compared to the compound key 726) includes a user identifier value (e.g., user1). In some implementations, the compound key 744 and other compound keys used in the database 734 include a user identifier value, as shown, to distinguish the records 736, 738, and 740 from one another. For example, the compound key 744 may be a database table primary key and the user identifier field may be necessary to distinguish records for multiple copies of split-bill receipts. As another example, in some implementations, the compound key includes distinguishing values extracted from the receipts themselves (e.g., "cust1," "cust2," "cust3" values). As yet another example, in some implementations, information (e.g., user identifier, customer number, transaction number) that distinguishes split-bill receipts is not stored in a compound key, but is rather stored in other field(s) of respective records. The compound key may not be strictly used as a database table primary key, for example.

In some examples, hand-written notes written on receipts is used to distinguish receipts that may otherwise be flagged as duplicates. For instance, the employees may have written their names on their respective receipts. In some implementations, hand-written information, as well as printed information, is extracted as tokens when tokens are extracted from the receipt. In some implementations, detection of hand-written items on a receipt results in the receipt being sent for secondary (e.g., manual) review. For instance, a handwritten note may not automatically result in an otherwise duplicate receipt being accepted. A secondary review may be required, for example, to protect against fraud.

Figure 8:
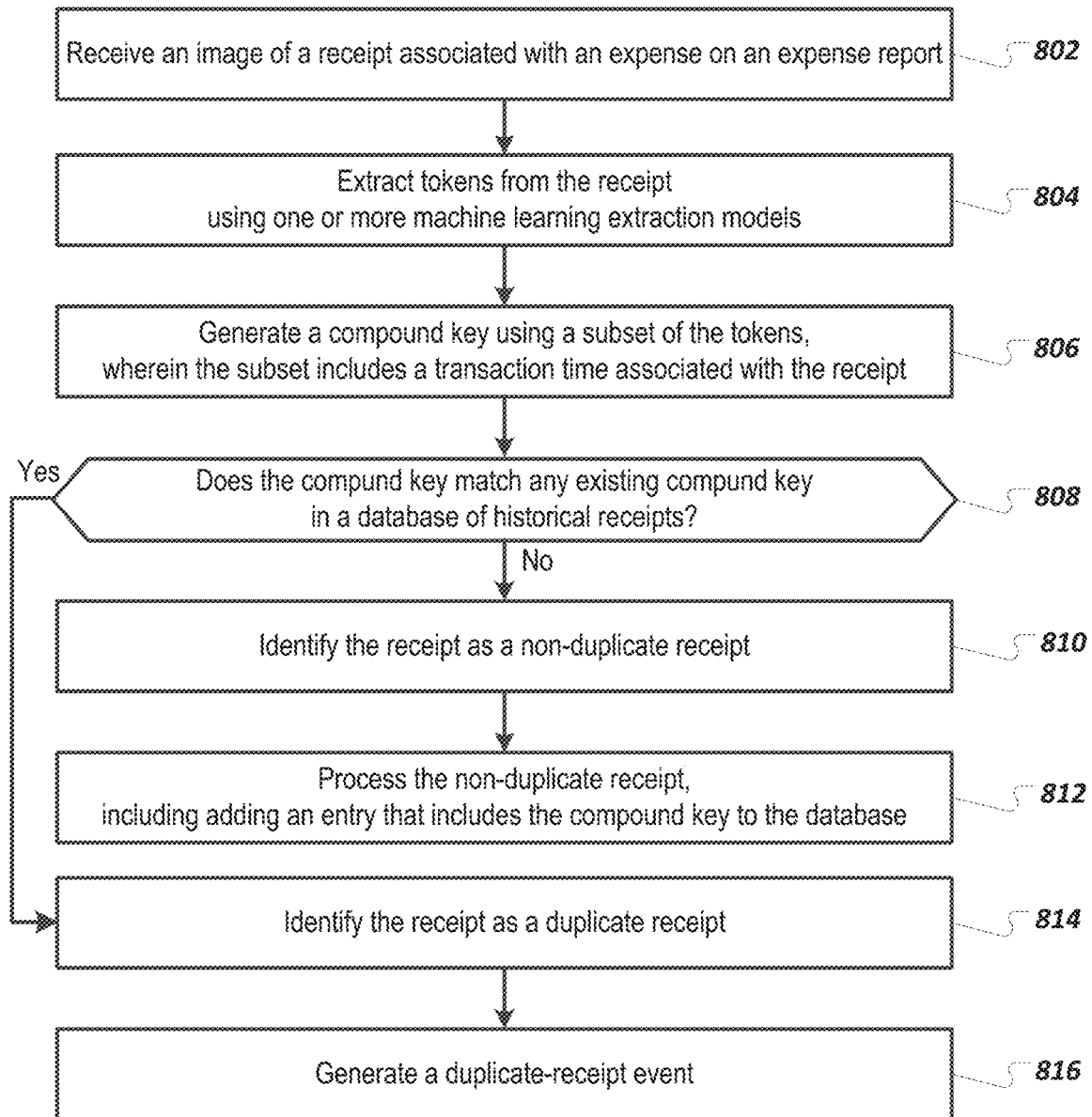
FIG. 8 is a flowchart of an example method for detecting a duplicate receipt.

FIG. 8 is a flowchart of an example method 800 for detecting a duplicate receipt. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 100 described above with respect to FIG. 1. For example, the method 800 and related methods can be executed by the duplicate receipt detector 139 of FIG. 1.

The method 800 can be performed for each receipt that is associated with an expense report, for example. Each entry in the expense report can be associated with a receipt. A given receipt may be associated with one or more expenses.

At 802, an image of a receipt associated with an expense on an expense report is received.

At 804, tokens are extracted from the receipt using one or more machine learning extraction models.

At 806, a compound key is generated using a subset of the tokens. The subset includes a transaction time associated with the receipt. The compound key can include, in addition to the transaction time, an amount, a vendor name, and a vendor location. The transaction time can be an aggregation of a date token and a time token extracted from the receipt.

In some implementations, generating the compound key can include generating a one-way, non-reversible hash value using the subset of tokens. A hash value can be used to alleviate privacy concerns, for example. When a hash value is used, the hash value, rather than actual items on the receipt, can be stored. Accordingly, a database that stores compound keys can be configured to not store data that may be directly attributable to a user.

At 808, a determination is made as to whether the compound key matches any existing compound key in a database of historical receipts.

At 810, in response to determining that the compound key does not match any existing compound keys, the receipt is identified as a non-duplicate receipt.

At 812, the non-duplicate receipt is processed, also in response to determining that the compound key does not match any existing compound keys. Processing includes adding an entry that includes the compound key to the database. Processing can include handling the expense as a valid expense and initiating a reimbursement to the user who submitted the image.

At 814, in response to determining that the compound key matches an existing compound key, the receipt is identified as a duplicate receipt.

At 816, a duplicate receipt event is generated, also in response to determining that the compound key matches an existing compound key. One or more actions can be performed in response to the duplicate receipt event.

The one or more actions can include providing a duplicate receipt notification to a user who provided the image. The duplicate receipt notification can be provided to the user before or after the expense report is submitted. The duplicate receipt notification can be provided to the user as the user is creating the expense report but before the expense report has been submitted, for example. The one or more actions can include sending a duplicate receipt notification to a manager of the user. The one or more actions can include rejecting the expense based on the duplicate receipt event.

The one or more actions can include performing a secondary analysis of the receipt in response to the duplicate receipt event. The secondary analysis can include performing an automated process to further analyze the extracted tokens. As another example, the secondary analysis can include performing a manual review of the image.

The secondary analysis can include determining that the duplicate receipt event comprises a false positive identification of a duplicate receipt. The secondary analysis can include determining a condition of the receipt that caused the false positive identification and configuring a machine learning engine to not identify a future receipt with the condition as a duplicate receipt. Configuring the machine learning engine can include configuring the machine learning engine to extract other, additional tokens that can be used to differentiate receipts that previously may have been identified as duplicates.

The existing compound key that matches the compound key can be associated with a receipt submitted by a user who provided the image. That is, if a same user submits multiple duplicate receipts, duplicate receipts after a first submission can be detected as duplicate receipts. The existing compound key that matches the compound key can be associated with a receipt submitted by a different user than a user who provided the image. That is, two different users can submit duplicate receipts, with a first user submitting a receipt first, and a second user submitting a duplicate receipt after the first user. The receipt submitted by the second user can be detected as a duplicate receipt. The second user's submission can be detected as a duplicate receipt even when the extracted tokens or compound keys generated from the submitted receipts do not include a user identifier.

The different user can be associated with a different entity than the user who provided the image. That is, two different users at two different companies can submit a same receipt, with a first user from a first company submitting the receipt first, and a second user from a second company submitting a duplicate receipt after the first user. The receipt submitted by the second user can be detected as a duplicate receipt. The second user's submission can be detected as a duplicate receipt even when the extracted tokens or compound keys generated from the submitted receipts do not include a company identifier or a user identifier.

Figure 9:
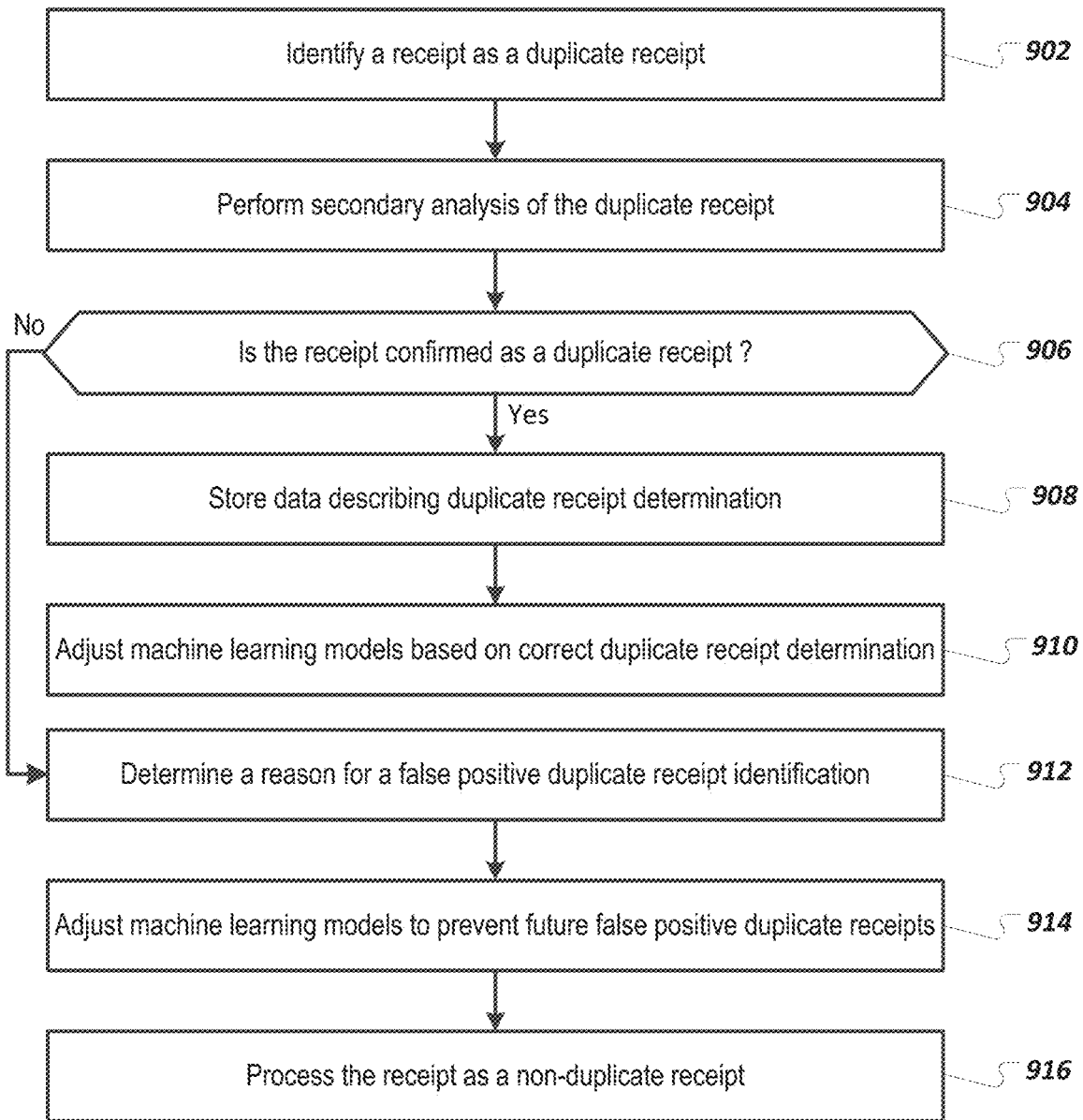
FIG. 9 is a flowchart of an example method for performing secondary analysis upon detection of a duplicate receipt.

FIG. 9 is a flowchart of an example method 900 for performing secondary analysis upon detection of a duplicate receipt. It will be understood that method 900 and related methods may be performed, for example, by any suitable system, environment, software, and hardware, or a combination of systems, environments, software, and hardware, as appropriate. For example, one or more of a client, a server, or other computing device can be used to execute method 900 and related methods and obtain any data from the memory of a client, the server, or the other computing device. In some implementations, the method 900 and related methods are executed by one or more components of the system 100 described above with respect to FIG. 1. For example, the method 900 and related methods can be executed by the duplicate receipt detector 139 of FIG. 1.

The method 900 can be performed each time a receipt is identified as a duplicate receipt. The method 900 can be performed for each receipt that is associated with an expense report, for example. Each entry in the expense report can be associated with a receipt. A given receipt may be associated with one or more expenses.

At 902, a receipt is identified as a duplicate receipt. For instance, a compound key for the receipt can match a compound key for a previously-submitted receipt.

At 904, a secondary analysis of the duplicate receipt is performed. The secondary analysis can be performed each time a duplicate receipt is identified, or can be performed when some other condition is met. For instance, a secondary analysis can be performed if more than a threshold number of duplicate receipts have been identified (e.g., in a particular time period, for a particular user, for a particular client/company, for a particular vendor, for a particular type of expense, for a particular amount of expense, or for some combination of these factors). The secondary analysis can be to confirm whether the receipt is a duplicate receipt. The secondary analysis can be a manual review, for example, or execution of an automated process.

At 906, a determination is made as to whether the receipt has been confirmed as a duplicate receipt.

At 908, in response to determining that the receipt has been confirmed as a duplicate receipt, data describing the duplicate receipt determination is stored. For instance, the following can be stored: tokens extracted from the duplicate receipt, a compound key generated for the duplicate receipt, and a compound key of an existing receipt that matched the compound key generated for the duplicate receipt.

At 910, one or more machine learning models are adjusted based on a confirmed duplicate receipt determination. For instance, one or more weights or parameters may be adjusted. As more and more receipts are confirmed as duplicates, for same reason(s), weights or parameters may be increased to reflect a higher confidence that detecting duplicate receipts for those reasons is an accurate determination. Adjusting weights or parameters can increase a likelihood of a future determination of a duplicate receipt for those same reasons.

At 912, in response to determining that the receipt has not been confirmed as a duplicate receipt, a reason for a false-positive duplicate receipt identification is determined. For example, one or more conditions or characteristics of a duplicate receipt, or an existing receipt that had been incorrectly matched to the receipt, can be identified.

At 914, one or more machine learning models are adjusted to prevent (or reduce) future false-positive duplicate receipts for a same reason as why the receipt was incorrectly identified as a duplicate receipt. For instance, a machine learning model can be adjusted to identify information in a receipt that would differentiate the receipt from existing receipts (e.g., where the information may not have been previously identified).

At 916, the receipt is processed as a non-duplicate receipt. For instance, the receipt can be approved for reimbursement processing for the user who submitted the receipt.

FIG. 10 is a list 1000 of example policies. Example policies can include for example, an itemized receipt policy 1002, a traveler name on receipt policy 1004, a valid tax receipt policy 1006, a no collusion policy 1008, a no personal services policy 1010, a no personal items policy 1012, a no personal entertainment policy 1014, a no traffic/parking violations policy 1016, a no penalty ticket fee policy 1018, a no companion travel policy 1020, a no travel insurance policy 1022, a no excessive tips policy 1024, a no premium air seating policy 1026, a no add-on air charges policy 1028, a no premium car class policy 1030, a no add-on car rental charges policy 1032, a no add-on hotel charges policy 1034, a no alcohol policy 1036, a no pet care, child care, elder care, or house sitting policy 1038, a no late, interest, or delinquency charges policy 1040, a no health club or gym charges policy 1042, and a no car washes policy 1044.

Other policies can be added/defined. Policies can be deleted or modified. A particular entity can select a subset of policies and add, change or deselect policies, at any point in time. Each policy can have a corresponding policy model. Each policy model can be trained using historical data (which may in part come from prior manual review), that includes historical receipt and an audit policy decision (policy violation, policy compliance) for each receipt.

Figure 11:
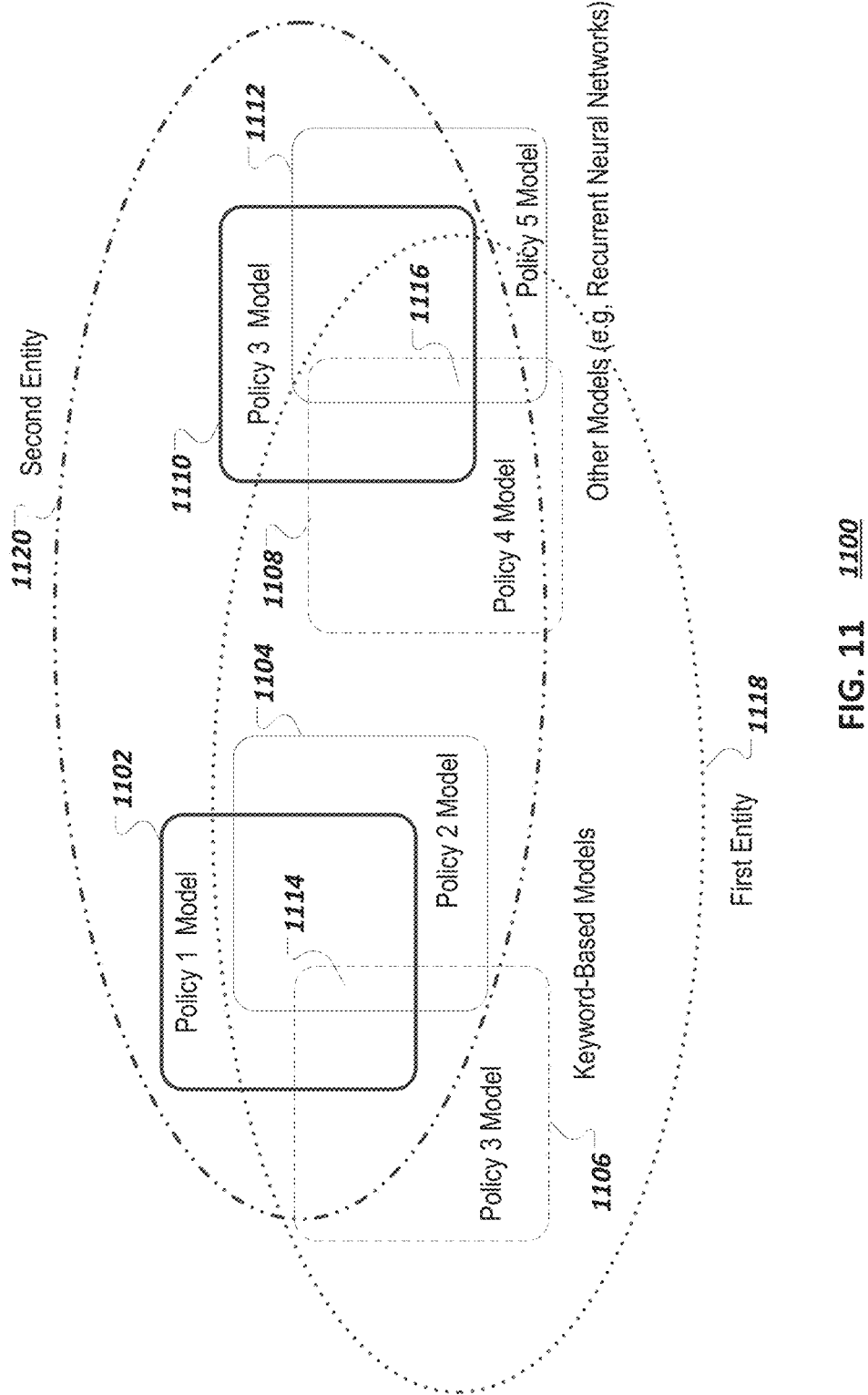
FIG. 11 is a conceptual diagram illustrating relationships between policies, policy models, and entities.

FIG. 11 is a conceptual diagram 1100 illustrating relationships between policies, policy models, and entities. Each policy can have a separate machine learning policy model. Policy models can be of different types. For instance, policies 1102, 1104, and 1106 are keyword-based models which are trained to find specific samples (e.g., keywords) of text in receipt text. As another example, policies 1108, 1110, and 1112 are recurrent neural network models that are trained to analyze whole receipt text character by character and make a determination about whether the receipt passes or fails a particular policy. Other types of models can be used. In some implementations and for some sets of models, similar models can share logic. For instance, the keyword-based models 1108, 1110, and 1112 can have common logic, as illustrated conceptually by a common area 1114. As another example, the recurrent neural network models 1108, 1110, and 1112 can have common logic, as illustrated conceptually by a common area 1116.

Each particular entity can choose or define a particular set of policies to use for expense processing. Corresponding models for those policies can be used when receipts are processed for the entity. For example, a first entity 1118 has chosen the policies 1104, 1106, and 1108. As another example, a second entity 1120 has chosen the policies 1102, 1104, and 1110.

Figure 12:
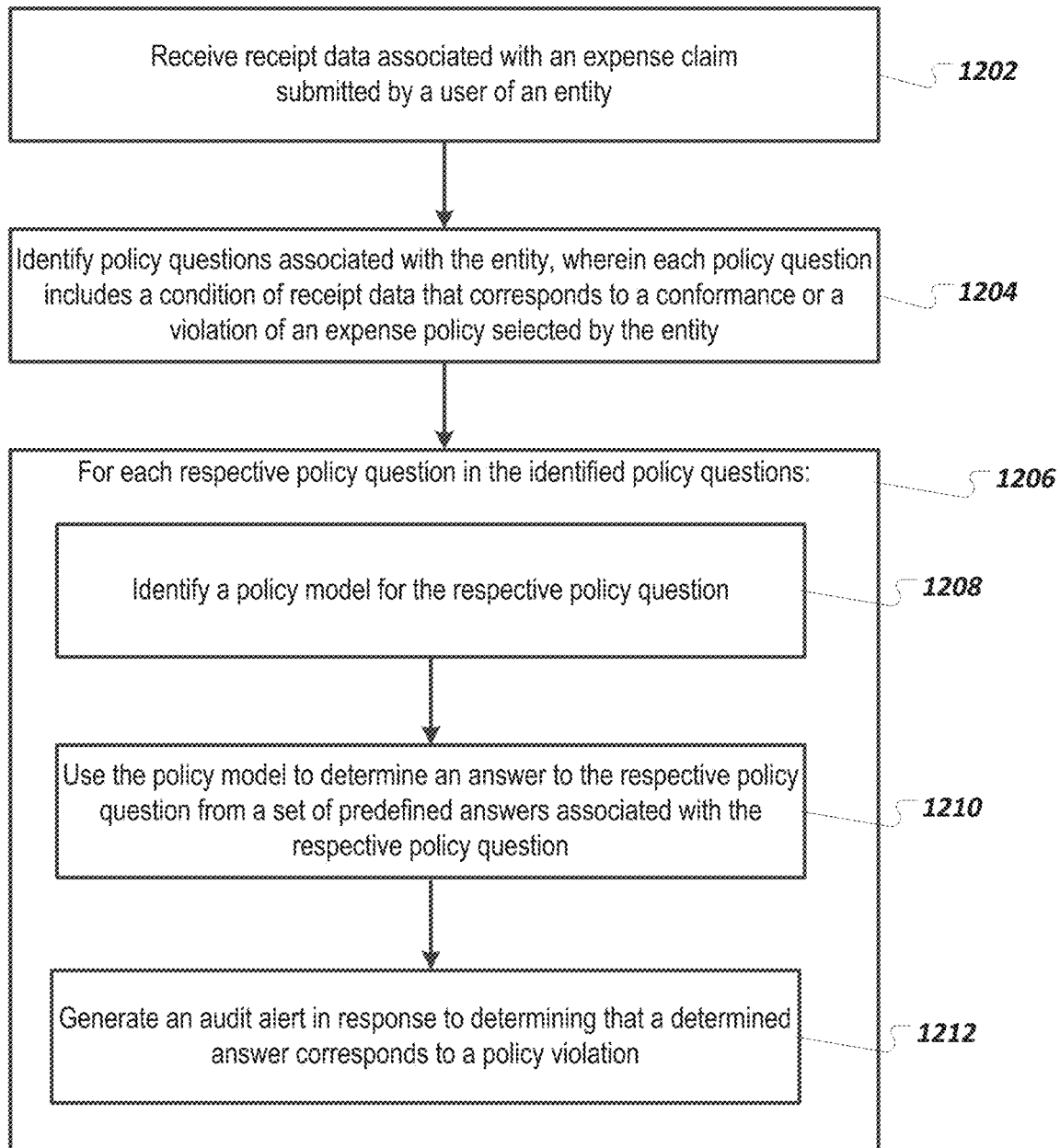
FIG. 12 is a flowchart of an example method for performing a policy audit.

FIG. 12 is a flowchart of an example method 1200 for performing a policy audit. It will be understood that method 1200 and related methods may be performed, for example, by any suitable system, environment, software, and hardware, or a combination of systems, environments, software, and hardware, as appropriate. For example, one or more of a client, a server, or other computing device can be used to execute method 1200 and related methods and obtain any data from the memory of a client, the server, or the other computing device. In some implementations, the method 1200 and related methods are executed by one or more components of the system 100 described above with respect to FIG. 1. For example, the method 1200 and related methods can be executed by the policy audit service 114 of FIG. 1.

At 1202, receipt data associated with an expense claim submitted by a user of a first entity is received. For example, a user may be working on or may have submitted an expense report. The receipt data may include tokens extracted from receipt text generated from an image of a receipt submitted with the expense report.

At 1204, policy questions associated with the first entity are identified. Each policy question includes a condition of receipt data that corresponds to a conformance or a violation of an expense policy selected by the first entity. For example, a policy can be a no alcohol policy which prohibits alcohol expenses from being reimbursable. The condition of receipt data for the no alcohol policy can be that an alcohol item on the receipt that is included in a claimed amount is a violation of the no alcohol policy. The policy questions associated with the first entity include standard policy questions common to multiple entities and/or custom policy questions specific to the first entity.

At 1206, processing is performed for each respective policy question in the identified policy questions.

At 1208, a policy model for the respective policy question is identified. The policy model for the respective policy question can be trained based on historical receipt data and historical determination of answers to the respective policy question. The historical determination of answers to the respective policy question can be answers that have been determined, based on the historical receipt data, by human auditors. The historical receipt data can include information from multiple entities. The multiple entities can include a second entity that is different from the first entity. For some policy questions, a policy model may not exist or may not otherwise be successfully identified. In such examples, the receipt data can be forwarded for processing by a second (e.g., manual) review process. In some examples, different policy questions that have a same semantic meaning are mapped to a same policy model (e.g., a same policy model can be identified for different, but semantically equivalent policy questions).

The identified policy model can be a keyword-based policy model. The keyword-based model can be configured to identify one or more keywords in the receipt data. The keyword-based model can be trained by a human administrator, and/or automatically based on automatic analyzing of historical receipts known to be in violation of or in compliance with the expense policy associated with the respective policy question.

The identified policy model can be a neural network (e.g., recurrent neural network) policy model. The neural network model can be configured to perform character analysis of the receipt data to identify features that indicate a policy violation or a policy conformance.

At 1210, the policy model is used to determine an answer to the respective policy question from a set of predefined answers associated with the respective policy question.

At 1212, in response to determining that a determined answer corresponds to a policy violation, an audit alert is generated.

Figure 13:
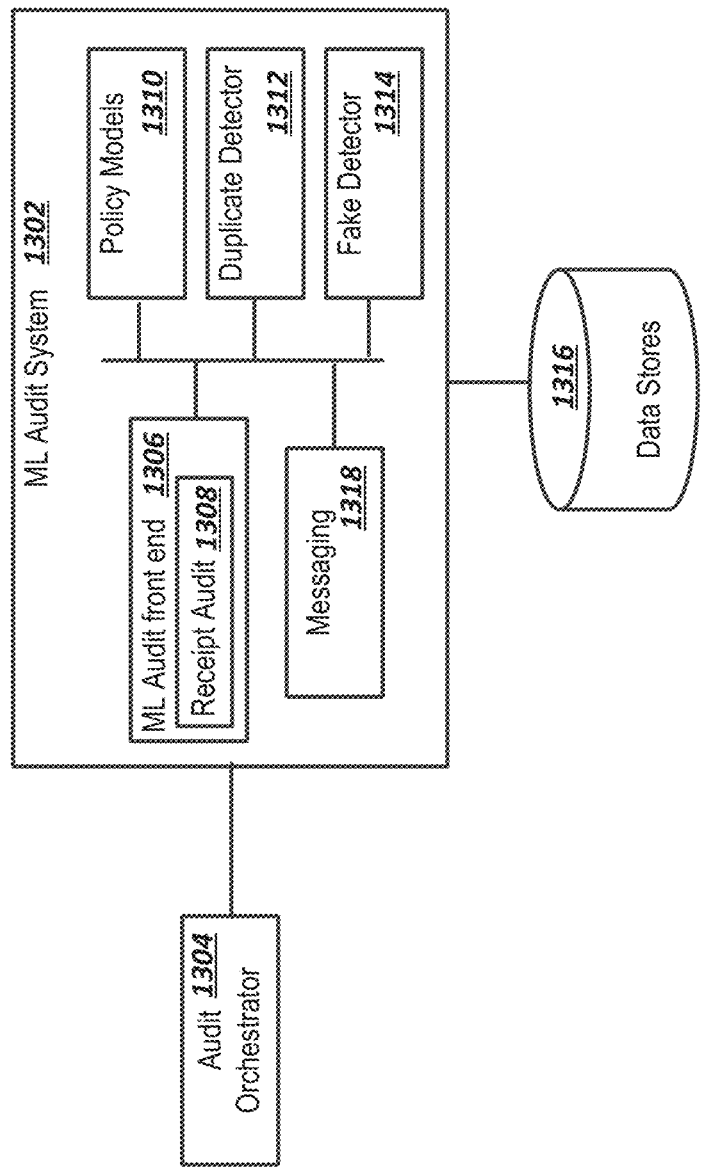
FIG. 13 illustrates an example system for receipt auditing.

FIG. 13 illustrates an example system 1300 for receipt auditing. The system 1300 includes various components. A ML (Machine Learning) audit system 1302 can receive audit requests from an audit orchestrator 1304. For example, a ML audit front end 1306 can receive the audit requests and can perform initial processing, including, for example, a receipt audit 1308. Other auditing activities can be initiated. For instance, policy models 1310 can be used for policy audit(s). As another example, a duplicate receipt detector 1312 can detect duplicate receipts. A fake receipt detector 1314 can perform an audit to determine whether a receipt is a fake receipt (e.g., a receipt image generated by a computer program rather than a legitimate image of a physical receipt). Various components can store data in one or more data stores 1316. Components can communicate with each other using a messaging infrastructure 1318.

FIGS. 14A and 14B illustrate examples of a machine-generated receipt image 1402 and an authentic receipt image 1404, respectively. The authentic receipt image 1404 can be an image captured by a camera, for example. A natural process of a camera taking a picture of a physical piece of paper can result in various specific properties in a resultant image that can be difficult for a machine-generated process to duplicate. For example, the authentic receipt image 1404 includes variations in shading, due to natural light and shadows and due to other factors, such an angle of camera capture or wrinkles or folds in the paper receipt. For instance, text items 1406 and 1408 may have different shading than other items in the authentic receipt image 1404 due to a wrinkle in the paper receipt (e.g., corresponding to a wrinkle line 1410 in the authentic receipt image 1404). Other wrinkles corresponding to wrinkle lines 1412, 1414, and 1416 can result in variances in shading in other areas of the authentic receipt image 1404, such as areas 1418 and 1420. The authentic receipt image 1404 can include other features, such as variations in pixel intensity at the edges of the authentic receipt image, due to unevenness of the edges of a paper receipt and natural lighting factors, for example. Other features are discussed in more detail below.

A machine-generated process, such as one used to create the machine-generated receipt image 1402, may attempt to duplicate some of the shading, color, and pixel intensity variations found in a camera-captured image (e.g., to mimic a photographic process). For instance, a machine generated process may attempt to add blurring, a change in white space, or a change in color intensities in certain areas of a receipt. For example, a machine-generated process may attempt to modify pixel values at edges 1422 or 1424, or modify pixel intensity, color values etc., in areas 1426 or 1428 to mimic shadows or shading. However, as discussed below, a fake receipt detector can be configured to detect fake receipts at an acceptable degree of accuracy, by identifying and analyzing multiple features, and different combinations of features, for example pre-engineered features or features that are automatically learned by machine learning models.

Figure 15:
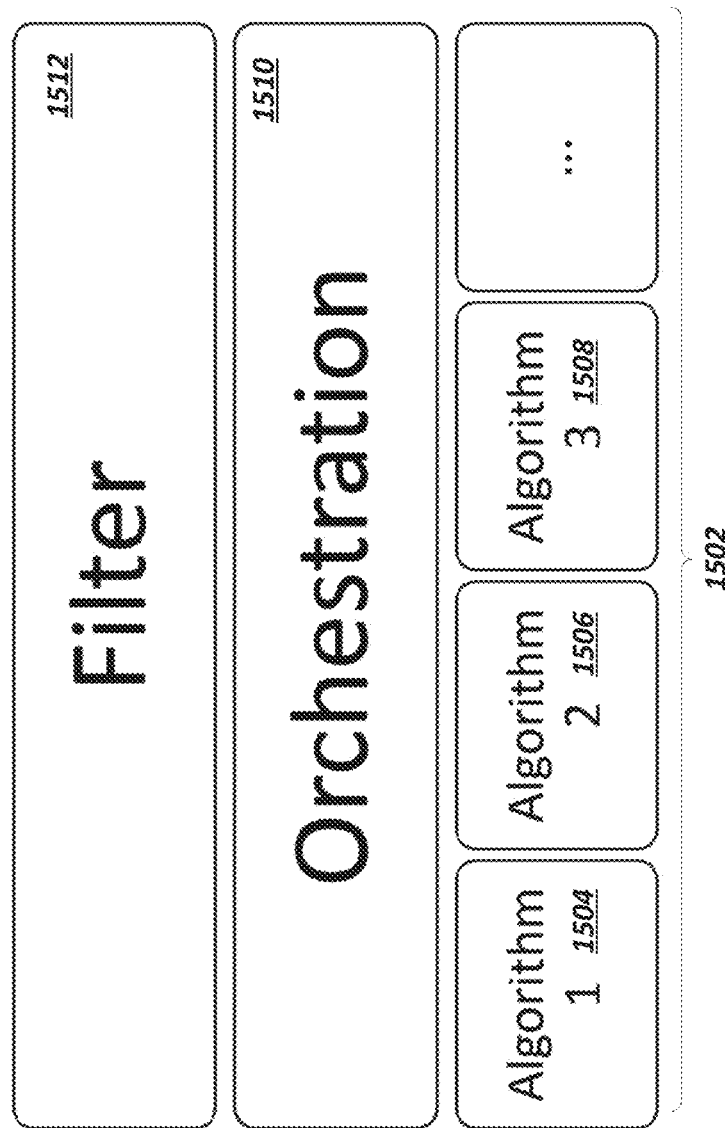
FIG. 15 illustrates an example system for receipt image verification.

FIG. 15 illustrates an example system 1500 for receipt image verification. An algorithm layer 1502 includes a variety of algorithms (e.g., a first algorithm 1504, a second algorithm 1506, and a third algorithm 1508). Each algorithm in the algorithm layer 1502 can process an image and identify one or more features that are unique/specific to a valid image or an invalid image. For example, the algorithms in the algorithm layer 1502 can identify features that correspond to either an image of a printed document or an automatically created image of a document. Features can include, for example, aspects of edges of the document, white space balance, color distribution, etc. Other features, and specific algorithms, are discussed in more detail below.

In an orchestration layer 1510, results of the algorithm layer 1502 algorithms for a given image are collected and can be processed using one or more machine learning models, such as Linear Regression or other type(s) of models. The algorithm layer 1502 algorithm results can be fed into the model(s) to generate an output/decision regarding whether the image is valid or invalid. For instance, the model(s) can be used to generate a decision regarding whether the image is a fake (e.g., artificially generated) document or an image of a printed document.

In some implementations, a filter layer 1512 is used. The filter layer 1512 can include one or both of whitelist or blacklist mechanisms, for example. In some cases, there can be exceptions that may override (or reinforce) processing results of the orchestration layer 1510 and/or the algorithm layer 1502. For example, certain documents that are created automatically may be considered valid (e.g., if associated with a certain source, such as a source that is known to create electronic versions of documents and provide those documents to users, e.g., as a normal course of business). For instance, a ride sharing service may only provide electronic receipts, either as a generated image or as an email document, for example. The system can use the filter layer 1512, and e.g., a whitelist mechanism, to classify the electronic documents as valid, even if those documents are (or would be) classified as invalid in the orchestration layer 1510 (or by one or more of the algorithms in the algorithm layer 1502).

The sources of valid electronic documents generally do not try to fraudulently mimic a photographic process. As such, one or more mechanisms can be employed to prevent electronic documents of valid types, and from valid sources, as being classified as invalid. The valid electronic documents can be excluded from machine learning training, or can be included in machine learning training but with a predetermined classification (e.g., not fake). The filtering layer 1512 can be employed as a pre-process (e.g., identifying electronic documents as valid before sending to other layers for processing), a post-process (e.g., finalizing a decision in the filter layer 1512 after other processing has been performed), or a combination of a pre-process and a post-process (e.g., with certain filter processing performed before other-layer processing and other filter processing performed after other-layer processing).

In general, by using the filter layer 1512, certain types of receipts can be excluded from fake receipt evaluation. For example, an email receipt can be excluded from certain types of fake receipt processing based on a receipt format (e.g., email/text vs. submitted image). Receipts or other images that are whitelisted or otherwise excluded from certain types of fake receipt processing can still be processed by other types of audits (e.g., duplicate receipt auditing, policy auditing, general receipt auditing).

Figure 16:
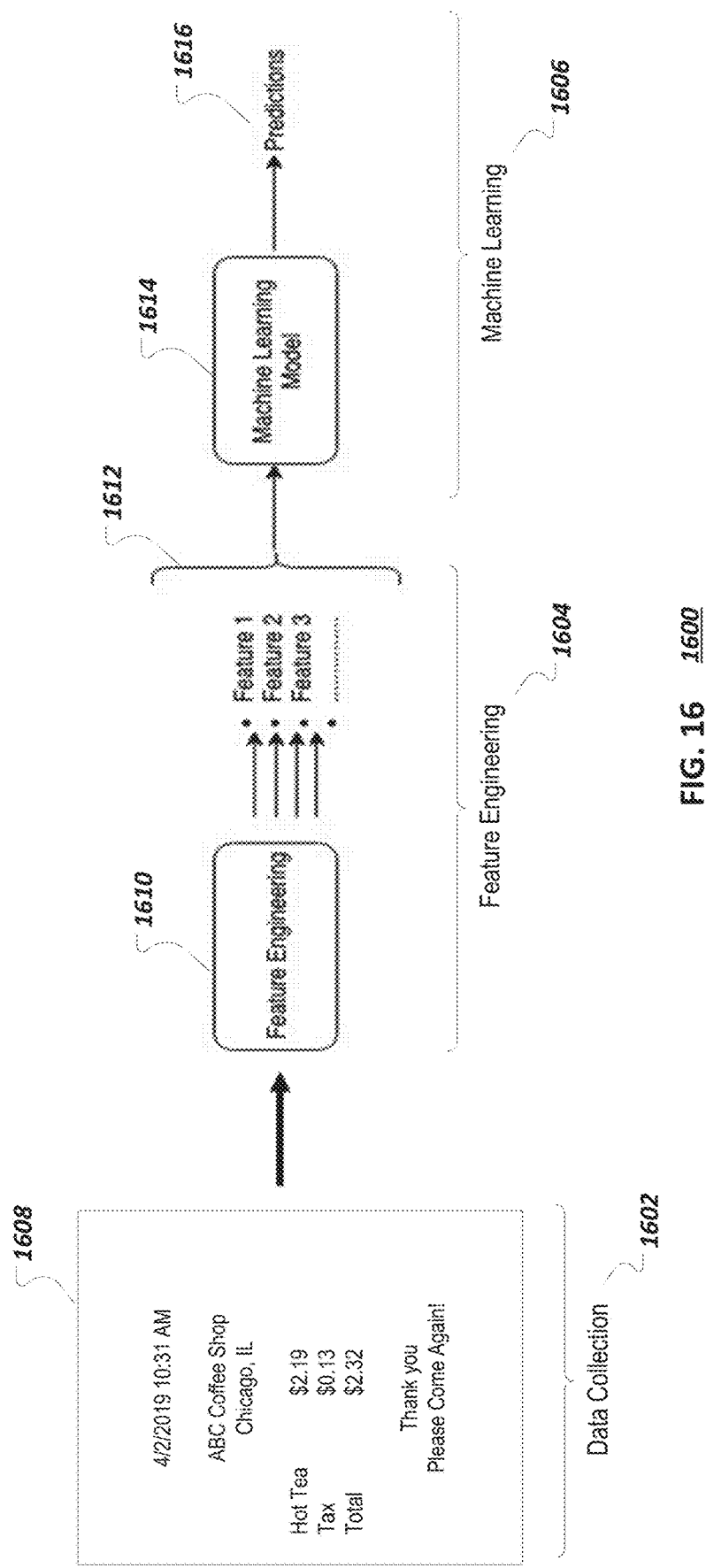
FIG. 16 illustrates an example system for classifying an image using one or more machine learning models.

FIG. 16 illustrates an example system 1600 for classifying an image using one or more machine learning models. The system includes a data collection layer 1602, a feature engineering layer 1604, and a machine learning layer 1606. During data collection, representative images which belong to either a fraudulent-image class or an authentic-image class can be acquired. For example, an authentic receipt 1608 is acquired. Authentic images can be obtained from actual transactions. Fraudulent images can be generated, for example, using fraudulent image generation tools. An overall split of fraudulent images and authentic images can be selected so as to mimic a typical scenario as far as a ratio of fraudulent receipts to authentic receipts. Accordingly, the gathered data can have relatively few fake images as compared to authentic images.

The feature engineering layer 1604 can include a feature engineering component 1610 that performs feature identification and detection. For example, image analysis can be performed on fraudulent images to generate features from the known fraudulent images. Similarly, image analysis can be performed on authentic images to generate features from the known authentic images. As described below, feature engineering can include generation and execution of algorithms that identify features. As another example, a neural network can learn features that are specific to either fraudulent or authentic images.

The machine learning layer 1606 can leverages features 1612 provided or determined by the feature engineering layer 1604. For example, one or more machine learning models 1614, through training and analysis, can be used to determine which of the features 1612 are best (e.g., most efficient, accurate) for detecting fake images. The machine learning model(s) 1614 can learn which features can be used for prediction, e.g., to classify an image as fake or authentic.

The machine learning model(s) can include composite features that are combinations of the features 1612. A composite feature may be better at prediction that using an individual feature. For example, a fraudulent image generator may attempt to account for one or more features (e.g., to avoid a feature typically in a fake image or to insert a feature typically in an authentic image). However, a given generator may not be successful at accounting for all features, composite and otherwise, used by the machine learning model(s) 1614. Accordingly, by using multiple (and composite) features, a probability that a fake image is detected is increased, as compared to just testing for individual features.

In some implementations, the machine learning layer 1606 uses logistic regression as a predictive modeling technique for learning from derived features. The machine learning layer 1606 can attempt to learn a relationship between the features 1612 and/or composite features, and fake and authentic image labels. The machine learning layer 1606 can learn these relationships and then make predictions 1616 on new/unseen data (e.g., a new image to classify). For example, a classification output can indicate whether an image is fake or authentic. The classification output can be or include a probability score that reflects the probability of the image belonging to either of the two fake/authentic classes.

Figure 17:
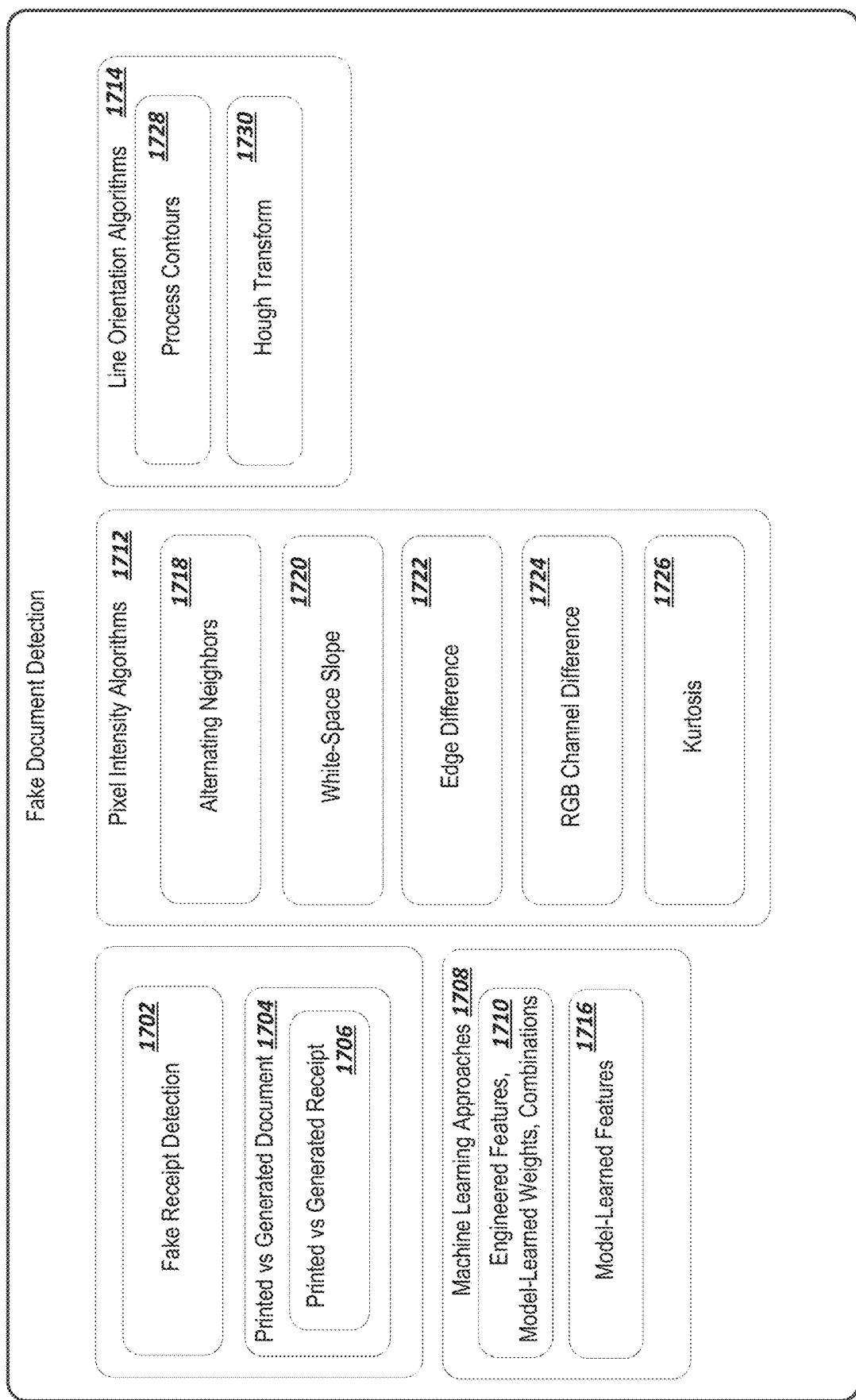
FIG. 17 illustrates example components of a system for fake document detection.

FIG. 17 illustrates example components of a system 1700 for fake document detection. Fake document detection can include fake receipt detection 1702 or detection of other types of fake documents. Fake document detection can include detecting a printed (e.g., authentic) vs generated (e.g., fake) document (e.g., 1704). For example, a printed vs generated receipt detection 1706 can be performed, with a printed receipt (e.g., an image of a hardcopy receipt) being recognized as a legitimate receipt and a generated receipt (e.g., an image that has been programmatically generated in an attempt to look like a printed receipt) being recognized as a fake receipt.

Detection of fake documents can include different types of machine learning approaches 1708. For instance, various features 1710 can be engineered (e.g., developed, or identified). For instance pixel intensity algorithms 1712 can be used to generate and/or detect pixel-based features. As another example, line orientation algorithms 1714 can be used to generate and/or detect line-orientation based features. Machine learning models can be used to determine which engineered features 1710 are most accurate in predicting fake receipts. In some examples, multiple features can be detected or tested for, when a document, to determine whether the document is legitimate or fake.

The machine learning models can learn which features are best predictors, which combination of features to test for, and what weights to use for feature scores for various features (e.g., when different features are detected), to generate an overall prediction for an analyzed document with regards to the authenticity of the document. As another example, some machine learning models, such as neural network models, can learn or identify document features 1716 (e.g., features that may not have otherwise been known or engineered) that may be useful and/or accurate in predicting whether a document is fake or legitimate.

A neural network model can determine and detect the document features 1716 (e.g., model-learned features) as a special signature that can be used to distinguish generated fake images from authentic images. The signature can be determined using, for example, a deep neural network training procedure. The signature can be detected, for example, using a deep neural network inference procedure that includes passing a target image through a trained neural network to classify the target image. The training procedure and inference procedure are described in more detail below.

Various types of pixel intensity algorithms 1712 can be used. The pixel intensity algorithms 1712 can example pixel intensity values of a document or image in various ways. A pixel intensity value can be based on one or more color channels. For instance, a pixel intensity value can be an R (e.g., Red) color channel value, a G (e.g., Green) channel value, a B (e.g., Blue) channel value, or a sum of two or more of the R, G, or B channel values. With RGB values, if each of the R, G, and B values are 255, then the composite RGB value represents the color white. If one or more of the RGB values are a value other than 255, the composite RGB value represents some other color.

As an example of a pixel intensity algorithm, an alternating neighbors algorithm 1718 can create features based on differences between alternating row pixel values in an image. As another example, a whitespace-slope algorithm 1720 is designed to determine how white space changes on an image as the image is examined from top to bottom. An edge difference algorithm 1722 can create features related to pixel values at the edges of an image. A RGB channel difference algorithm 1724 can create feature(s) by finding the difference between e.g., Red and Green channels of every pixel in an image, determining a histogram frequency of those values, and returning a peak value of the histogram. A kurtosis algorithm 1726 can create features related to distribution of values at tail ends of a histogram distribution of image pixels.

Various types of line orientation algorithms 1714 can be used. For instance, a process contours algorithm 1728 can include line orientation tests on contours identified in an image. As another example, a Hough transform algorithm 1730 can include line orientation tests on lines identified in an image using a transform.

Figure 18:
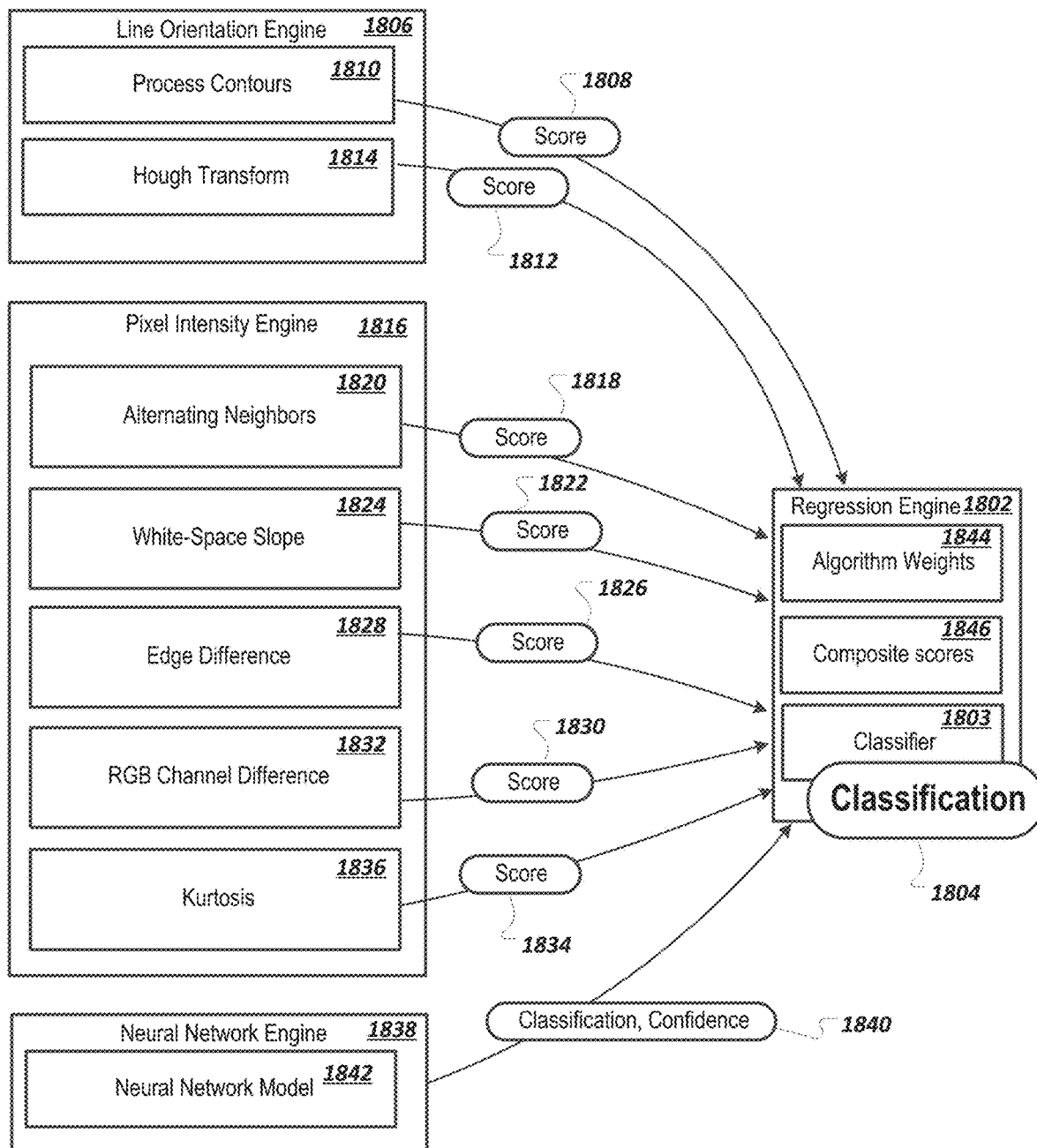
FIG. 18 illustrates a system for classifying an image based on multiple scores from multiple algorithms.

FIG. 18 illustrates a system 1800 for classifying an image based on multiple scores from multiple algorithms. A regression engine 1802 can use a classifier 1803 to generate a classification 1804 for an image based on a plurality of scores received from different engines. For example, a line orientation engine 1806 can provide a contours-related score 1808 generated by a process contours algorithm 1810 and a Hough transform score 1812 generated by a Hough transform algorithm 1814. As another example, a pixel intensity engine 1816 can provide an alternating neighbors score 1818 generated by an alternating neighbors algorithm 1820, a white-space slope score 1822 generated by a white-space slope algorithm 1824, an edge difference score 1826 generated by an edge difference algorithm 1828, a RGB channel difference score 1830 generated by a RGB channel difference algorithm 1832, and a kurtosis score 1834 generated by a kurtosis algorithm 1836. As yet another example, a neural network engine 1838 can provide a classification 1840 (with an associated confidence) generated by a neural network model 1842.

The regression engine 1802 can learn, over time, algorithm weights 1844 for weighting some received scores higher than other scores. As another example, the regression engine 1802 can define and use composite scores 1846 based on learning that certain combinations of scores are better at prediction than other combinations or than separate individual scores.

Figure 19:
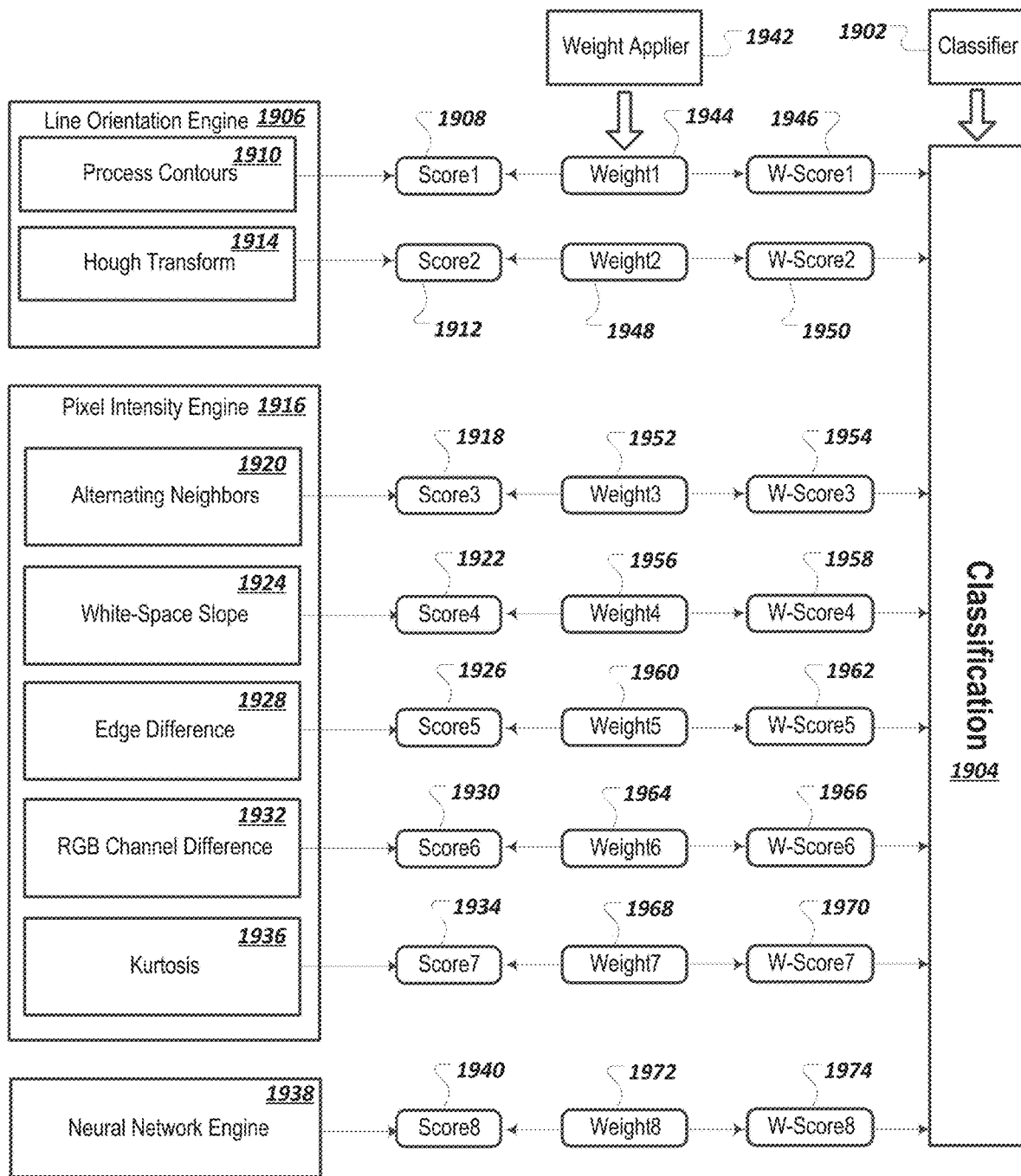
FIG. 19 illustrates a system for generating a classification based on weighted scores.

FIG. 19 illustrates a system 1900 for generating a classification based on weighted scores. A classifier 1902 can generate a classification 1904 based on weighted scores that are generated by application of weights to scores received from various engines. As mentioned above, a line orientation engine 1906 can provide a contours-related score 1908 generated by a process contours algorithm 1910 and a Hough transform score 1912 generated by a Hough transform algorithm 1914; a pixel intensity engine 1916 can provide an alternating neighbors score 1918 generated by an alternating neighbors algorithm 1920, a white-space slope score 1922 generated by a white-space slope algorithm 1924, an edge difference score 1926 generated by an edge difference algorithm 1928, a RGB channel difference score 1930 generated by a RGB channel difference algorithm 1932, and a kurtosis score 1934 generated by a kurtosis algorithm 1936; and a neural network engine 1938 can provide a score 1940 (e.g., a classification with a confidence value) that was generated by a neural network model.

A regression engine can determine (or access), assign, and adjust weights for different algorithms. Some algorithms may be deemed more important or more accurate for predicting whether an image is authentic, for example. For example, a weight applier 1942 can apply a first weight 1944 to the contours-related score 1908 to generate a first weighted score 1946, apply a second weight 1948 to the Hough transform score 1912 to generate a second weighted score 1950, apply a third weight 1952 to the alternating neighbors score 1918 to generate a third weighted score 1954, apply a fourth weight 1956 to the white-space slope score 1922 to generate a fourth weighted score 1958, apply a fifth weight 1960 to the edge difference score 1926 to generate a fifth weighted score 1962, apply a sixth weight 1964 to the RGB channel difference score 1930 to generate a sixth weighted score 1966, apply a seventh weight 1968 to the kurtosis score 1934 to generate a seventh weighted score 1970, and apply an eighth weight 1972 to the score 1940 to generate an eighth weighted score 1974. As mentioned, composite scores can be used, and weights can also be used for composite scores, since some combinations of scores may be more useful for prediction than other combinations of scores.

Figure 20:
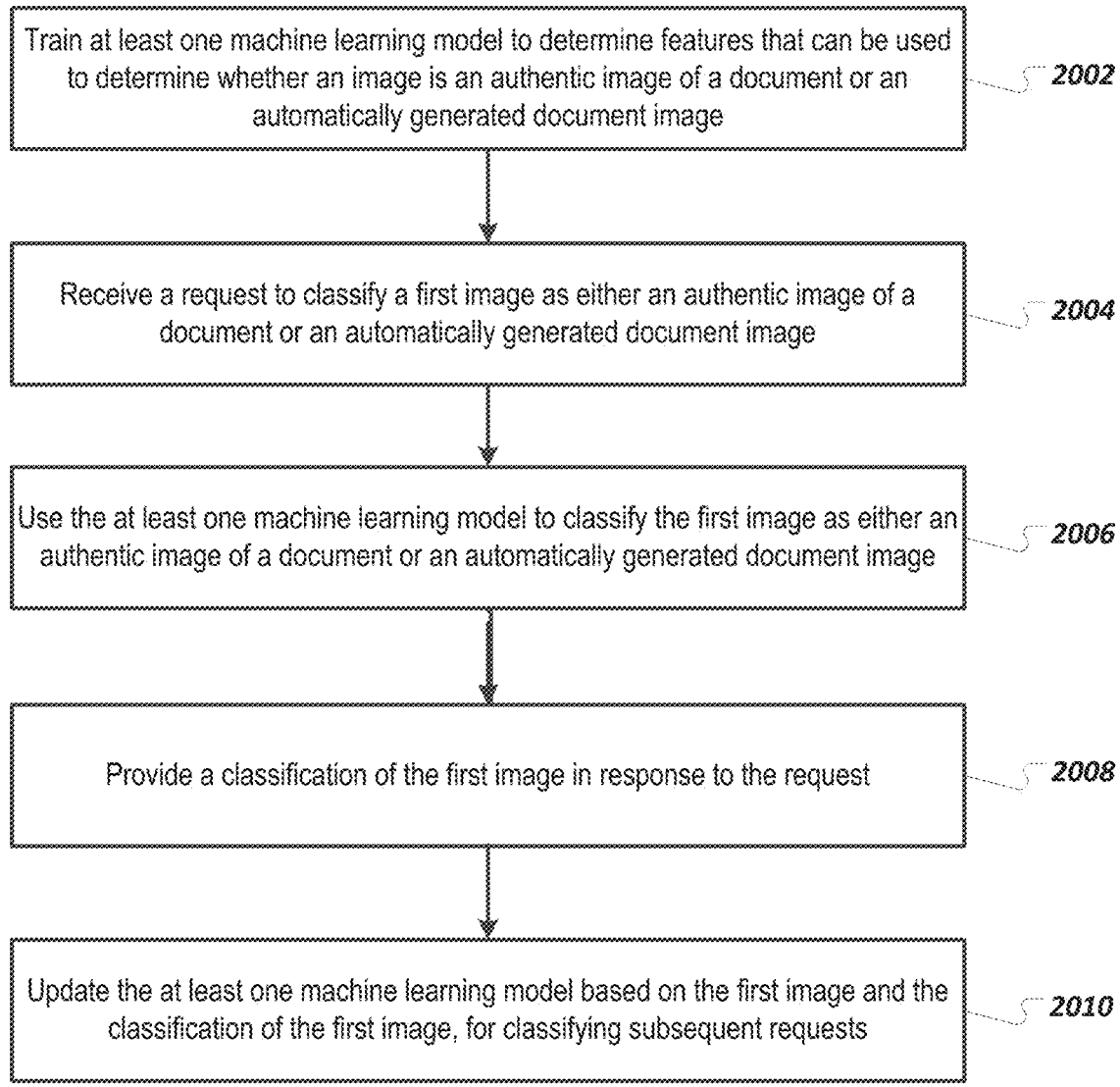
FIG. 20 is a flowchart of an example method for using machine learning for classifying document images as authentic or unauthentic.

FIG. 20 is a flowchart of an example method 2000 for using machine learning for classifying document images as authentic or unauthentic. It will be understood that method 2000 and related methods may be performed, for example, by any suitable system, environment, software, and hardware, or a combination of systems, environments, software, and hardware, as appropriate. For example, one or more of a client, a server, or other computing device can be used to execute method 2000 and related methods and obtain any data from the memory of a client, the server, or the other computing device. In some implementations, the method 2000 and related methods are executed by one or more components of the system 100 described above with respect to FIG. 1. For example, the method 2000 and related methods can be executed by the fake receipt detector 140 of FIG. 1.

At 2002, at least one machine learning model is trained to determine features that can be used to determine whether an image is an authentic image of a document or an automatically generated document image. The at least one machine learning model is trained using a first training set of authentic images and a second training set of automatically generated document images.

The at least one machine learning model can include a neural network model. The neural network model can learn the features that can be used to determine whether an image is an authentic image of a document or an automatically generated document image. As another example, the at least one machine learning model can include a regression model. The regression model can use a plurality of predetermined feature types. The regression model can be configured to classify a respective image based on an aggregation of scores determined for the image for the plurality of predetermined feature types. Scores for a feature can indicate a probability that an image is an authentic image of a document or a probability that the image is an automatically generated document image.

At 2004, a request is received to classify a first image as either an authentic image of a document or an automatically generated document image. The first image can be an authentic image of a first document. The first document can be, for example, an authentic receipt that is submitted by a user. The first image can be an image of a printed receipt. The user can capture an image of the printed receipt, using a camera, and submit the captured image, for example. As another example, the first image can be an automatically generated document image generated by a computing process that is not an authentic document (e.g., the computing process may attempt to automatically generate an image that appears to be an authentic document). An unauthentic document can be one that is automatically generated rather than captured by a camera.

At 2006, the at least one machine learning model is used to classify the first image as either an authentic image of a document or an automatically generated document image, based on features included in the first image that are identified by the at least one machine learning model. The first image can be classified as an automatically generated document image based on at least one feature that indicates a likelihood that the first image was not captured by a camera.

A filtering layer can be applied when classifying the image. The filtering layer can be a white list mechanism, and applying the filtering layer can include determining that the first image corresponds to a whitelisted entity and classifying the image as an authentic image based on determining that the first image corresponds to a whitelisted entity.

At 2008, a classification of the first image is provided in response to the request.

At 2010, the at least one machine learning model is updated based on the first image and the classification of the first image, for classifying subsequent requests.

Figure 21:
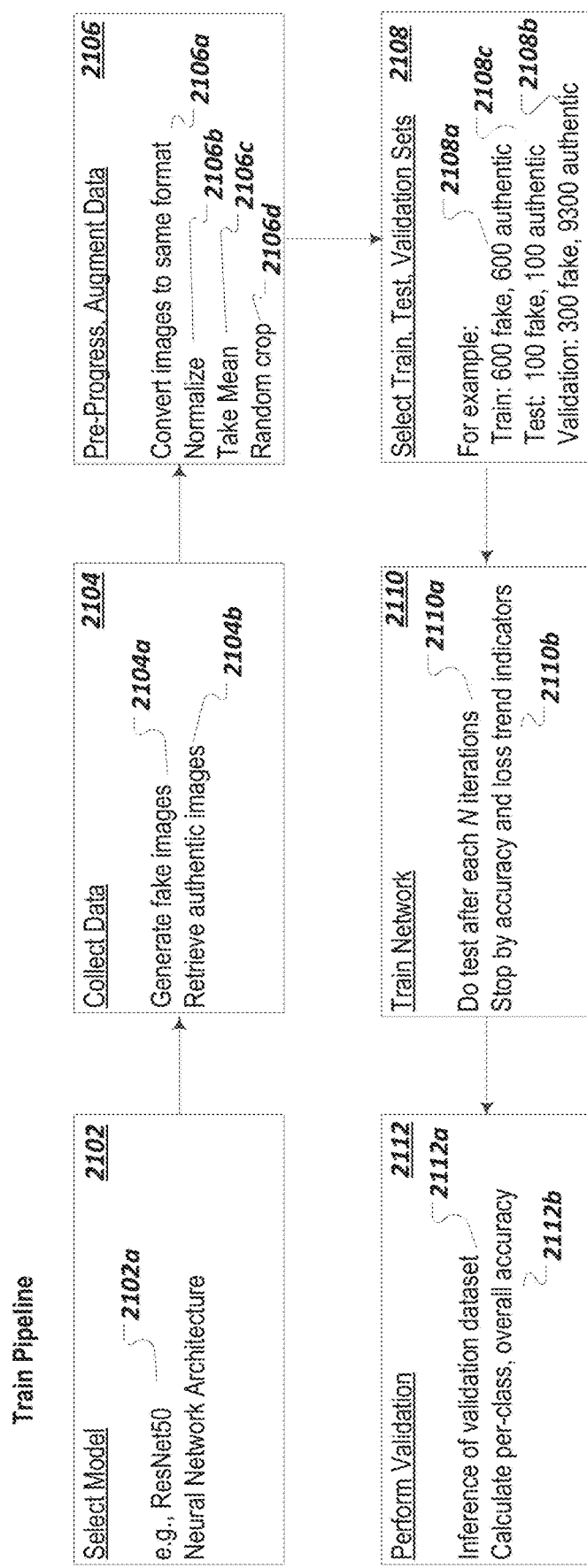
FIG. 21 is a flowchart of an example method for training a neural network model for image classification.

FIG. 21 is a flowchart of an example method 2100 for training a neural network model for image classification. It will be understood that method 2100 and related methods may be performed, for example, by any suitable system, environment, software, and hardware, or a combination of systems, environments, software, and hardware, as appropriate. For example, one or more of a client, a server, or other computing device can be used to execute method 2100 and related methods and obtain any data from the memory of a client, the server, or the other computing device. In some implementations, the method 2100 and related methods are executed by one or more components of the system 100 described above with respect to FIG. 1. For example, the method 2100 and related methods can be executed by the fake receipt detector 140 of FIG. 1.

At 2101, a model type is selected. For instance, in some implementations, a RestNet50 neural network architecture 2101a is selected.

An artificial neural network is a computational model based on a collection of artificial neurons which can be referred to as neural units. The artificial neural network can perform in a manner that is similar to the observed behavior of a biological brain's axons. Each neural unit can be connected to other neural units. In a recurrent neural network, connections between neural units form a directed cycle. In a feed-forward neural network, connections between neural units do not form a cycle. A convolutional neural network (CNN) is a type of feed-forward neural network in which a connectivity pattern between neurons is based on the organization of the animal visual cortex. A CNN can be arranged into convolutional layers alternating with subsampling layers. A LS™ (Long Short-Term Memory) network is a type of recurrent neural network that includes LS™ units instead of, or in addition to, other network units. A LS™ unit is a recurrent network unit that is capable of remembering values for either long or short durations of time.

The ResNet-50 neural network is a CNN that includes fifty layers. The ResNet-50 can include residual learning. With residual learning, layers can be reformulated as learning residual functions with reference to layer inputs, instead of learning unreferenced functions. Residual learning can increase accuracy at deep levels as compared to other approaches. Although fifty layers are mentioned, other networks, using a different count of layers can be used. Other network architectures, including other neural network architectures or other machine learning approaches can be used.

At 2104, data for training the network is collected. Data collection can include generation of fake images 2104a. For example, one or more sources that are known to generate fake/fraudulent images can be accessed and used to generate a set of fake/fraudulent images. As another example, a set of fake images can be retrieved from a repository. Data collection can include retrieval of authentic images 2104b. For example, a set of authentic images can be retrieved from a repository of images that have been verified to be authentic.

At 2106, collected data is preprocessed, which can include augmenting the data. Preprocessing can include converting images to a same format 2106a, normalizing images 2106b, calculating mean values 2106c, and performing random cropping 2106d, to name a few examples. Preprocessing data used for a machine-learning training phase is described in more detail below with respect to FIG. 22.

At 2108, training, testing, and validation sets are selected. A training dataset is a dataset of examples used for learning, e.g., to fit the parameters (e.g., weights) of the network. Fitting parameters can include determining coefficient and bias values that produce the best results. As an example, an example training data set 2108a can include 600 fake images and 600 authentic images.

A validation data set is a dataset of examples used to tune the hyperparameters of the network. A hyperparameter can be, for example, the number of hidden units in the network. For instance, an example validation data set 2108b can include 300 fake images and 9300 authentic images.

A test dataset is a dataset that is independent of the training dataset, but that can follow a same probability distribution as the training dataset. For instance, an example test data set 2108b can include 100 fake images and 100 authentic images. A test data set can be used to evaluate and fine tune a fitted network.

At 2110, the network is trained. In general, machine learning algorithms can be trained on a training portion and evaluated on a testing portion. More specifically, the model can be initially fit using a training dataset that is a set of examples used to fit the parameters (e.g., weights of connections between neurons in artificial neural networks) of the model. The fitted model can be used to predict the responses for the observations in a second dataset called the validation dataset. The validation dataset can provide an unbiased evaluation of a model fit on the training dataset while tuning the model's hyperparameters (e.g., the number of hidden units in a neural network).

Training can include performing testing (e.g., using a test dataset) after each N training iterations 2110a. A training iteration can include passing all training set images (e.g., an epoch) through the network and back-propagating a gradient backwards through the network. Training can include validating the resulting model by passing a validation image set through the model and calculating the accuracy of the model. Stopping of training can include determining to stop based on accuracy and loss trend indicators 2110b. For example, if a calculated accuracy is acceptable or, for example, hasn't improved during a predetermined number of epochs (e.g., ten epochs), then training can be stopped. If accuracy is not acceptable, a training pipeline can be restarted (e.g., by returning to step 2104 and using a different set of data).

At 2112, the trained model is validated. The model can be validated using a test dataset. The test dataset is a dataset used to provide an unbiased evaluation of a final model fit on a training dataset. Validation can include passing a validation dataset through an inference pipeline (e.g., where the inference pipeline uses the trained model). The inference pipeline is described in more detail below with respect to FIGS. 23 and 24. Validation can include calculating per-class and overall accuracies 2112*b*. If accuracy is acceptable, then the training pipeline can be completed. If accuracy is not acceptable, a training pipeline can be restarted (e.g., by returning to step 2104 and using a different set of data). Once a model has been trained, then the model can be used in an inference pipeline for an image to be classified.

Figure 22:
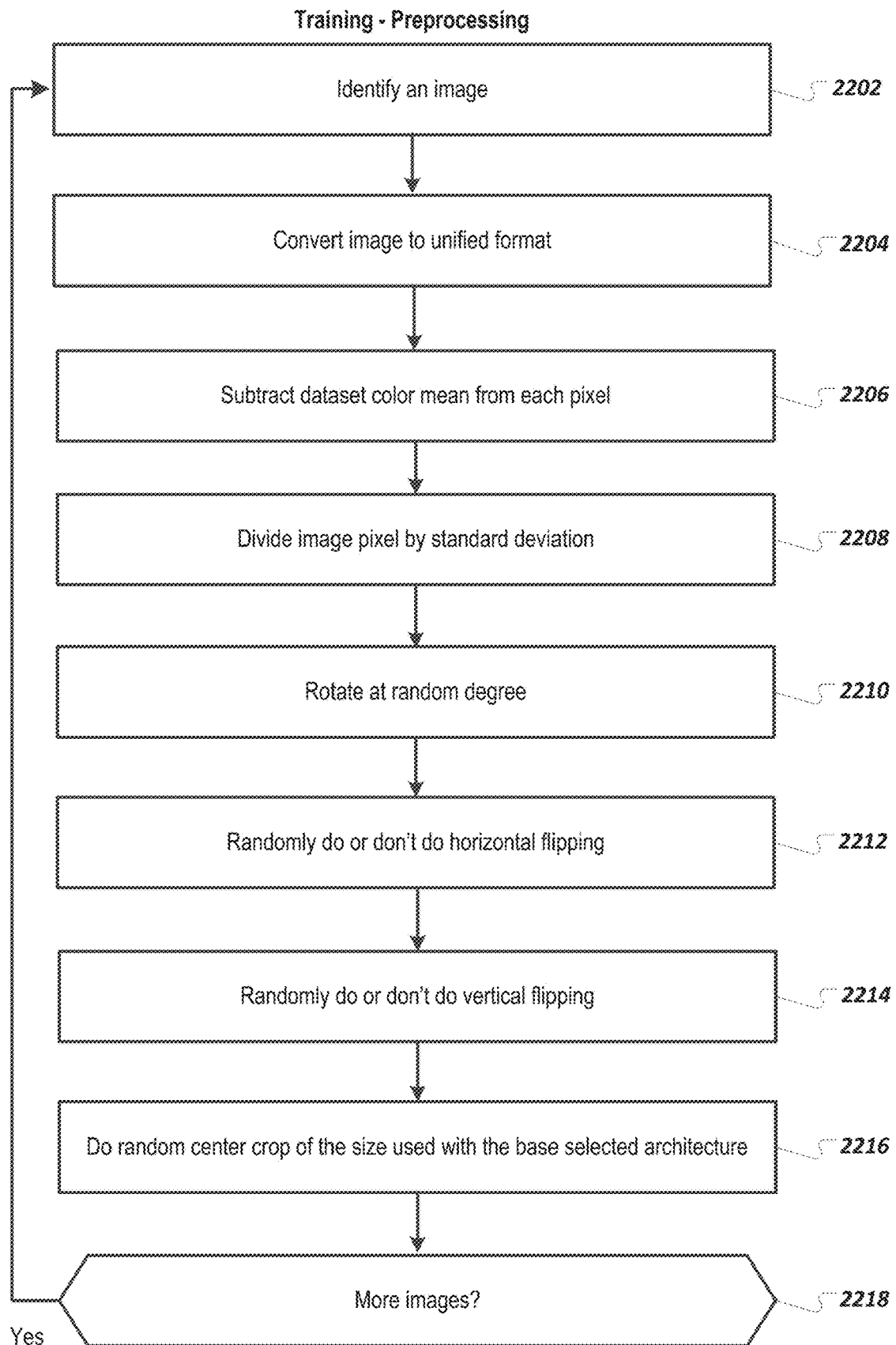
FIG. 22 is a flowchart of an example method for preprocessing data used for a machine-learning training phase.

FIG. 22 is a flowchart of an example method 2200 for preprocessing data used for a machine-learning training phase. It will be understood that method 2200 and related methods may be performed, for example, by any suitable system, environment, software, and hardware, or a combination of systems, environments, software, and hardware, as appropriate. For example, one or more of a client, a server, or other computing device can be used to execute method 2200 and related methods and obtain any data from the memory of a client, the server, or the other computing device. In some implementations, the method 2200 and related methods are executed by one or more components of the system 100 described above with respect to FIG. 1. For example, the method 2200 and related methods can be executed by the fake receipt detector 140 of FIG. 1.

At 2202, an image is identified. A particular image in a training set of images can be identified, for example.

At 2204, the image is converted to a unified format. For example, the image can be converted to a JPEG (Joint Photographic Experts Group) format.

At 2206, a dataset color mean is subtracted from each pixel. The dataset color mean of the training dataset can be computed before each image in the training dataset is individually processed, for example. As another example, a color mean of pixels in the image can be computed, and then the determined color mean can be subtracted from each pixel value in the image.

At 2208, each image pixel is divided by a standard deviation. A standard deviation for the training dataset can be computed before each image in the training dataset is individually processed, for example. As another example, a standard deviation of pixel intensity values of pixels in the image can be computed, and then each pixel can be divided by the standard deviation computed for the image.

At 2210, the image is rotated at a random degree. A random degree can be computed for each image, for example. As another example, a random degree can be computed once for a set of images.

At 2212, horizontal flipping is either performed or not performed, based on a first random factor. The first random factor, which can be a random true or false value, can be computed for each image, for example. As another example, the first random factor can be computed once for a set of images. If the first random factor for the image is true, the image can be horizontally flipped. If the first random factor for the image is false, horizontal flipping can be skipped for the image.

At 2214, vertical flipping is either performed or not performed, based on a second random factor. The second random factor, which can be a random true or false value, can be computed for each image, for example. As another example, the first random factor can be computed once for a set of images. If the second random factor for the image is true, the image can be horizontally flipped. If the second random factor for the image is false, horizontal flipping can be skipped for the image. The second random factor for the image can be generated independently from generation of the first random factor for the image.

At 2216, a random center crop is performed, using a size used with a base selected architecture of the neural network.

At 2218, a determination is made as to whether there is at least one additional image to process as part of the pre-processing. If there is at least one additional image to process, a next image is identified (e.g., at step 2202), and preprocessing steps are performed for the next image. If there are no longer any images to process, the method 2200 ends.

Figure 23:
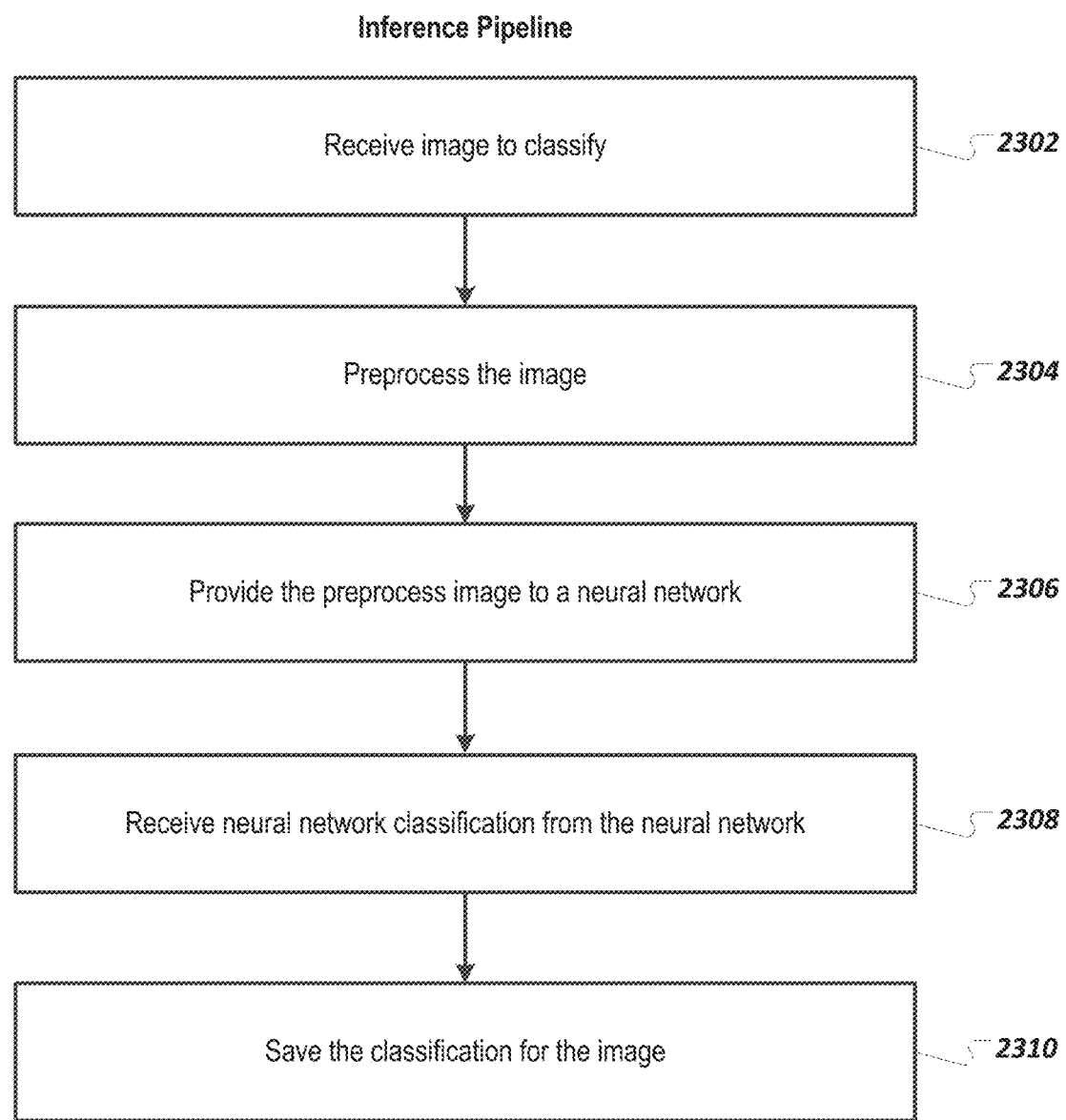
FIG. 23 is a flowchart of an example method for classifying an image using a trained machine learning model.

FIG. 23 is a flowchart of an example method 2300 for classifying an image using a trained machine learning model. The trained machine learning model can be a neural network. It will be understood that method 2300 and related methods may be performed, for example, by any suitable system, environment, software, and hardware, or a combination of systems, environments, software, and hardware, as appropriate. For example, one or more of a client, a server, or other computing device can be used to execute method 2300 and related methods and obtain any data from the memory of a client, the server, or the other computing device. In some implementations, the method 2300 and related methods are executed by one or more components of the system 100 described above with respect to FIG. 1. For example, the method 2300 and related methods can be executed by the fake receipt detector 140 of FIG. 1.

At 2302, an image to classify is received. For example, the image can be an image that a user claims to be an image of a receipt associated with an expense claim.

At 2304, the image is preprocessed. For instance, the image can be preprocessed as described below with respect to FIG. 24.

At 2306, the preprocessed image is provided to a neural network. The neural network can be a neural network that has been trained as described above with respect to FIGS. 21 and 22.

At 2308, a classification generated by the neural network is received. The classification can be, for example, a valid image or an invalid image. An invalid image can be an image that has been identified as having matched at least one feature corresponding to an invalid image. Invalid image features can be features associated with machine-generated images, for example. As another example, an invalid image can be an image that fails to match at least one feature associated with valid images. Features associated with valid images can be features of images of printed documents that have been captured by a camera, for example.

At 2310, the received classification is saved for the image. The received classification can be used in a feedback loop to subsequently train or adjust the neural network, for example.

Figure 24:
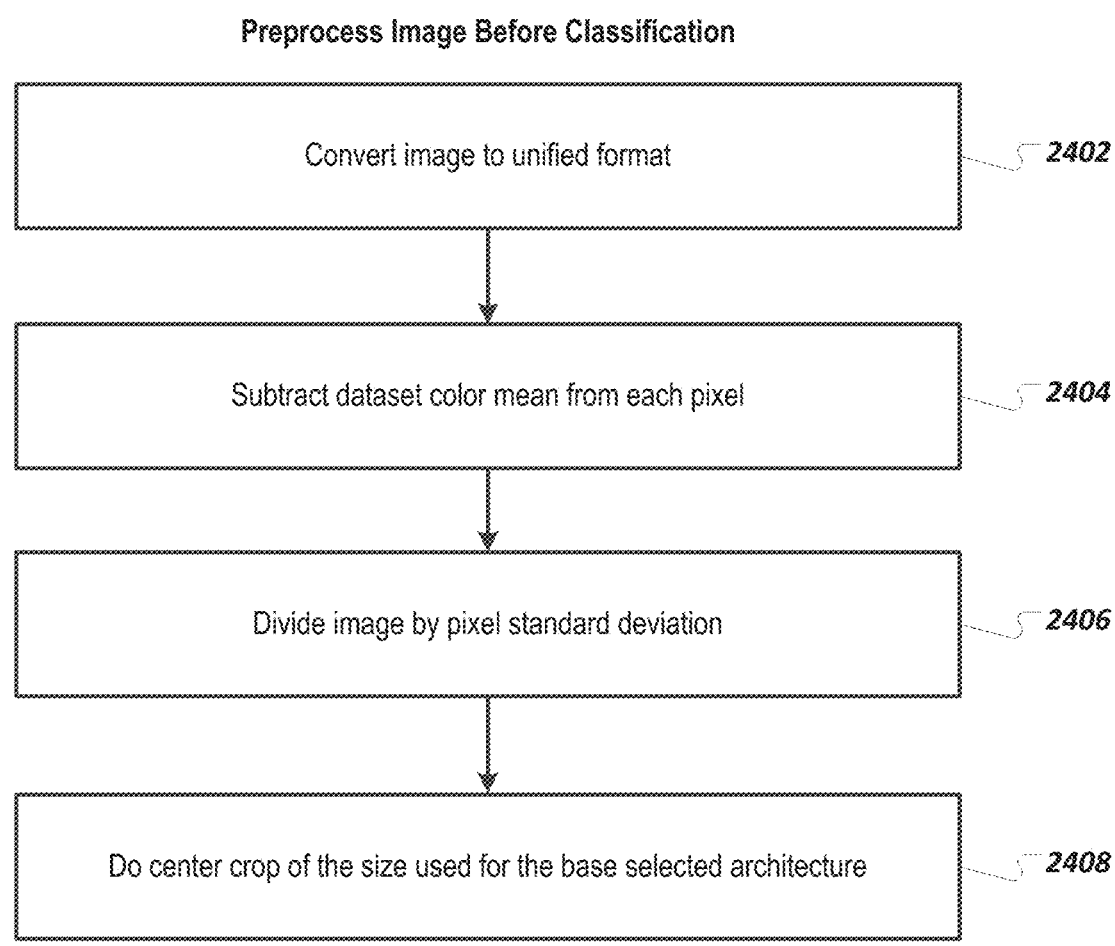
FIG. 24 is a flowchart of an example method for preprocessing an image before classifying the image.

FIG. 24 is a flowchart of an example method 2400 for preprocessing an image before classifying the image. It will be understood that method 2400 and related methods may be performed, for example, by any suitable system, environment, software, and hardware, or a combination of systems, environments, software, and hardware, as appropriate. For example, one or more of a client, a server, or other computing device can be used to execute method 2400 and related methods and obtain any data from the memory of a client, the server, or the other computing device. In some implementations, the method 2400 and related methods are executed by one or more components of the system 100 described above with respect to FIG. 1. For example, the method 2400 and related methods can be executed by the fake receipt detector 140 of FIG. 1.

At 2402, the image is converted to a unified format. For example, the image can be converted to a JPEG format.

At 2404, a dataset color mean is subtracted from each pixel. For example, a color mean of pixels in the image can be computed, and then the determined color mean can be subtracted from each pixel value in the image.

At 2406, each image pixel is divided by a standard deviation. For example, a standard deviation of pixel intensity values of pixels in the image can be computed, and then each pixel can be divided by the standard deviation computed for the image.

At 2408, a center crop of the image is performed using a size used with a base selected architecture of the neural network. After pre-processing has been performed, the image can be classified, as described above with respect to FIG. 23. The classification can be a valid image or an invalid image, for example.

Figure 25:
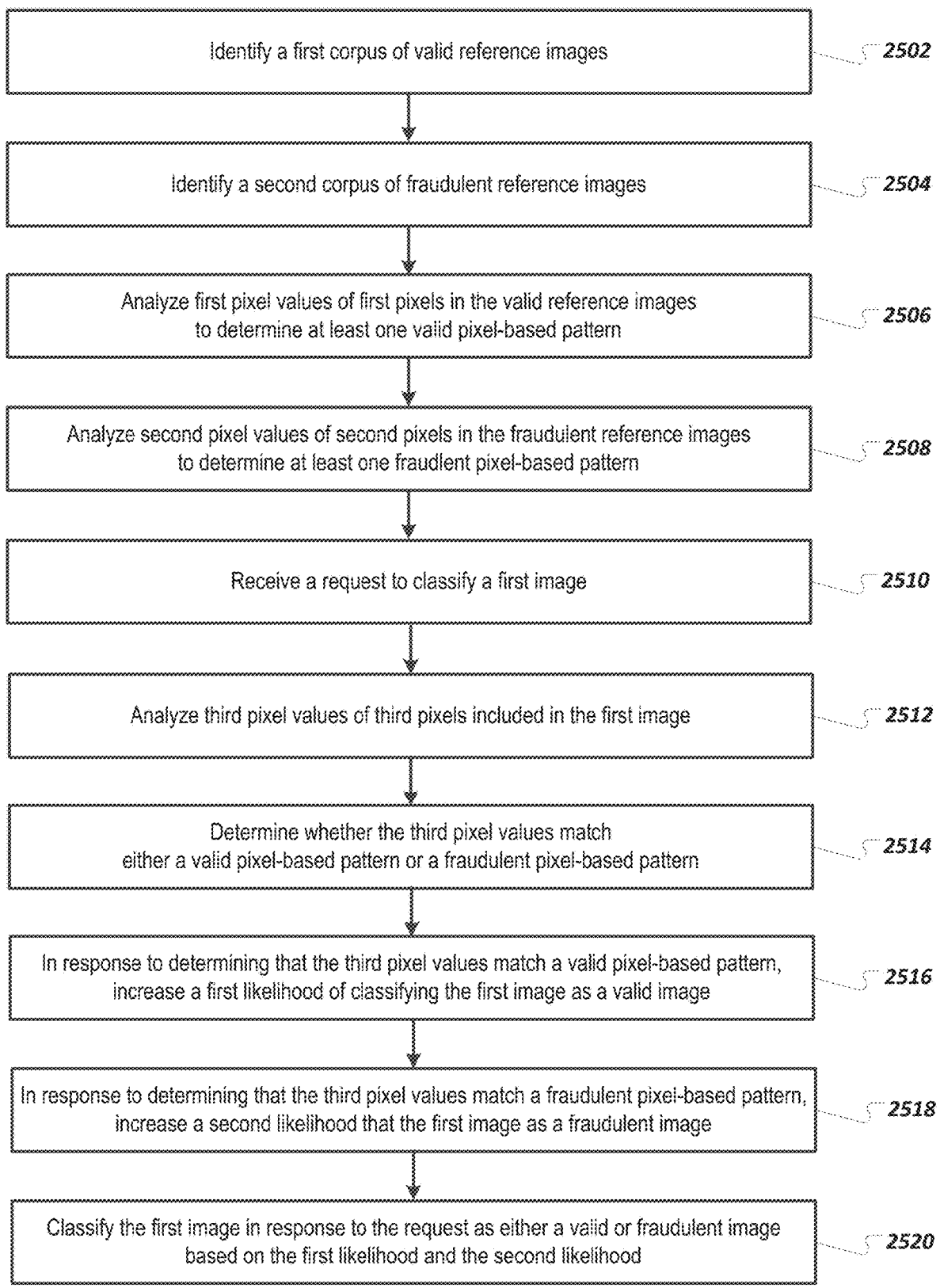
FIG. 25 is a flowchart of an example method for using pixel-based tests for classifying an image as either a valid image or a fraudulent image.

FIG. 25 is a flowchart of an example method 2500 for using pixel-based tests for classifying an image as either a valid image or a fraudulent image. It will be understood that method 2500 and related methods may be performed, for example, by any suitable system, environment, software, and hardware, or a combination of systems, environments, software, and hardware, as appropriate. For example, one or more of a client, a server, or other computing device can be used to execute method 2500 and related methods and obtain any data from the memory of a client, the server, or the other computing device. In some implementations, the method 2500 and related methods are executed by one or more components of the system 100 described above with respect to FIG. 1. For example, the method 2500 and related methods can be executed by the fake receipt detector 140 of FIG. 1.

At 2502, a first corpus of valid reference images is identified. The valid reference images can include images of printed documents. The printed documents can include valid receipts, or other types of printed documents.

At 2504, a second corpus of fraudulent reference images is identified. The fraudulent reference images can include images of documents that are programmatically generated. The fraudulent reference images can include fraudulent receipt images that were generated to appear to be valid receipt images, for example.

At 2506, first pixel values of first pixels in the valid reference images in the first corpus are analyzed to determine at least one valid pixel-based pattern that is included in at least a first threshold percentage of the valid reference images. A valid pixel-based pattern can correspond to one or more features that are present in at least the first threshold percentage of valid reference images.

At 2508, second pixel values of second pixels in the fraudulent reference images in the second corpus are analyzed to determine at least one fraudulent pixel-based pattern that is included in at least a second threshold percentage of the fraudulent reference images. A fraudulent pixel-based pattern can correspond to one or more features that are present in at least the second threshold percentage of fraudulent reference images. The first threshold and the second threshold can be a same or different value. Valid pixel-based patterns and fraudulent pixel-based patterns are described in more detail below with respect to FIGS. 26 to 31.

At 2510, a request to classify a first image is received.

At 2512, third pixel values of third pixels included in the first image are analyzed. The third pixel values can be compared to each of the valid pixel-based patterns and fraudulent pixel-based patterns, for example.

At 2514, a determination is made as to whether the third pixel values match either a valid pixel-based pattern or a fraudulent pixel-based pattern.

At 2516, in response to determining that the third pixel values match a valid pixel-based pattern, a first likelihood of classifying the first image as a valid image is increased.

At 2518, in response to determining that the third pixel values match a fraudulent pixel-based pattern, a second likelihood that the first image as a fraudulent image is increased.

At 2520, the first image is classified in response to the request as either a valid image or a fraudulent image based on the first likelihood and the second likelihood. For instance, if the first likelihood is greater than a predetermined threshold likelihood, the first image can be classified as a valid image. For instance, if the first likelihood is greater than 90%, the first image can be classified as a valid image. As another example, if the second likelihood is greater than a predetermined threshold likelihood, the first image can be classified as a fraudulent image. For instance, if the second likelihood is greater than 90%, the first image can be classified as a fraudulent image. As yet another example, if the second likelihood is less than a predetermined threshold likelihood, the first image can be classified as a valid image. For instance, if the second likelihood is less than 3%, the first image can be automatically classified as a valid image. Other examples and combinations are possible.

In general, the first image can classified as a valid image due to a determination that the first image is an authentic image of a first document. The first document can be a receipt. The first image can be an image of a printed receipt. The first image can be an image of the printed receipt as captured by a camera.

As another example, the first image can be classified as a fraudulent image due to a determination that the first image is a programmatically generated document image. The first image can be an image that is generated rather than an image that is captured by a camera, for example. The first image can be classified as an automatically generated document image based on at least one feature that indicates a likelihood that the first image was not captured by a camera.

Figure 26:
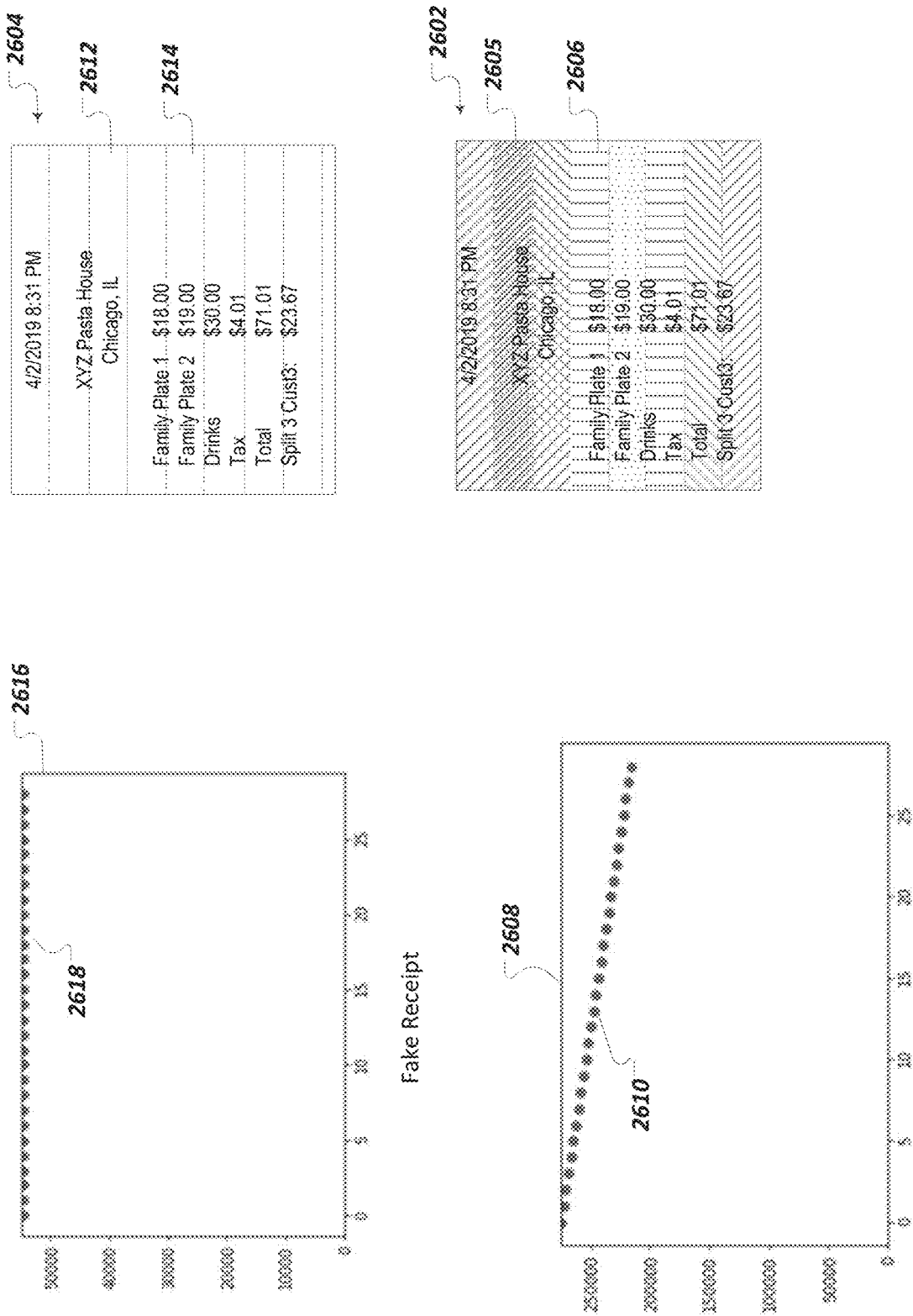
FIG. 26 illustrates example receipts that are processed using a white space slope algorithm.

FIG. 26 illustrates example receipts 2602 and 2604 that are processed using a white space slope algorithm. The white space slope algorithm is designed to determine how white space changes on an image as the image is examined from top to bottom. The white space slope algorithm can calculate and analyze white space metric values vertically along a receipt image.

Original images (e.g., images captured by a camera), generally have variations in white space metric values due, for example, to shades and shadows caused by natural lighting and environmental conditions. Due to lighting and shade factors, for example, a whiteness, or white space level at one area of an authentic receipt image (e.g., the top) is generally not exactly the same as other areas of the receipt image (e.g., the bottom). For instance, the receipt 2602 may be a valid receipt, and different areas of the receipt may have different white space variations. For example, a first section 2605 may have white space characteristics that are different from a second section 2606. A graph 2608 illustrates variation in a whitespace slope metric (the whitespace slope metric is described in more detail below). The graph 2608 can plot sum of pixels values (described in more detail below) for different portions of a receipt (e.g., where portions may include multiple portions identified in a top-tobottom approach). A line 2610 indicates a variance in the whitespace slope metric, for the receipt 2602.

In contrast, machine-generated receipts may not have a same amount of white space variations as receipt images taken by a camera of a user. For generated receipts, the image was not captured using a camera with natural lighting conditions, so accordingly, the generated receipt may have white space slope values that don't vary as much or in a same way as a camera-captured receipt image. Accordingly, white space variation (e.g., represented by the white space slope metric) can be a feature that can be used to identify a fake receipt vs. an original receipt.

For instance, the receipt 2604 may be a fake (e.g., machine-generated) receipt. A whitespace slope metric value for a first section 2612 may be the same (or substantially the same) as a whitespace slope metric value for a second section 2614 (and for other sections). Accordingly, as shown in a graph 2616, a line 2618 that plots whitespace slope metric values for the receipt 2604 has little (or no) variance.

As an overview of whitespace slope metric calculations, a receipt image is divided into a predefined number of buckets. The buckets correspond to horizontal strips of the receipt image. As an example, a receipt image may have 300 pixels, and a bucket size may be 10 pixels, so in this example, thirty buckets are used.

Pixel intensities can be calculated for every row in each bucket. A sum of pixel intensities can be calculated for each row in the bucket and a maximum pixel intensity sum can be determined, for each bucket. A result of these calculations is a list of maximum pixel intensity scores. A maximum pixel intensity score for a bucket represents a "whiteness" of the area of the receipt corresponding to the bucket. The list of maximum pixel intensity values can be plotted as a regression line. A slope of the plotted line can be determined. As determined from prior analysis, fake receipts generally have a higher likelihood of having a slope that is at or near zero. Also ad determined from prior analysis, original (e.g., authentic) receipts generally have a higher likelihood of having a non-zero slope. Accordingly, the slope of the plotted regression line can be used as a feature score that may determine whether a receipt is a fake receipt, with a value at or near zero indicating a fake receipt and a value not near zero indicating an original receipt.

FIG. 27 illustrates example code 2702 of a white space slope algorithm that can be executed for an image. The white space algorithm can be performed to calculate the slope of white space values in the image along an image length. In summary, the image into a predefined number of buckets, and for each bucket, a sum of pixel intensities for every row is calculated. A max value per bucket is also calculated. The calculations below are exemplary. Other approaches or calculations for determining whitespace metric values can be used.

In further detail, on line 1, a rowSum variable is set to be an empty list.

On line 2, a first iteration structure begins that iterates over each row of an image.

On line 3, within the first iteration structure, a pixel Values variable is set to be an empty list.

On line 4, a second iteration structure begins, within the first iteration structure, that iterates over each column in the image.

At line 5, within the second iteration structure, an R-channel value (e.g., a Red value) of a pixel at a current row and column of the image (e.g., as controlled by the first and second iteration structures, respectively) is appended to the pixel Values variable. Although an R-channel value is described, a G channel value (Green value), a Blue channel value (a Blue value), or a combination of two or more of R channel, G channel, or B channel values can be used. The second iteration structure ends on line 6.

At line 7, a first decision test is performed that determines whether the pixel Values variable is greater than zero. If the pixel Values variable is greater than zero, a (rowNum, rowSum) data item is appended to the rowSum variable, at line 8. The first decision test and the first iteration structure end on lines 9 and 10, respectively.

At line 12, the rowSum variable is converted to an array and stored back into the same rowSum variable.

At lines 13 and 14, x and y variables are each set to empty lists, respectively.

On lines 15, 16, and 17, a maxValues variable, an ig variable, and an oldIg variable are each set to 0, respectively.

Line 19 begins a third iteration structure that iterates over each value in the rowSum variable.

At line 20, a bucket value for a row (e.g., bucketVal[row]) is calculated by dividing the row number by the total number of rows in the image and multiplying by a number of buckets.

At line 21, the variable ig is set to be a conversion of the bucket value for the row to an integer (e.g., whole number).

Line 22 beings a second decision test that determines whether the value of the ig variable is greater than the value of the oldIg variable. If the ig variable is greater than the oldIg variable, lines 23 to 26 are performed.

At line 23, the value of the oldIg variable is appended to the variable x.

At line 24, the value of the maxValue variable is appended to the y variable.

At line 25, the maxValue is set to zero.

At line 26, the oldIg variable is set to be the value of the ig variable.

Line 27 ends the second decision test.

Line 29 begins a third decision test that determines whether a sum of the row's pixels is greater than the maxValue variable. If the sum of the row's pixels is greater than the maxValue variable, line 30 is performed to set the maxValue variable to the sum of the row's pixels.

Line 31 ends the third decision test.

Line 33 begins a fourth decision test that determines whether the length of the variable x is greater than zero. If the length of the variable x is greater than zero, lines 34, 35, and 36 are executed.

Line 34 is for calculating a linear least square regression for the x and y variables.

Line 35 assigns the calculated linear least square regression to a variable 0.

At line 36, a slope-percentage variable is set to a slope value divided by the total number of rows in the image multiplied by 100.

Lines 37 and 38 end the fourth decision test and the third iteration structure, respectively.

Figure 28:
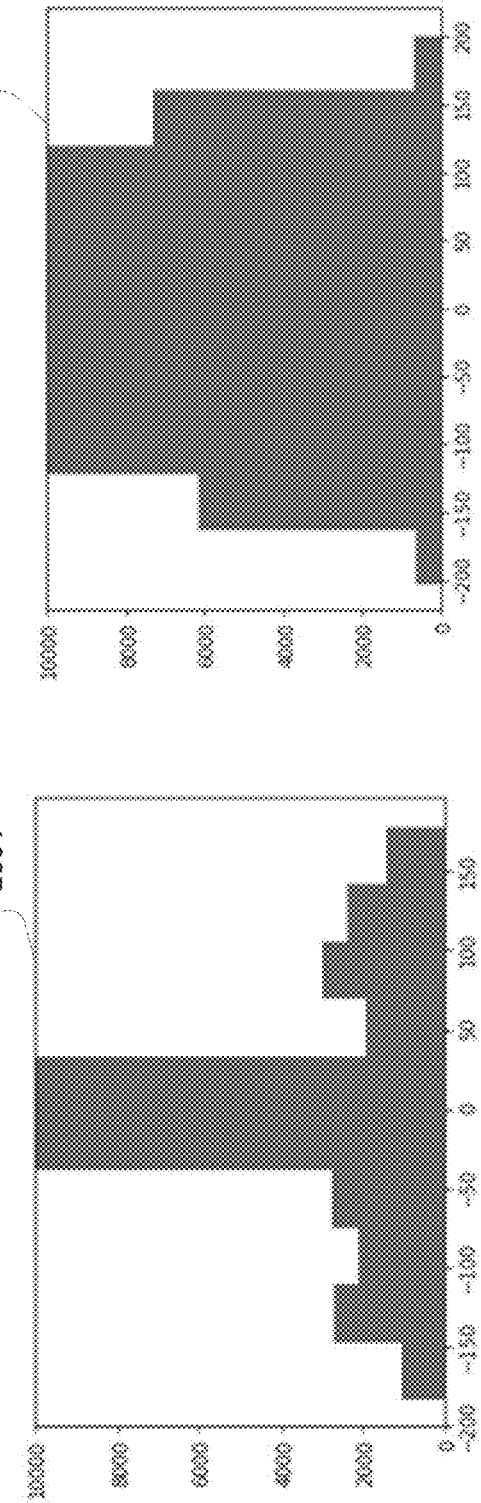
FIG. 28 illustrates example code for an alternating neighbors algorithm and example histograms produced from execution of the example code.

FIG. 28 illustrates example code 2802 for an alternating neighbors algorithm and example histograms 2804 and 2806 produced from execution of the example code 2802. An alternating neighbors algorithm can measure differences in pixel intensities when transitioning on an image from white space portions to darker spaces (e.g., that include text characters). If the image is a picture of a printed document, there generally can be a significant amount of variation in exactly how (in terms of pixel values) dark ink portions transition to white space portions (and vice versa), due to shading and natural light factors, for example. A computer-generated image generally will not have a same type of variability as a camera-captured image. The alternating neighbors algorithm measures how quickly dark pixels appears after a white pixel (when text characters are in a white space area, for example).

When a machine-generated process, as part of automatic image generation, generates black text on a white background, a resulting image includes more predictable patterns than a camera-produced image. For example, when analyzing transitions from back to white, or white to black (e.g., when analyzing an image row), more spikes and dips in certain transition values can be identified when the image is machine generated. For instance, the histogram 2804 has more dips than the histogram 2806. In some examples, center areas of the histograms 2804 and 2806 are not evaluated or are not taken into account as much as the left and right areas of the histograms, because the center areas can correspond to transitioning from a white value to a white value (e.g., meaning a difference is small) or a black value to a black value (e.g., also a small difference, but there are generally fewer of the black-to-black transitions (e.g., for images of textual documents) since generally there is a lot more white space than black on textual documents).

As another summary, the alternating neighbors algorithm can be performed to methodically traverse rows and columns of the image and calculate difference between alternating row pixel values. A histogram can be calculated from the subtracted pixel values. A pattern in the histogram can be mapped to a numeric value to obtain a feature score. The feature score can be obtained by calculating a number of adjacent alternating pixels.

In further detail, in the example code 2802, on line 1, a pixelDiff variable is set to be an empty list.

On line 2, a first iteration structure begins that iterates over each row in the image.

On line 3, a second iteration structure begins that iterates over each column in the image.

On line 4, within the second iteration structure, a difference of a current row and a row two rows after the current row is appended to the pixelDiff variable.

Lines 5 and 6 end the second iteration structure and the first iteration structure, respectively.

On line 8, after the first and second iteration structures have ended, a histogram is calculated based on the pixelDiff variable.

On line 9, an alternativeValues variable is set to zero.

A third iteration structure begins on line 10, that iterates over each value in the calculated histogram.

On line 11, a decision test is executed that determines whether a current value being processed in the third iteration structure is both less than a previous value of the histogram and less than a next value of the histogram. If the decision test is true, a value of one is added to the alternativeValues variable. The decision test and the third iteration structure end on lines 13 and 14, respectively.

FIG. 29 illustrates example code 2900 of an edge difference algorithm that can be executed for an image. The edge difference algorithm can be performed to determine edge difference metric values for areas of an image at the edges of the image. The edge difference metric values can relate to mean values of pixel intensities for some or all of the edges of an image, for example.

When examining an edge difference metric for a first corpus of real receipts and a second corpus of fake receipts, a determination can be made that real receipts generally have more variation for an edge difference metric than fake receipts. Accordingly, the edge difference metric can be used as a feature to determine whether an image is an image of a real receipt or is a fake (e.g., automatically generated) receipt image.

A particular formula using edge pixel differences can be determined to be particularly revealing as to whether a receipt is fake or real. For instance, a score that involves subtractions of various edge difference values can be used. A fake receipt may generally have, for example, a much lower value for this score than real receipts. Accordingly the score value may be a metric that is used, in isolation or in combination with other metrics, for detecting a fake receipt.

An example edge difference algorithm can find differences between the mean values of the image edges. The calculations below are exemplary. Other approaches or calculations for determining edge difference metric values can be used.

In further detail, at line 1 of the example code 2900, a mean pixel value is calculated for the left edge of the image and assigned to a variable LE.

At line 2, a mean pixel value is calculated for the right edge of the image and assigned to a variable RE.

At line 3, a mean pixel value is calculated for the upper edge of the image and assigned to a variable UE.

At line 4, a mean pixel value is calculated for the lower edge of the image and assigned to a variable LWE.

At line 5, the difference between the UE and LE variables is calculated and assigned to a variable DIFF1.

At line 6, the difference between the LWE and the RE variable is calculated and assigned to a variable DIFF2.

At line 7, the difference between the DIFF1 variable and the DIFF2 variable is calculated and returned. The difference between the DIFF1 variable and the DIFF2 variable can be used as an edge difference metric.

FIG. 30 illustrates example code 3002 of a color channel difference algorithm and example histograms 3004 and 3006 produced from execution of the color channel difference algorithm. In summary, the color channel difference algorithm can be performed to find the difference between different color channels of every pixel in an image, generate a histogram frequency of these values, and return a peak value of the histogram.

The color channel difference algorithm can find a difference between two color channels for each pixel in the image. For instance, a difference between the R (Red) channel and the G (Green) channel can be computed, for each pixel. Other examples include finding a difference between the R channel and the B (Blue) channel, or finding a difference between the G and B channels.

The color channel difference values can be plotted as a histogram. For example, the histogram 3004 and the histogram 3006 plot color channel differences for a fake receipt image and an authentic receipt image, respectively. For authentic receipts captured by a camera, there is generally a difference between the R and G channel values for pixels, even if a given pixel is part of what appears to be "white" or "black" areas. Accordingly, when difference values are plotted on a histogram, the histogram generally includes multiple values (e.g., multiple peaks), each representing multiple occurrences of a different difference value. For example, the histogram 3006 includes peaks 3008, 3010, 3012, and 3014.

For a generated image, there may be no or little difference between the R and G channel values, for example, for areas that are white or black areas. Accordingly, a histogram of differences values may generally not have many peaks, and a largest peak, representing the majority of difference values, may likely be a peak associated with a difference value of zero. For instance, the histogram 3004 includes a peak 3016 corresponding to a difference value of zero.

In some implementations, for an algorithm score or result, histogram values can be evaluated, and a histogram bar with a highest peak can be identified, and the height of the peak can be returned as the score. For fake images, the height will generally be higher, as many pixels likely share a common color channel difference (which may often be a zero difference). For authentic, camera-captured images, the histogram will generally have more bars representing more color channel difference values, and a highest-height bar will generally be less than a highest-height bar for a fake image, due to variability in the distribution of color channel differences for pixels in the image, for the authentic, camera-captured receipts. For instance, a height (e.g., Y-axis value) of the peak 3014 is 0.7, which is substantially less than a height of ten for the peak 3016.

In further detail and as shown in the example code 3002, lines 2 to 8 can be executed to determine red-green differences.

At line 2, an rg variable is set to be an empty list.

Line 3 beings a first iteration structure that iterates over each row in the image.

Line 4 begins a second iteration structure, within the first iteration structure, that iterates over each column in the image.

At line 5, a difference between the R (Red) and G (Green) channel values of the image is determined. Other channel differences can be determined, such as a difference between the R channel and the B channel or a difference between the B channel and the G channel.

At line 6, the red-green difference is appended to the rg variable.

Lines 7 and 8 end the second and first iteration structures, respectively.

Lines 11 to 18 can be used to calculate relative frequency histogram values. At line 11, a rg_dict variable is set to be an empty dictionary object.

Line 12 begins a third iteration structure that iterates over every value in the rg variable.

Line 13 begins a decision test that determines whether an rg value is present.

If the rg value is present, at line 14, a dictionary count for that rg value is incremented.

If the rg value is not present, at line 16, the rg value is added to the rg_dict dictionary.

Lines 17 and 18 end the decision test and the third iteration structure, respectively.

At line 20, relative frequency of histogram values are calculated, by dividing each dictionary value by the sum of dictionary values.

At line 22, the max value of the dictionary is returned.

Figure 31:
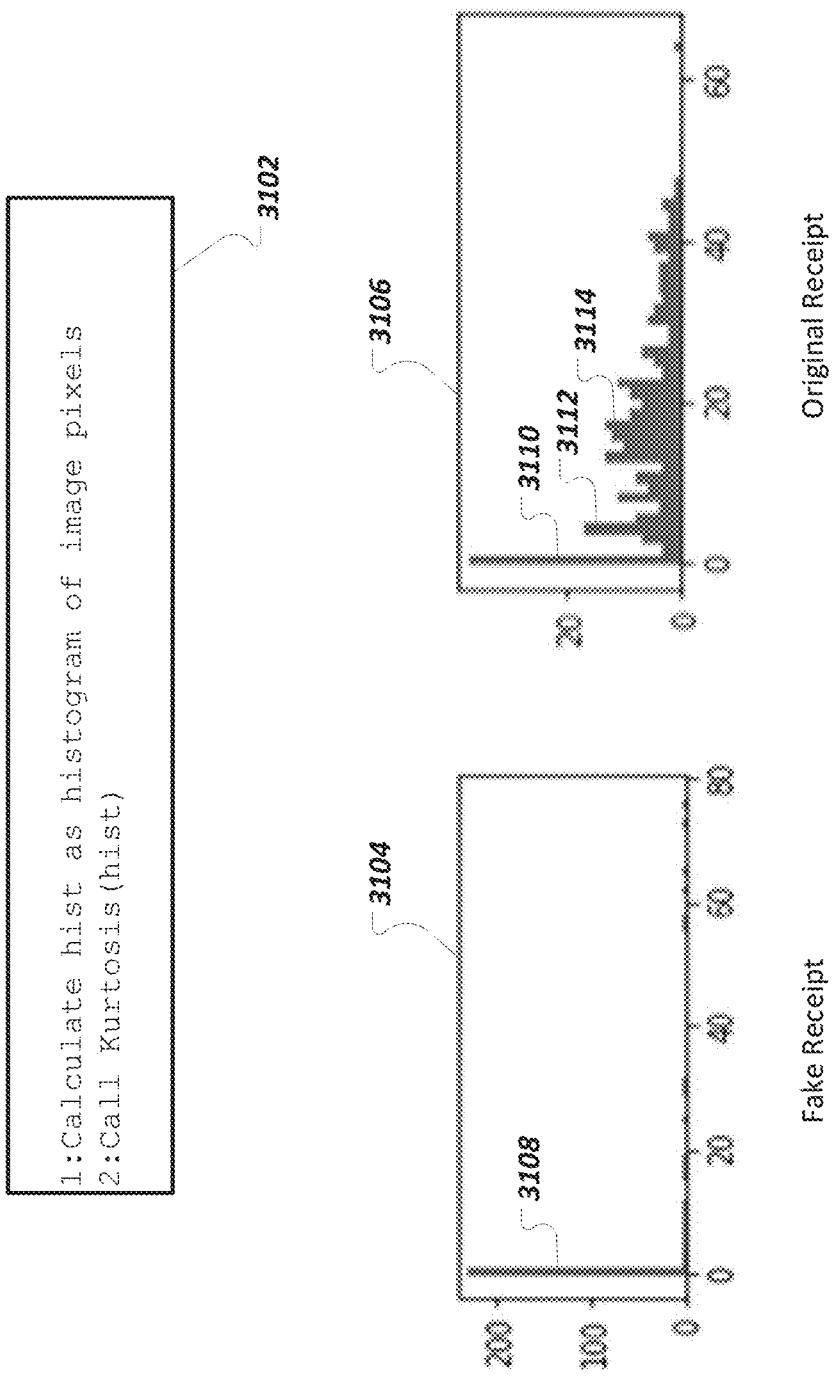
FIG. 31 illustrates example code of a kurtosis algorithm and example histograms produced from execution of the kurtosis algorithm.

FIG. 31 illustrates example code 3102 of a kurtosis algorithm and example histograms 3104 and 3106 produced from execution of the kurtosis algorithm. The histograms 3104 can plot counts of various pixel intensity values that occur in either a fake receipt or an original receipt, respectively.

The kurtosis algorithm provides a measure that describes the shape of a distribution's tail in relation to its overall shape. The distribution can be, for example, a histogram distribution of image pixels. A histogram distribution for fake receipt images can be determined to be heavy at the tails as compared to original receipts, for example.

For instance, as shown in the histogram 3104 by a spike 3108, most of the values of the histogram 3104 for a fake receipt lie at the left tail of the distribution. The spike 3108 can occur because a same value (e.g., a value at or near zero) gets repeated across the pixels of the fake receipt for most of the fake receipt. This can occur, for example, if all "black" values on a receipt are a same value of black. For camera-captured receipts, values that essentially represent black will still generally have some variation (e.g., with some amount of grayscale). For instance, in the histogram 3106 corresponding to a real receipt, although having a spike 3110, other values occur, in a wider distribution than for the histogram 3104. For example, the histogram 3106 includes smaller spikes 3112 and 3114, indicating substantial counts of other values in the histogram 3106 other than those corresponding to the spike 3110.

In further detail and as shown in the example code 3102, at line 1, a hist variable is set to be a histogram of image pixels.

At line 2, a Kurtosis function is invoked with the hist variable as an input. The kurtosis function can calculate a measure of the combined weight of the tails of the histogram relative to the rest of the histogram distribution. Kurtosis processing can provide a measure for a particular histogram distribution, how many values are at a lower and/or upper tail of the distribution. The kurtosis-related measure can be a feature that can be used to determine whether an image is an image of a real receipt or an automatically-generated receipt image.

Figure 32:
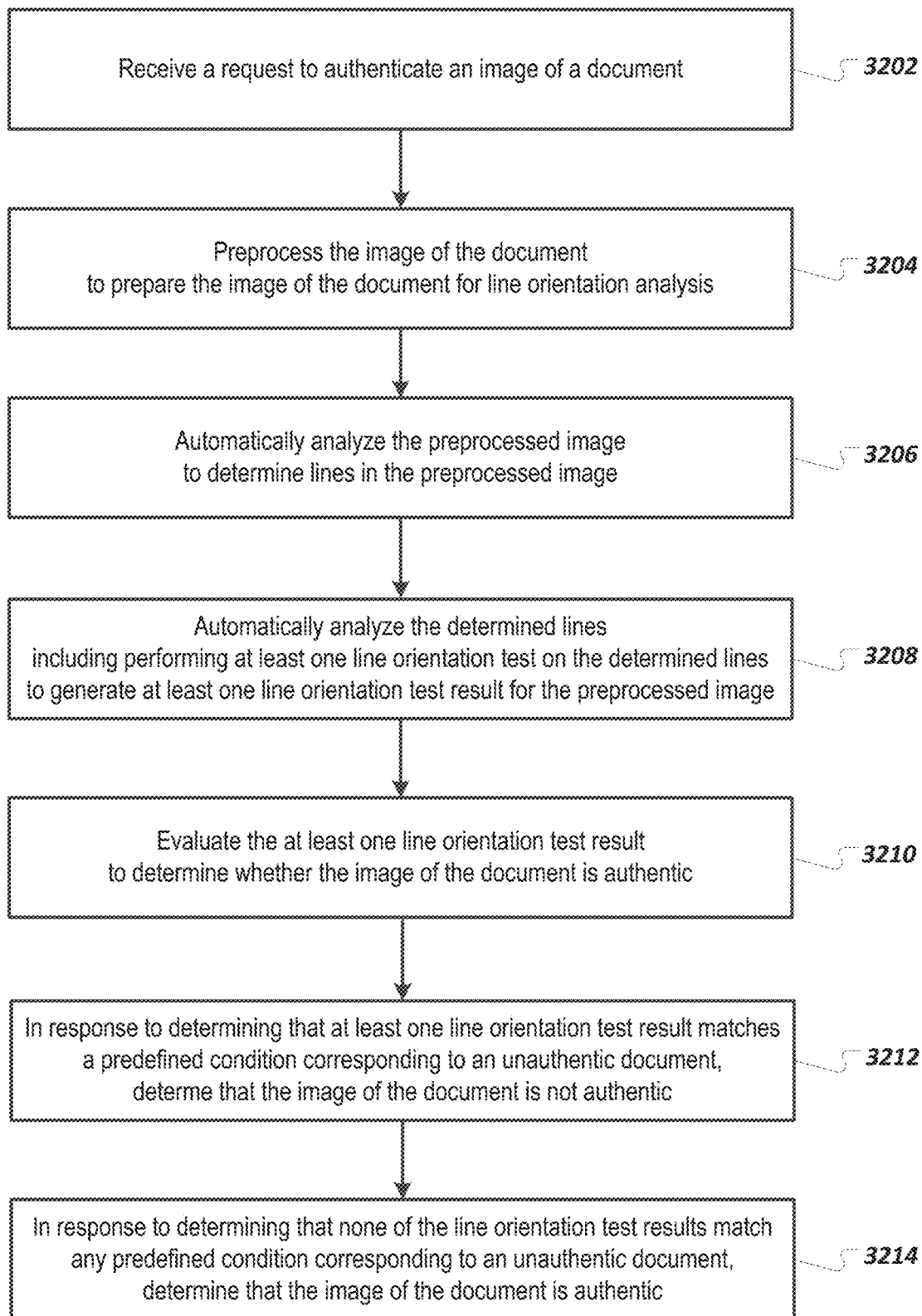
FIG. 32 is a flowchart of an example method for using line-orientation tests for classifying document images as authentic or unauthentic.

FIG. 32 is a flowchart of an example method 3200 for using line-orientation tests for classifying document images as authentic or unauthentic. It will be understood that method 3200 and related methods may be performed, for example, by any suitable system, environment, software, and hardware, or a combination of systems, environments, software, and hardware, as appropriate. For example, one or more of a client, a server, or other computing device can be used to execute method 3200 and related methods and obtain any data from the memory of a client, the server, or the other computing device. In some implementations, the method 3200 and related methods are executed by one or more components of the system 100 described above with respect to FIG. 1. For example, the method 3200 and related methods can be executed by the fake receipt detector 140 of FIG. 1.

At 3202, a request is received to authenticate an image of a document.

At 3204, the image of the document is preprocessed to prepare the image of the document for line orientation analysis. Preprocessing the image of the document can include one or more of grayscale conversion of the image of the document, blurring the image of the document, or edge filtering the image of the document.

At 3206, the preprocessed image is automatically analyzed to determine lines in the preprocessed image. For example, contours of the preprocessed image can be determined.

At 3208, the determined lines are automatically analyzed, including the performing of at least one line orientation test on the determined lines to generate at least one line orientation test result for the preprocessed image. Performing at least one line orientation test can include determining whether at least a portion of the determined lines are substantially oriented either horizontally at zero degrees or vertically at ninety degrees. A line substantially oriented horizontally at zero degrees or vertically at ninety degrees can be interpreted as being oriented within a predefined threshold of either zero degrees or ninety degrees. Different types of line analysis and line-orientation tests are described in more detail below with respect to FIGS. 34 to 37.

At 3210, the at least one line orientation test result is evaluated to determine whether the image of the document is authentic.

At 3212, in response to determining that at least one line orientation test result matches a predefined condition corresponding to an unauthentic document, a determination is made that the image of the document is not authentic. In other examples, a likelihood that the image of the document is not authentic is increased based on at least one line orientation test result matching a predefined condition corresponding to an unauthentic document. Determining that the image of the document is not authentic can include determining that the image is a programmatically generated image.

At 3214, in response to determining that none of the line orientation test results match any predefined condition corresponding to an unauthentic document, a determination is made that the image of the document is authentic. As another example, the image of the document can be determined to be authentic (or a likelihood that the image of the document is authentic can be increased) based on at least one line orientation test result matching a predefined condition corresponding to an authentic document. Determining that the image of the document is authentic can include determining that the image of the document is an image of a printed document. In some examples, the printed document is a printed receipt.

Figure 33:
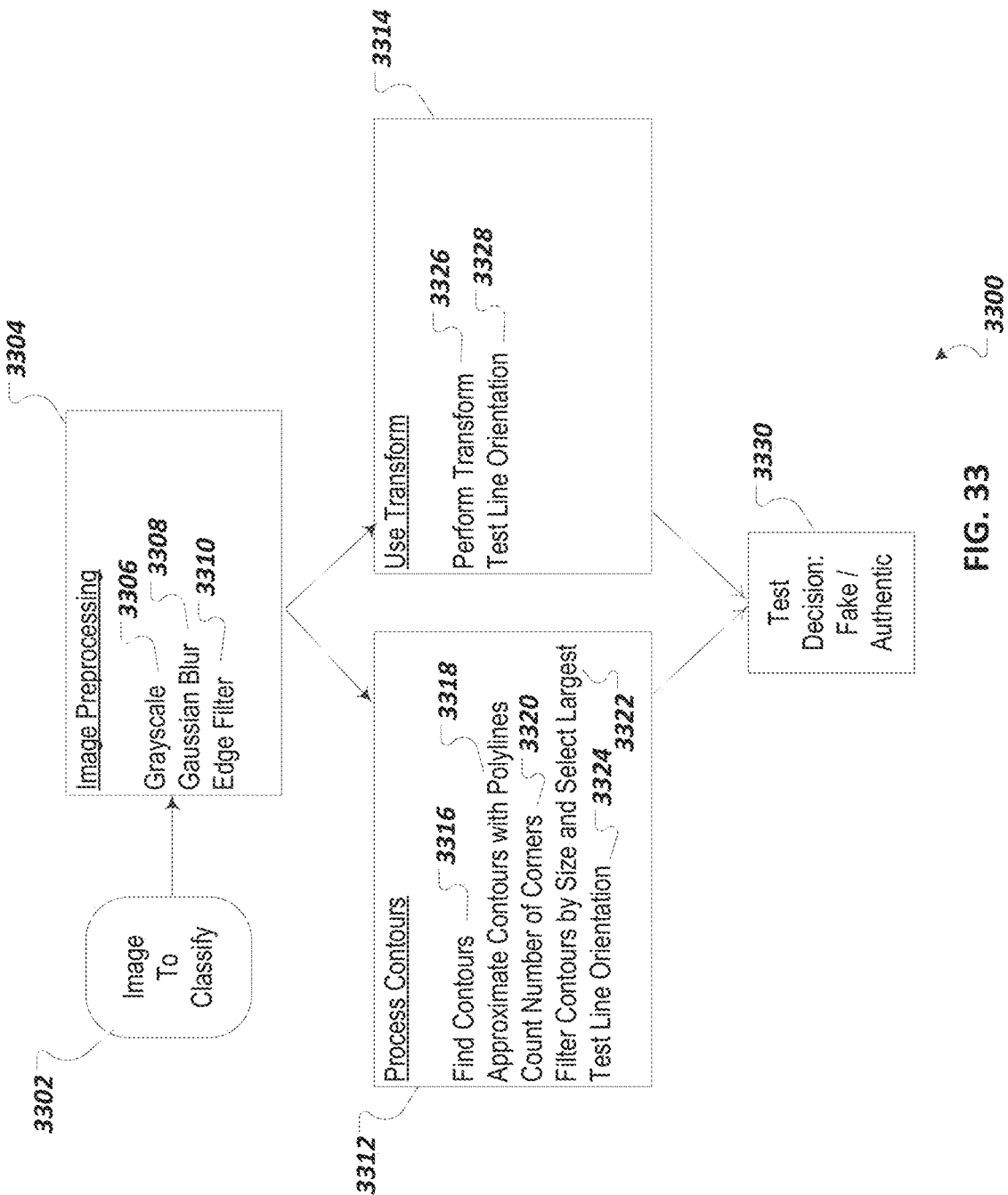
FIG. 33 illustrates a system for using line-orientation tests for classifying an image as authentic or unauthentic.

FIG. 33 illustrates a system 3300 for using line-orientation tests for classifying an image as authentic or unauthentic. An image to classify 3302 is provided to a preprocessing engine 3304. As mentioned, preprocessing can include one or more of grayscale conversion of the image 3306, blurring the image 3308, or edge filtering the image 3310. A preprocessed image can be provided to one or both of a process contours engine 3312 or a transform engine 3314. In some implementations, a same preprocessing is done for an image to be provided to the process contours engine 3312 as for an image to be provided to the transform engine 3314. In some implementations, at least some of the preprocessing performed for an image to be provided to the process contours engine 3312 is different from preprocessing performed for an image to be provided to the transform engine 3314.

The process contours engine 3312 can perform contour identification processing 3316, contour approximation processing 3318, corner counting 3320, contour filtering 3322, and line orientation testing 3324 (e.g., on filtered contour(s)). Further details regarding the process contours engine 3312 are described below with respect to FIGS. 34 and 35.

The transform engine 3314 can generate a transform using transform processing 3326. The generated transform can be used in line orientation testing 3328. Further details regarding the transform engine 3314 are described below with respect to FIGS. 36 and 37.

A decision engine 3330 can generate a classification for the image to classify 3302. The decision engine 3330 can receive an output from one or both of the process contours engine 3312 or the transform engine 3314. For example, the process contours engine 3312 can provide a result from the line orientation testing 3324 and/or the transform engine 3314 can provide a result from the line orientation testing 3328. If both the process contours engine 3312 and the transform engine 3314 provide output(s) to the decision engine 3330, the decision engine 3330 can generate a classification based on a combination of the received outputs. As described above, line-orientation test results may be combined with other scores or features (e.g., from pixel-intensity based processing or neural network processing), and an engine (e.g., the decision engine 3330 or another engine) can generate a classification from the combined scores. In some implementations, rather than combining line-orientation test results, a logical inclusive OR of the result from the line orientation testing 3324 and the result from the line orientation testing 3328 is used as an overall classification result (e.g., if either test indicates an unauthentic image, the image can be classified as unauthentic).

Figure 34:
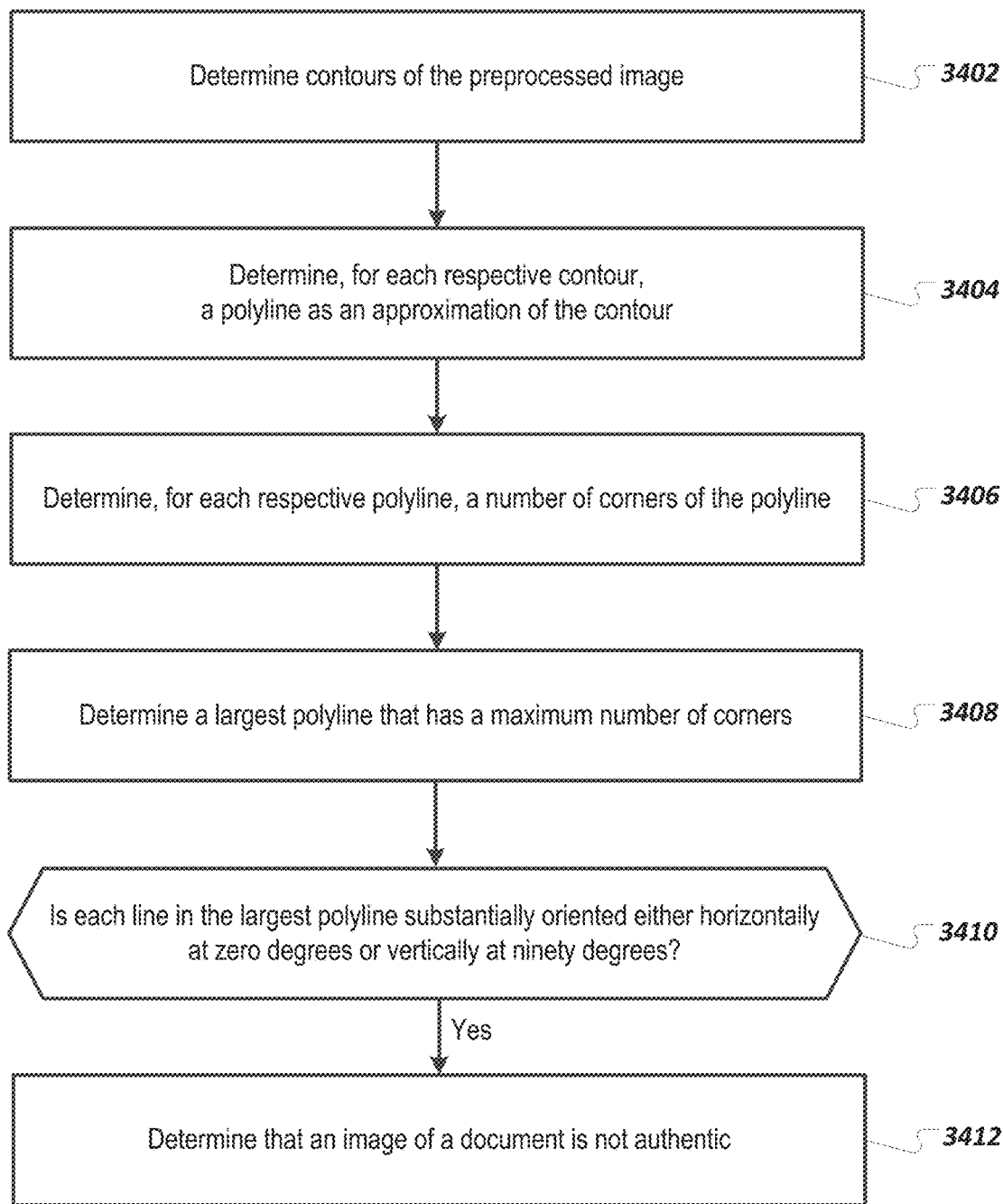
FIG. 34 is a flowchart of an example method for using a contour-based line-orientation test to classify an image.

FIG. 34 is a flowchart of an example method 3400 for using a contour-based line-orientation test to classify an image. It will be understood that method 3400 and related methods may be performed, for example, by any suitable system, environment, software, and hardware, or a combination of systems, environments, software, and hardware, as appropriate. For example, one or more of a client, a server, or other computing device can be used to execute method 3400 and related methods and obtain any data from the memory of a client, the server, or the other computing device. In some implementations, the method 3400 and related methods are executed by one or more components of the system 100 described above with respect to FIG. 1. For example, the method 3400 and related methods can be executed by the fake receipt detector 140 of FIG. 1.

At 3402, contours of a preprocessed images are determined.

At 3404, for each respective contour, a polyline as an approximation of the contour is determined.

At 3406, for each respective polyline, a number of corners of the polyline is determined.

At 3408, a largest polyline that has a maximum number of corners is determined.

At 3410, a determination is made as to whether each line in the largest polyline is substantially oriented either horizontally at zero degrees or vertically at ninety degrees. A line substantially oriented horizontally at zero degrees or vertically at ninety degrees can be a line that is oriented within a predefined threshold of either zero degrees or ninety degrees. For example, a line can be substantially oriented horizontally at zero degrees if the line is oriented within one degree of zero degrees. As another example, a line can be substantially oriented at ninety degrees if the line is oriented within one half degree of ninety degrees.

At 3412, an image of a document that is associated with the preprocessed image is determined to be not authentic based on each line in the largest polyline being substantially oriented either horizontally at zero degrees or vertically at ninety degrees. In other examples, a likelihood that the image of the document is not authentic is increased based on each line in the largest polyline being substantially oriented either horizontally at zero degrees or vertically at ninety degrees. As another example, the image of the document can be determined to be authentic (or a likelihood that the image of the document is authentic can be increased) based on at least one line in the largest polyline not being substantially oriented either horizontally at zero degrees or vertically at ninety degrees.

Figure 35:
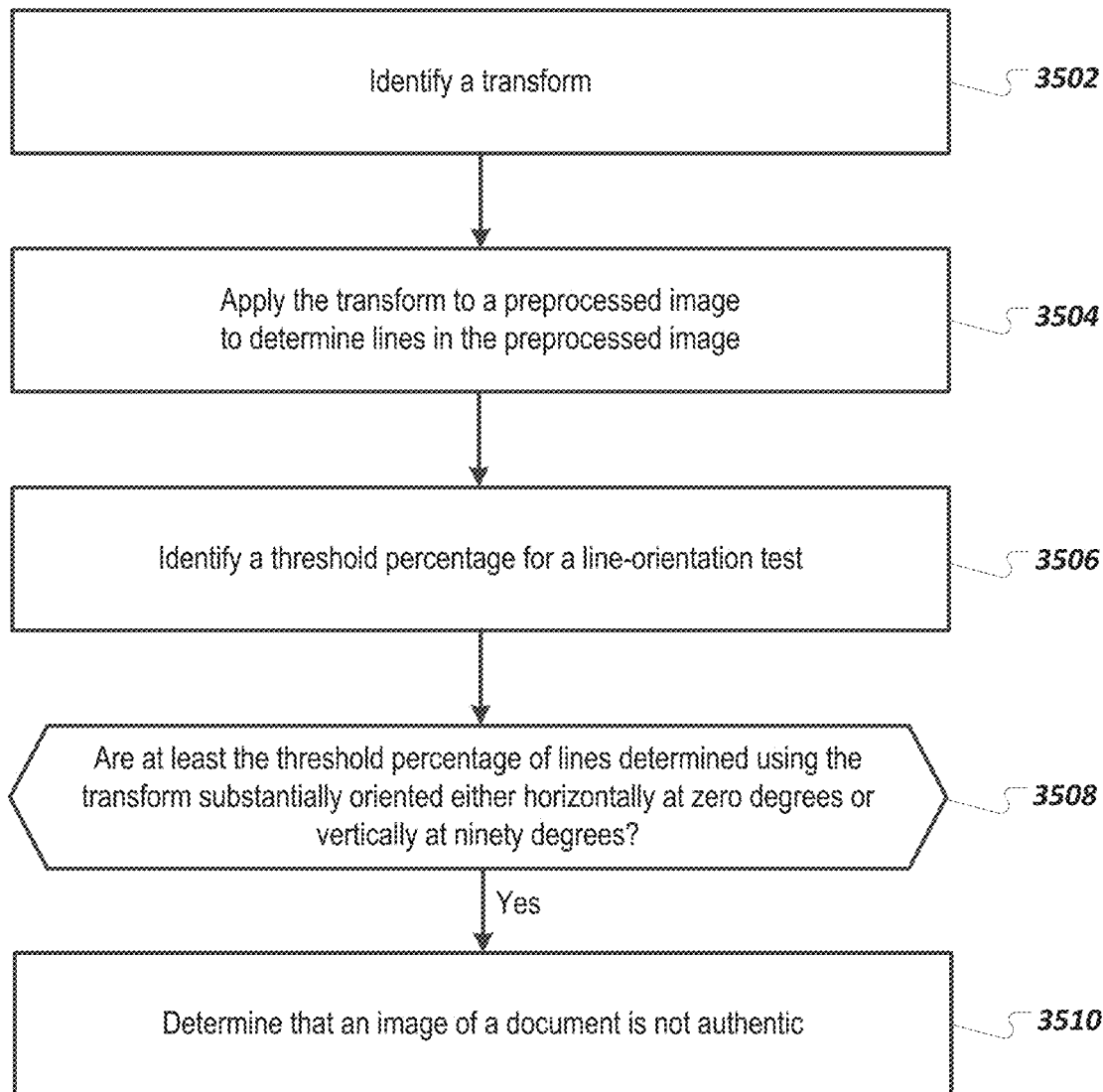
FIG. 35 is a flowchart of an example method for using a transform-based line-orientation test to classify an image.

FIG. 35 is a flowchart of an example method 3500 for using a transform-based line-orientation test to classify an image. It will be understood that method 3500 and related methods may be performed, for example, by any suitable system, environment, software, and hardware, or a combination of systems, environments, software, and hardware, as appropriate. For example, one or more of a client, a server, or other computing device can be used to execute method 3500 and related methods and obtain any data from the memory of a client, the server, or the other computing device. In some implementations, the method 3500 and related methods are executed by one or more components of the system 100 described above with respect to FIG. 1. For example, the method 3500 and related methods can be executed by the fake receipt detector 140 of FIG. 1.

At 3502, a transform to use for a line-orientation test is identified. For example, a Hough transform, or some other type of transform, can be identified.

At 3504, the transform is applied to a preprocessed image to determine lines in the preprocessed image.

At 3506, a threshold percentage for a line-orientation test is identified. For example, a predetermined threshold percentage can be identified. For example, the predetermined threshold percentage can be five percent. As another example, the threshold percentage can be dynamically determined. The line-orientation test can determine whether at least the threshold percentage of lines determined using the transform are substantially oriented either horizontally at zero degrees or vertically at ninety degrees.

At 3508, a determination is made as to whether at least the threshold percentage of the lines determined using the transform are substantially oriented either horizontally at zero degrees or vertically at ninety degrees. A line substantially oriented horizontally at zero degrees or vertically at ninety degrees can be a line that is oriented within a predefined threshold of either zero degrees or ninety degrees. For example, a line can be substantially oriented horizontally at zero degrees if the line is oriented within one degree of zero degrees. As another example, a line can be substantially oriented at ninety degrees if the line is oriented within one half degree of ninety degrees.

At 3510, an image of a document that is associated with the preprocessed image is determined to be not authentic based on at least the threshold percentage of the lines determined using the transform being substantially oriented either horizontally at zero degrees or vertically at ninety degrees. In other examples, a likelihood that the image of the document is not authentic is increased based on at least the threshold percentage of the lines determined using the transform being substantially oriented either horizontally at zero degrees or vertically at ninety degrees. As another example, the image of the document can be determined to be authentic (or a likelihood that the image of the document is authentic can be increased) based on at least the threshold percentage of the lines determined using the transform being substantially oriented either horizontally at zero degrees or vertically at ninety degrees.

Figures 36A, 36B:
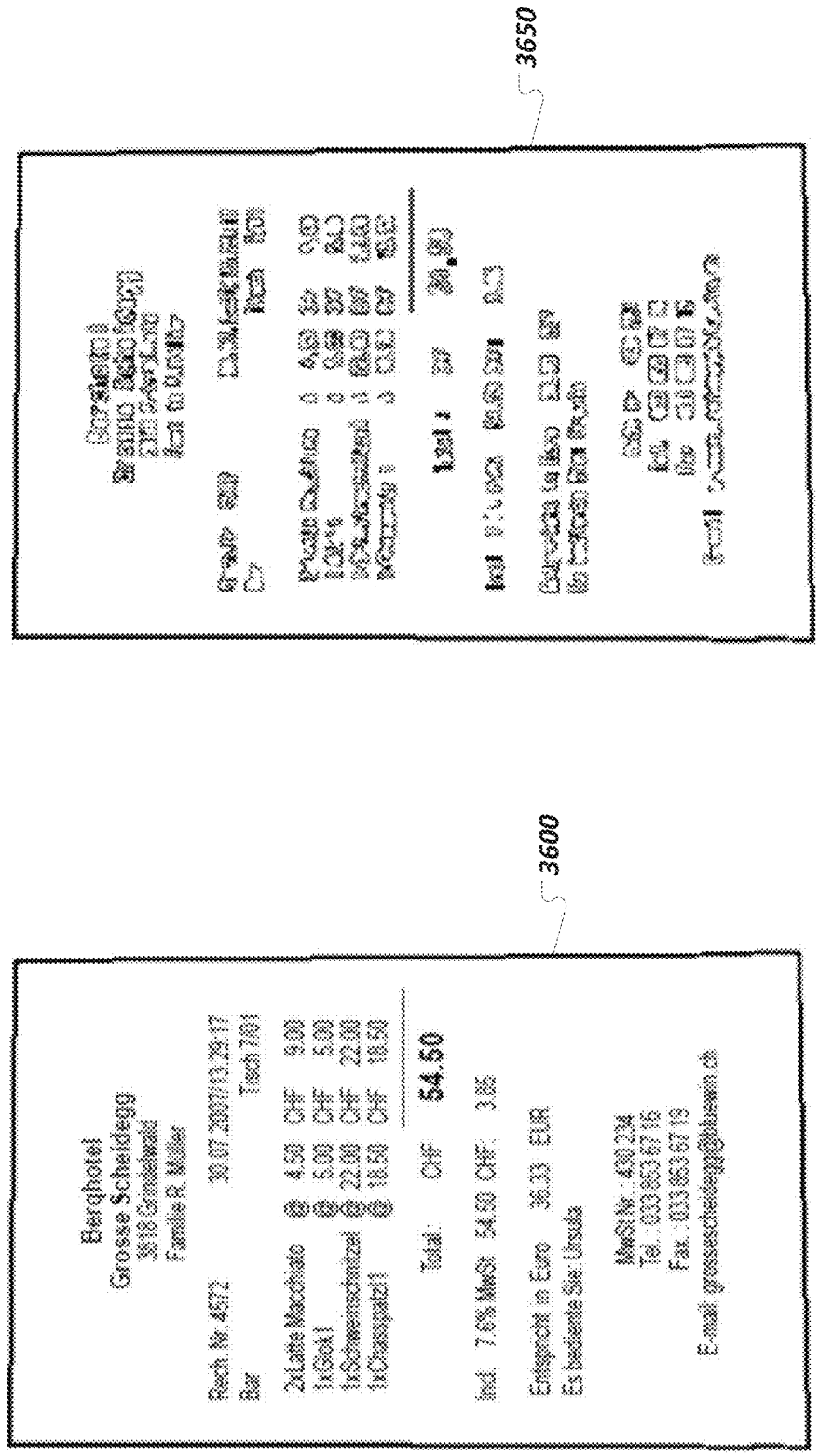
FIG. 36A illustrates an example receipt image.
FIG. 36B illustrates a pre-processed image.

FIG. 36A illustrates an example receipt image 3602. The receipt image 3602 can be preprocessed, as described above, such as using an edge filter, among other steps. FIG. 36B illustrates a pre-processed image 3650, which illustrates a result of edge filtering applied to the receipt image 3602. The pre-processed image 3650 can be processed by one or both of the process contours engine 3312 or the transform engine 3314, as described above.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving a request to classify a first image as either an authentic image of a document or an automatically generated document image;
providing the first image to a machine learning model that is trained to determine one or more features that can be used to determine whether an image is an authentic image of a document or an automatically generated document image;
receiving at least two scores from the machine learning model, wherein each respective score indicates a likelihood generated by the machine learning model that the first image is an authentic image of a document based on a degree that the first image exhibits a particular feature;
determining a respective weight for each received score, wherein each respective weight reflects an importance of the feature for the respective received score for classifying images as either an authentic image of a document or an automatically generated document, wherein determining the respective weights includes determining a first weight for a first score for a first feature and determining a second weight for a second score for a second feature, wherein the first weight is different from the second weight;
generating weighted scores by generating a weighted score for each received score using the weight for the received score;
generating a composite score that combines the weighted scores;
classifying the first image as either an authentic image of a document or an automatically generated document image, based on the composite score; and
providing a classification of the first image in response to the request.

2. The method of claim 1, wherein the first image is classified as an authentic image of a first document.

3. The method of claim 2, wherein the first document is a receipt.

4. The method of claim 2, wherein the first image is an image of a printed receipt.

5. The method of claim 1, wherein the first image is classified as an automatically generated document image.

6. The method of claim 1, wherein the first image is classified as an automatically generated document image based on at least one feature that indicates a likelihood that the first image was not captured by a camera.

7. The method of claim 1, wherein the machine learning model comprises a neural network model that learns the one or more features that can be used to determine whether an image is an authentic image of a document or an automatically generated document image.

8. The method of claim 1, wherein the machine learning model comprises a regression model that uses a plurality of predetermined feature types.

9. The method of claim 8, wherein the regression model classifies the first image based on an aggregation of scores determined for the first image for the plurality of predetermined feature types.

10. The method of claim 9, wherein a first score for a first feature indicates a probability that the first image is an authentic image of a document.

11. The method of claim 9, wherein a second score for a second feature indicates a probability that the first image is an automatically generated document image.

12. The method of claim 1, further comprising applying a filtering layer when classifying the first image.

13. The method of claim 12, wherein the filtering layer comprises a white list mechanism, and wherein the method further comprises:
- determining that the first image corresponds to a whitelisted entity; and
- classifying the image as an authentic image based on determining that the first image corresponds to a whitelisted entity.

14. A system comprising:
- one or more computers; and
- a computer-readable medium coupled to the one or more computers having instructions stored thereon which, when executed by the one or more computers, cause the one or more computers to perform operations comprising:
  - receiving a request to classify a first image as either an authentic image of a document or an automatically generated document image;
  - providing the first image to a machine learning model that is trained to determine one or more features that can be used to determine whether an image is an authentic image of a document or an automatically generated document image;
  - receiving at least two scores from the machine learning model, wherein each respective score indicates a likelihood generated by the machine learning model that the first image is an authentic image of a document based on a degree that the first image exhibits a particular feature;
  - determining a respective weight for each received score, wherein each respective weight reflects an importance of the feature for the respective received score for classifying images as either an authentic image of a document or an automatically generated document, wherein determining the respective weights includes determining a first weight for a first score for a first feature and determining a second weight for a second score for a second feature, wherein the first weight is different from the second weight;
  - generating weighted scores by generating a weighted score for each received score using the weight for the received score;
  - generating a composite score that combines the weighted scores;
  - classifying the first image as either an authentic image of a document or an automatically generated document image, based on the composite score; and
  - providing a classification of the first image in response to the request.

15. The system of claim 14, wherein the first image is classified as an authentic image of a first document.

16. The system of claim 15, wherein the first document is a receipt.

17. The system of claim 15, wherein the first image is classified as an automatically generated document image based on at least one feature that indicates a likelihood that the first image was not captured by a camera.

18. A computer program product encoded on a non-transitory storage medium, the product comprising non-transitory, computer readable instructions for causing one or more processors to perform operations comprising:
- receiving a request to classify a first image as either an authentic image of a document or an automatically generated document image;
- providing the first image to a machine learning model that is trained to determine one or more features that can be used to determine whether an image is an authentic image of a document or an automatically generated document image;
- receiving at least two scores from the machine learning model, wherein each respective score indicates a likelihood generated by the machine learning model that the first image is an authentic image of a document based on a degree that the first image exhibits a particular feature;
- determining a respective weight for each received score, wherein each respective weight reflects an importance of the feature for the respective received score for classifying images as either an authentic image of a document or an automatically generated document, wherein determining the respective weights includes determining a first weight for a first score for a first feature and determining a second weight for a second score for a second feature, wherein the first weight is different from the second weight;
- generating weighted scores by generating a weighted score for each received score using the weight for the received score;
- generating a composite score that combines the weighted scores;
- classifying the first image as either an authentic image of a document or an automatically generated document image, based on the composite score; and
- providing a classification of the first image in response to the request.

19. The computer program product of claim 18, wherein the first image is classified as an authentic image of a first document.

20. The computer program product of claim 18, wherein the first image is classified as an automatically generated document image.

* * * * *